US009547336B2

(12) United States Patent
Lee et al.

(10) Patent No.: US 9,547,336 B2
(45) Date of Patent: Jan. 17, 2017

(54) MOBILE TERMINAL HAVING FRONT COVER PORTION, REAR COVER PORTION, AND WINDOW PORTION AND SENSOR PROVIDED IN THE FRONT COVER PORTION AND METHODS OF CONTROLLING THE MOBILE TERMINAL

(71) Applicant: LG ELECTRONICS INC., Seoul (KR)

(72) Inventors: Seojin Lee, Seoul (KR); Samsick Kim, Seoul (KR); Donghwan Yu, Seoul (KR); Sooyoung Her, Seoul (KR); Jeongyun Heo, Seoul (KR); Hyungtae Jang, Seoul (KR); Taekon Lee, Seoul (KR); Jinhae Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 149 days.

(21) Appl. No.: 14/620,957

(22) Filed: Feb. 12, 2015

(65) Prior Publication Data
US 2016/0085327 A1 Mar. 24, 2016

(30) Foreign Application Priority Data

Sep. 19, 2014 (KR) .................. 10-2014-0125145
Sep. 30, 2014 (KR) .................. 10-2014-0131811

(51) Int. Cl.
*G06F 3/041* (2006.01)
*G06F 1/16* (2006.01)
(Continued)

(52) U.S. Cl.
CPC ............. *G06F 1/1632* (2013.01); *G06F 1/163* (2013.01); *G06F 1/1626* (2013.01);
(Continued)

(58) Field of Classification Search
CPC ...... G06F 1/1626; G06F 1/1632; G06F 1/163; G06F 1/1692; G06F 1/1694; G06F 3/04883; G06F 3/04847; G06F 2200/1634; G06F 2200/1636; G04G 21/08; H04M 1/0214; H04M 1/185; H04M 2250/12; H04M 2250/22
See application file for complete search history.

(56) References Cited

U.S. PATENT DOCUMENTS

2007/0222765 A1 9/2007 Nyyssonen
2009/0323262 A1 12/2009 Arita
(Continued)

FOREIGN PATENT DOCUMENTS

EP 2675141 12/2013
EP 2765760 8/2014
WO 2013/150514 10/2013

OTHER PUBLICATIONS

European Patent Office Application Serial No. 14194936.2, Search Report dated Mar. 9, 2016, 6 pages.

*Primary Examiner* — Lun-Yi Lao
*Assistant Examiner* — Elliott Deaderick
(74) *Attorney, Agent, or Firm* — Lee, Hong, Degerman, Kang & Waimey

(57) ABSTRACT

A mobile terminal according to the present disclosure includes a body having a front surface and a rear surface, a display unit disposed on the front surface, a cover formed to allow at least part thereof to cover the front or rear surface, a window portion provided on the cover to expose at least part of the display unit in a state that the cover covers the front surface, and expose at least part of the rear surface in a state that the cover covers the rear surface, and a sensor unit provided with at least one sensor disposed at an edge portion of the window portion, wherein the sensor unit senses a user motion with respect to an inner side of the
(Continued)

window portion in a state that the cover covers the rear surface.

20 Claims, 75 Drawing Sheets

(51) Int. Cl.
*H04M 1/02* (2006.01)
*H04M 1/18* (2006.01)
*G06F 3/0488* (2013.01)
*G06F 3/0484* (2013.01)
*G04G 21/08* (2010.01)

(52) U.S. Cl.
CPC .......... *G06F 1/1692* (2013.01); *G06F 1/1694* (2013.01); *G06F 3/04847* (2013.01); *G06F 3/04883* (2013.01); *H04M 1/0214* (2013.01); *H04M 1/185* (2013.01); *G04G 21/08* (2013.01); *G06F 2200/1634* (2013.01); *G06F 2200/1636* (2013.01); *H04M 2250/12* (2013.01); *H04M 2250/22* (2013.01)

(56) References Cited

U.S. PATENT DOCUMENTS

| | | | |
|---|---|---|---|
| 2010/0164871 A1* | 7/2010 | Shigeta | G06F 3/0338 345/169 |
| 2012/0212430 A1 | 8/2012 | Jung et al. | |
| 2015/0061881 A1* | 3/2015 | Jeon | H04M 1/04 340/687 |
| 2015/0062126 A1* | 3/2015 | Lee | G06T 3/0006 345/428 |
| 2015/0065207 A1* | 3/2015 | Hong | H04M 1/0245 455/575.3 |
| 2015/0278529 A1* | 10/2015 | Cho | G06F 1/1677 345/668 |
| 2016/0197637 A1* | 7/2016 | Lee | H04B 1/38 455/566 |

* cited by examiner

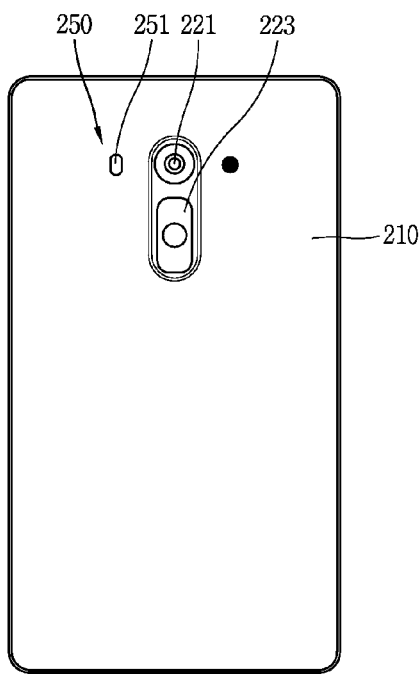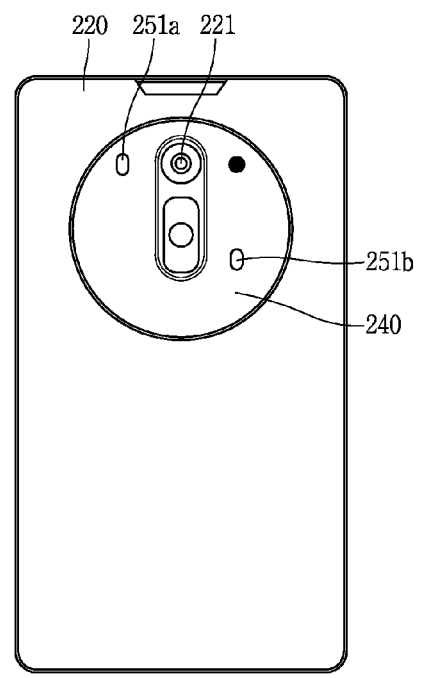

FIG. 14A(a)
FIG. 14A(b)
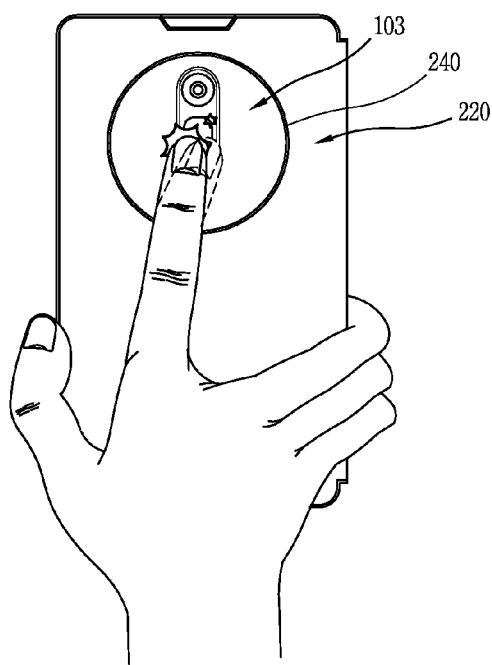
FIG. 14A(c)

MOBILE TERMINAL HAVING FRONT COVER PORTION, REAR COVER PORTION, AND WINDOW PORTION AND SENSOR PROVIDED IN THE FRONT COVER PORTION AND METHODS OF CONTROLLING THE MOBILE TERMINAL

CROSS-REFERENCE TO RELATED APPLICATIONS

Pursuant to 35 U.S.C. §119(a), this application claims the benefit of earlier filing date and right of priority to Korean Patent Application Nos. 10-2014-0125145 filed on Sep. 19, 2014, and Korean Patent Application No. 10-2014-0131811 filed on Sep. 30, 2014, the contents of which are all hereby incorporated by reference herein in their entirety.

BACKGROUND OF THE INVENTION

1. Field of the Invention

The present disclosure relates to a mobile terminal and a control method thereof.

2. Description of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Furthermore, in recent years, the development of a cover (or pouch) surrounding at least part of the mobile terminal has been actively carried out to protect the mobile terminal. Accordingly, a scheme capable of further enhancing the user convenience of the terminal using such a cover may be taken into consideration.

SUMMARY OF THE INVENTION

An aspect of the present disclosure is to provide a mobile terminal in which a user can select and execute his or her desired function in the mobile terminal in an easier and more convenient manner and a control method thereof.

Moreover, another aspect of the present disclosure is to provide a mobile terminal in which a user can select and execute his or her desired function of the mobile terminal without a complicated process of handling a menu selection screen several times and a control method thereof.

Furthermore, still another aspect of the present disclosure is to provide a mobile terminal capable of quickly approaching a frequently used application and a control method thereof.

Moreover, yet still another aspect of the present disclosure is to provide a mobile terminal capable of performing a new type of user input which is different from the related art.

In addition, still yet another aspect of the present disclosure is to provide a cover combined with a mobile terminal to implement a new form factor of the mobile terminal.

In order to accomplish the foregoing objective, A mobile terminal may include a body having a front surface and a rear surface, a display unit disposed on the front surface, a cover formed to allow at least a part thereof to cover at least a part of the front or rear surface of the body, a window portion provided in the cover to expose at least part of the display unit in a state that the cover covers at least a part of the front surface, and expose at least part of the rear surface in a state that the cover covers at least a part of the rear surface and a sensor unit provided with at least one sensor disposed at an edge portion of the window portion, wherein the sensor unit is configured to sense motion of an object within the perimeter of the window portion when the cover is in a state such that it covers at least a part of the rear surface.

According to an embodiment, the sensor unit may include a plurality of sensors separated from one another along an outer circumference of the window portion, and disposed toward an inner side of the window portion.

According to an embodiment, the cover comprises a first portion mounted on a rear surface of the body, and a second portion rotatably connected to the first portion, wherein the cover further comprises a flexible circuit board comprising a loop portion located around the perimeter of the window portion, and an extension portion extended from the loop portion and connected from the second portion to the first portion and electrically connected to the body at the first portion.

According to an embodiment, a connecting terminal, electrically connected to a power terminal of the body, is disposed at the extension portion to allow reception of power from the body.

According to an embodiment, a sensor in the body is configured to be controlled together with the sensor of the sensor unit to sense the motion of the object and is mounted on a rear surface of the body to overlap with the window portion when the cover is in a state such that it covers at least a part of the rear surface, wherein the sensor in the body is configured to be controlled to sense the motion of the object through the window portion.

According to an embodiment, at least one magnet is disposed at the cover, and a plurality of Hall-effect devices are disposed at the body to permit sensing of the magnet and thereby the a state of the cover covering the front surface and a state of the cover covering the rear surface.

According to an embodiment, the plurality of Hall-effect devices comprise first and second Hall-effect devices, located proximate to the edges of the body and located at different positions along a length direction of the body, and first and second magnets are located at positions on the cover corresponding to the positions of the first and Hall-effect devices, such that each magnet is proximate to a corresponding Hall-effect device when the cover is in a state such that it covers the front or rear surface of the body.

According to an embodiment, at least one movement sensor for sensing a movement of the body, provided in the body; and a controller configured to: process a function corresponding to motion of the object within the perimeter of the window portion using sensing information sensed through the sensor unit and, when the terminal is in a state that first screen information of a first application is displayed on the display unit, store execution information of the first application in response to a combination of: the movement sensor sensing movement of the body in a preset first direction and the sensor unit sensing a motion of the object corresponding to a preset type of touch being applied to the rear surface.

According to an embodiment, the controller is further configured to control the display unit to display the screen information of either one of the first or the second application in response to the sensor unit sensing a motion of the object corresponding to a touch being applied to the rear surface when the terminal is in a state that the respective graphic object is displayed.

According to an embodiment, when in a state that the graphic object is displayed, the controller is further configured to display on the display unit the application, out of the first and second applications, that was the most recently executed in response to the sensor unit sensing a motion of the object corresponding to a touch applied to the rear surface.

According to an embodiment, in a state that the graphic objects corresponding to the first and the second application, respectively, are displayed, the controller is further configured to delete the execution information of the first and the second application, and terminate the display of graphic objects in response to a combination of: the movement sensor sensing that body moves with a preset movement; and the sensor unit sensing a motion of the object corresponding to a preset type of touch applied to the rear surface.

According to an embodiment, subsequent to deleting the execution information of the first and the second application, the graphic objects corresponding to the first and the second application, respectively, are not displayed even when the movement sensor senses that body moves in a second direction, which is different from the first direction, and the sensor unit senses a motion of the object corresponding to a preset type of touch applied to the rear surface.

According to an embodiment, when in a state that the body moves in a preset first direction, the controller is configured to terminate the display of the first screen information of the first application on the display unit when the sensor unit senses a motion of the object corresponding to the preset type of touch applied to the rear surface.

According to an embodiment, when dependent on claim 6 or 7, wherein the or each magnet is mounted on a portion of the cover to permit sensing of a state that the cover covers the front surface or rear surface, and the controller is further configured to: determine whether or not the cover is in a state of covering the rear surface using a magnetic field formed by the magnet being sensed through the Hall-effect device, and supply operation power to the sensor unit to activate the sensor unit disposed at the window portion when the cover is in a state of covering the rear surface as a result of the determination.

Further, an aspect of the detailed description is to provide a mobile terminal and a method for controlling the same, in which a user can more easily and conveniently identify an event generated in the mobile terminal.

Another aspect of the detailed description is to provide a mobile terminal and a method for controlling the same, in which a user can identify an event generated in the mobile terminal without a complicated process passing through a menu selection screen several times.

Still another aspect of the detailed description is to provide a mobile terminal and a method for controlling the same, in which a user can quickly access a recently executed application.

Still another aspect of the detailed description is to provide a mobile terminal to which a new type user input different from that of the conventional art can be applied.

Still another aspect of the detailed description is to provide a cover which can implement a new form factor of the mobile terminal by being combined with the mobile terminal.

To achieve these and other advantages and in accordance with the purpose of this specification, as embodied and broadly described herein, a mobile terminal includes: a main body configured to have a front surface and a rear surface; a display unit disposed at the front surface; a sensor unit configured to sense a user motion with respect to the rear surface; and a controller configured to perform control related to a previously generated event, when a predetermined user motion with respect to the rear surface is sensed in a state in which first screen information is output on the display unit, wherein the controller outputs information related to the previously generated event, based on that the predetermined user motion with respect to the rear surface is sensed.

In one exemplary embodiment, the controller may switch the first screen information to second screen information related to the previously generated event, based on that the predetermined user motion with respect to the rear surface is sensed.

In one exemplary embodiment, the controller may again switch the second screen information to the first screen information, based on that the predetermined user motion with respect to the rear surface is sensed in a state in which the second screen information is output on the display unit.

In one exemplary embodiment, the controller may output an icon corresponding to the previously generated event, based on that the predetermined user motion with respect to the rear surface is sensed. If a predetermined time elapses in the state in which the icon is output, the controller may switch the first screen information to the second screen information related to the previously generated event.

In one exemplary embodiment, if the first screen information is switched to the second screen information, the output of the icon corresponding to the previously generated event may be finished.

In one exemplary embodiment, when a plurality of events are previously generated, the controller may output a plurality of icons respectively corresponding to the plurality of previously generated events, based on that the predetermined user motion with respect to the rear surface is sensed.

In one exemplary embodiment, the controller may output a plurality of icons respectively corresponding to the plurality of previously generated events. If a predetermined time elapses in the state in which the plurality of icons are output, the controller may switch the first screen information to second screen information related to an event corresponding to a predetermined reference among the plurality of previously generated events.

In one exemplary embodiment, if the first screen information is switched to the second screen information, the output of the plurality of icons respectively corresponding to the plurality of previously generated events may be finished.

In one exemplary embodiment, the controller may output at least one icon connected to at least one application satisfying a predetermined condition, together with the plurality of icons respectively corresponding to the plurality of previously generated events.

In one exemplary embodiment, if a user motion different from the predetermined user motion is sensed in the state in which the at least one icon connected to the at least one application satisfying the predetermined condition is output, the controller may switch the first screen information to screen information related to one of the at least one application satisfying the predetermined condition.

In one exemplary embodiment, the predetermined reference may be related to the time when an event is generated. The controller may switch the first screen information to screen information related to the most recently generated event among the plurality of previously generated events.

In one exemplary embodiment, if a user motion selecting one of the plurality of icons respectively corresponding to the plurality of previously generated events is sensed, the controller may switch the first screen information to screen information related to an event corresponding to the selected icon.

In one exemplary embodiment, if a user motion different from the predetermined user motion is sensed in the state in which the second screen information is output, the controller may again switch the second screen information to the first screen information.

In one exemplary embodiment, if the predetermined user motion with respect to the rear surface is again sensed in the state in which the second screen information is output, the controller may output at least one icon respectively corresponding to at least one event except an event related to the second screen information among the plurality of previously generated events. If a predetermined time elapses in the state in which the at least one icon is output, the controller may switch the second screen information to third screen information related to an event corresponding to a predetermined reference among the at least one event.

In one exemplary embodiment, if a predetermined first user motion is sensed in a state in which the third screen information is output, the controller may switch the third screen information to the second screen information.

In one exemplary embodiment, if a predetermined second user motion is sensed in the state in which the third screen information is output, the controller may switch the third screen information to the first screen information.

To achieve these and other advantages and in accordance with the purpose of this specification, as embodied and broadly described herein, a mobile terminal includes: a main body configured to have a front surface and a second surface; a display unit disposed at the front surface; a cover disposed to cover any one of the front and rear surfaces, the cover having a window part; a sensor unit configured to have at least one sensor disposed at the periphery of the window part, the sensor unit sensing a predetermined user motion; and a controller configured to switch first screen information output on the display unit to second screen information related to a previously generated event, based on that the predetermined user motion is sensed through the at least one sensor disposed at the periphery of the window part in a state in which the cover covers the rear surface.

To achieve these and other advantages and in accordance with the purpose of this specification, as embodied and broadly described herein, a method for controlling a mobile terminal, the method includes: outputting first screen information on a display unit; sensing a predetermined user motion with respect to a rear surface of a main body of the mobile terminal; and performing control related to a previously generated event, when the predetermined user motion is sensed, wherein the performing of the control related to the previously generated event includes outputting information related to the previously generated event, when the predetermined user motion is sensed.

In one exemplary embodiment, the performing of the control related to the previously generated event may include switching the first screen information to second screen information related to the previously generated event, when the predetermined user motion is sensed.

In one exemplary embodiment, the method may further include again switching the second screen information to the first screen information, based on that the predetermined user motion with respect to the rear surface is sensed in a state in which the second screen information is output on the display unit.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
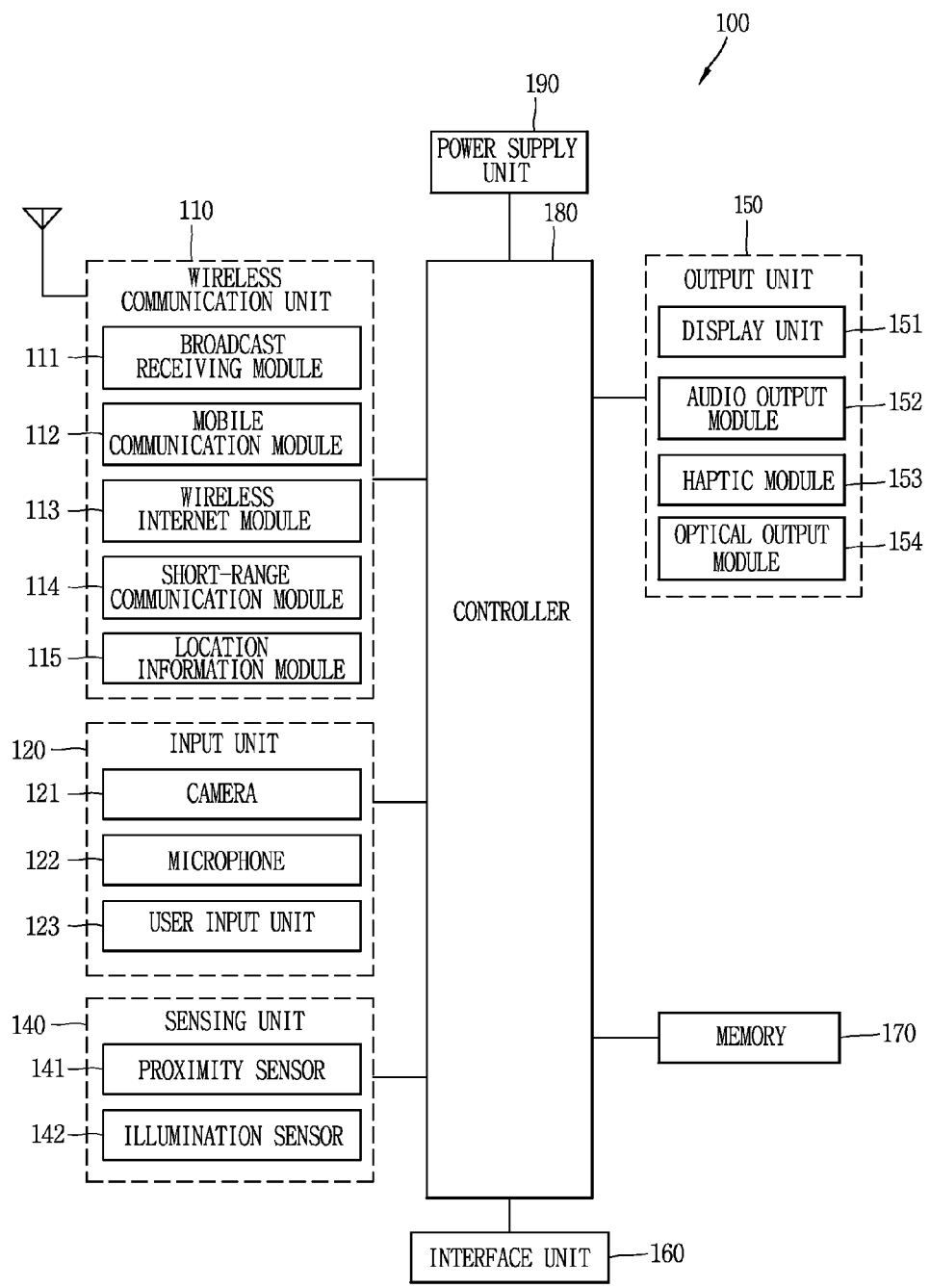
FIG. 1A is a block diagram of a mobile terminal in accordance with the present disclosure.
Figure 1B:
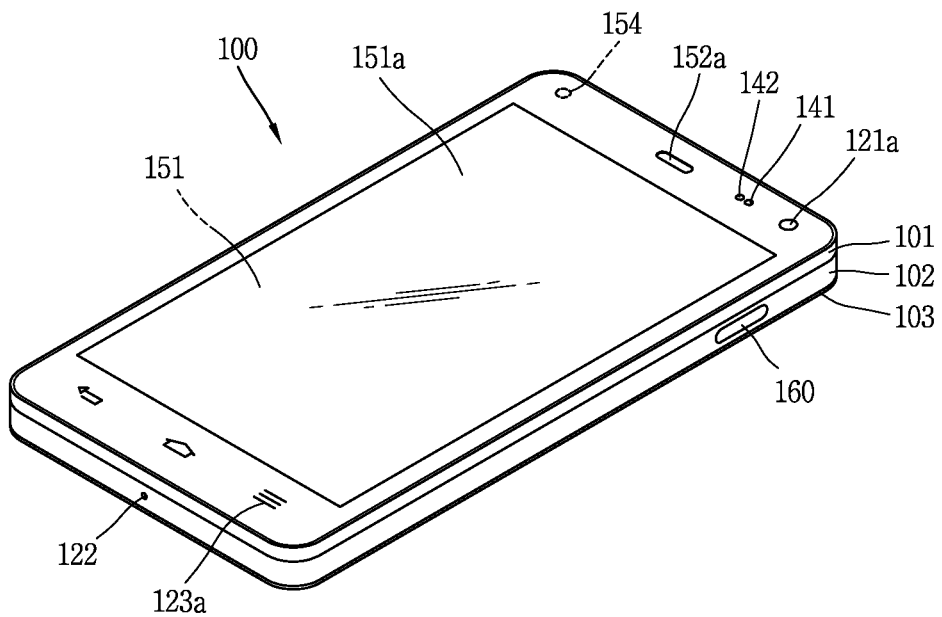
FIGS. 1B and 1C are conceptual views of one example of the mobile terminal, viewed from different directions.
Figure 1C:
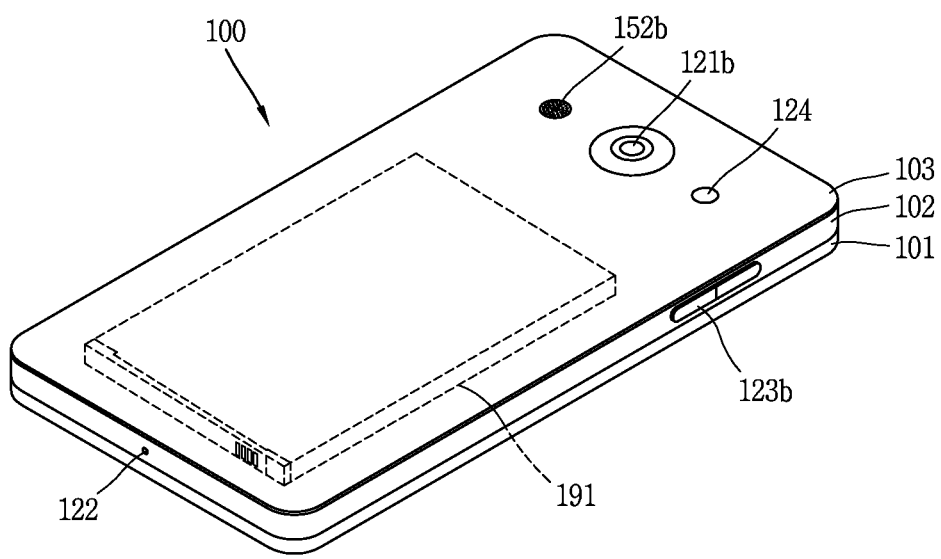

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123*a* may be located on another surface of the terminal body, and the second audio output module 152*b* may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The first audio output module 152*a* may be implemented in the form of a speaker to output voice audio, alarm sounds, multimedia audio reproduction, and the like.

The window 151*a* of the display unit 151 will typically include an aperture to permit audio generated by the first audio output module 152*a* to pass. One alternative is to allow audio to be released along an assembly gap between the structural bodies (for example, a gap between the window 151*a* and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121*a* can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1B illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2A:
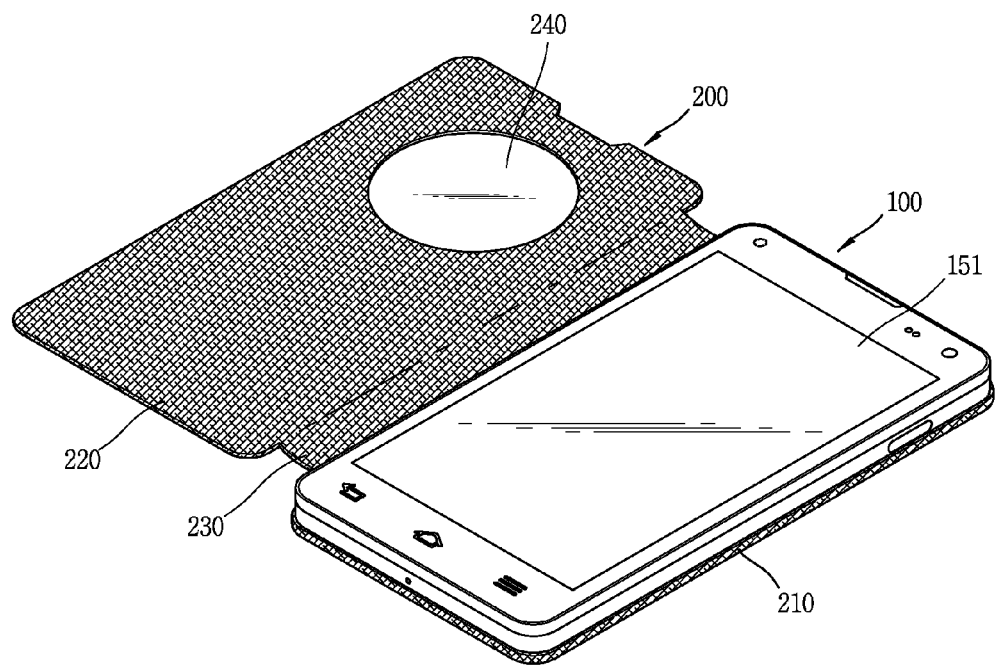
FIGS. 2A and 2B are perspective views illustrating a mobile terminal accommodated in a cover according to an embodiment of the present disclosure.

As shown in this figure, the cover 200 is formed to accommodate the body of the mobile terminal. FIG. 2A illustrates a state in which the front surface of the mobile terminal is opened by the cover 200. The state in which the front surface is opened becomes a state in which the display unit 151 disposed at the front surface is opened.

The cover 200 includes a rear cover portion 210 formed so that the rear surface of the body of the mobile terminal is accommodated. The cover 200 includes a front cover portion 220 rotatably connected to the rear cover portion 210 to cover or open the display unit 151.

However, the present disclosure is not necessarily limited thereto. For example, the cover 200 may be configured so that the rear cover portion 210 is not coupled to the rear surface of the body but coupled to a side surface of the body.

The cover 200 may be formed into a structure substituting for the rear cover 103 of the body of the terminal. More specifically, in a mobile terminal to which a battery cover is coupled, the cover 200 may be coupled to a rear part of the mobile terminal in place of the battery cover. In this case, a coupling projection enabling the cover to be attachable/detachable as the battery cover may be formed on an inner surface of the rear cover portion 210, and a coupling groove coupled to the coupling projection may be formed in the rear case of the terminal.

As another example, in the mobile terminal having a battery cover integrally provided thereto, the cover 200 may be coupled to the mobile terminal while covering the battery cover. In this case, a coupling projection for coupling the cover to the mobile terminal may be disposed at another part except the rear cover portion 210.

As shown in this figure, the rear cover portion 210 may be integrally formed with a lateral cover portion protruded from the rear cover portion 210 to surround the side surface of the terminal. The lateral cover portion is protruded from the edge of a main surface of the rear cover portion 210 opposite to the rear surface of the terminal to surround the side surface of the terminal. More specifically, the lateral cover portion is protruded in a direction perpendicular to the main surface, and may be formed to surround a part of the side surface or to surround the entire side surface.

As shown in this figure, a connecting portion 230 may be protruded and extended to the outside from the edge of the rear cover portion 210 to connect the rear cover portion 210 and the front cover portion 220 to each other. The connecting portion 230 may have a narrow width to be easily bent, and the front cover portion 220 may be rotated in a state in which the front cover portion 220 covers the display unit 151 using the bending of the connecting portion 230. In this case, a support prominence bent at one side of the rear cover portion 210 to be adhered closely to a corner side of the mobile terminal may be provided to the connecting portion 230.

As an example, the connecting portion 230 may be integrally formed with the front cover portion 220, and may be coupled to the rear cover portion 210. In this case, the connecting portion 230 may be extended from one side of the front cover portion 220, using the same material as the front cover portion 220.

As another example, the connecting portion 230 may be integrally formed with the rear cover portion 210, and may be coupled to the front cover portion 220. In this case, the connecting portion 230 may be extended from one side of the rear cover portion 210, using the same material as the rear cover portion 210.

Figure 2B:
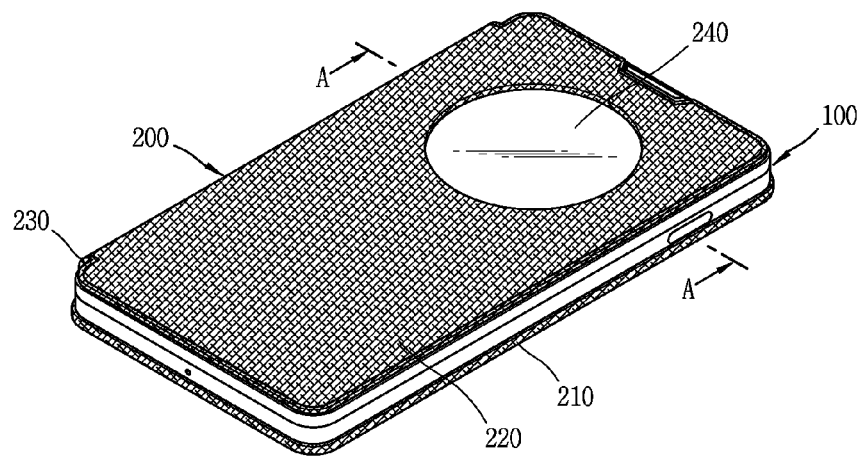

FIG. 2B illustrates a state in which the cover 200 covers the display unit 151 of the mobile terminal.

The mobile terminal 100 and the cover 200 form a shape such as a diary in the state in which the cover 200 covers the display unit 151, and thus a user's portability is increased. The cover 200 acts as a protective cover surrounding the mobile terminal 100, and thus the mobile terminal 100 can be more safely protected from external impact or stimulus.

The rear cover portion 210 and the front cover portion 220 are formed to be parallel to each other in the state in which the cover 200 covers the display unit 151. The connecting portion 230 may be formed to cover only a part of a gap formed between the rear cover portion 210 and the front cover portion 220. In this case, the rest of the gap may be filled with the lateral cover portion.

Referring to this figure, the cover 200 is formed to expose visual information of the display unit 151 to the outside in the state in which the cover 200 covers the display unit 151. More specifically, referring to FIG. 2B, the front cover portion 220 may have a window portion 240. The window portion 240 have a through hole (or hole). An object (e.g., user's fingers) may pass the window portion 240 via the through hole (or hole). Further, the window portion 240 may be an area made of a light transmissive member. The window portion 240 is formed to the visual information of the display unit 151 on an outer surface of the window portion 240 due to its light transmissive property.

The window portion 240 is formed to be overlapped with the display unit 151 for purpose of the output of the visual information. More specifically, the window portion 240 may be positioned above the front surface of the display unit 151 in the state in which the front cover portion 220 covers the display unit 151. According to the structure described above, a user can recognize, from the outside, icons, texts, images and the like, output on the display unit 151, through the window portion 240.

The window portion may have a loop portion located around the perimeter of the window portion. The window portion may have shapes other than circular, e.g. oval, rectangular (including square), rectangular with rounded corners etc. The loop can be configured to substantially follow the perimeter of the hole that forms the window portion 240.

The terminal of the present disclosure may sense a user motion with respect to the inside of the window portion 240, and control an operation of the terminal based on the sensed user motion. Further, the terminal of the present disclosure may sense a user motion with respect to the inside of the window portion 240 in a state in which the front cover portion 220 covers the rear surface 103 of the terminal or in a state in which the front cover portion 220 is rotated to be overlapped with the rear cover portion 210.

The window portion 240 can further comprise a light transmissive member located in the hole. The hole of the window portion 240 thus forms an edge of the front cover portion 220 within the front cover portion. Since the window portion 240 exposes visual information of the display unit 151, the portion of the display unit 151 exposed by the window portion 151 can be viewed by a user even when the front cover portion 220 covers the display unit.

In order to sense such a user motion, a sensor portion for sensing a user motion with respect to the inside of the window portion 240 is provided in the cover 200. Hereinafter, the structure in which a sensor for sensing a user motion is disposed will be described in detail.

Figure 3A:
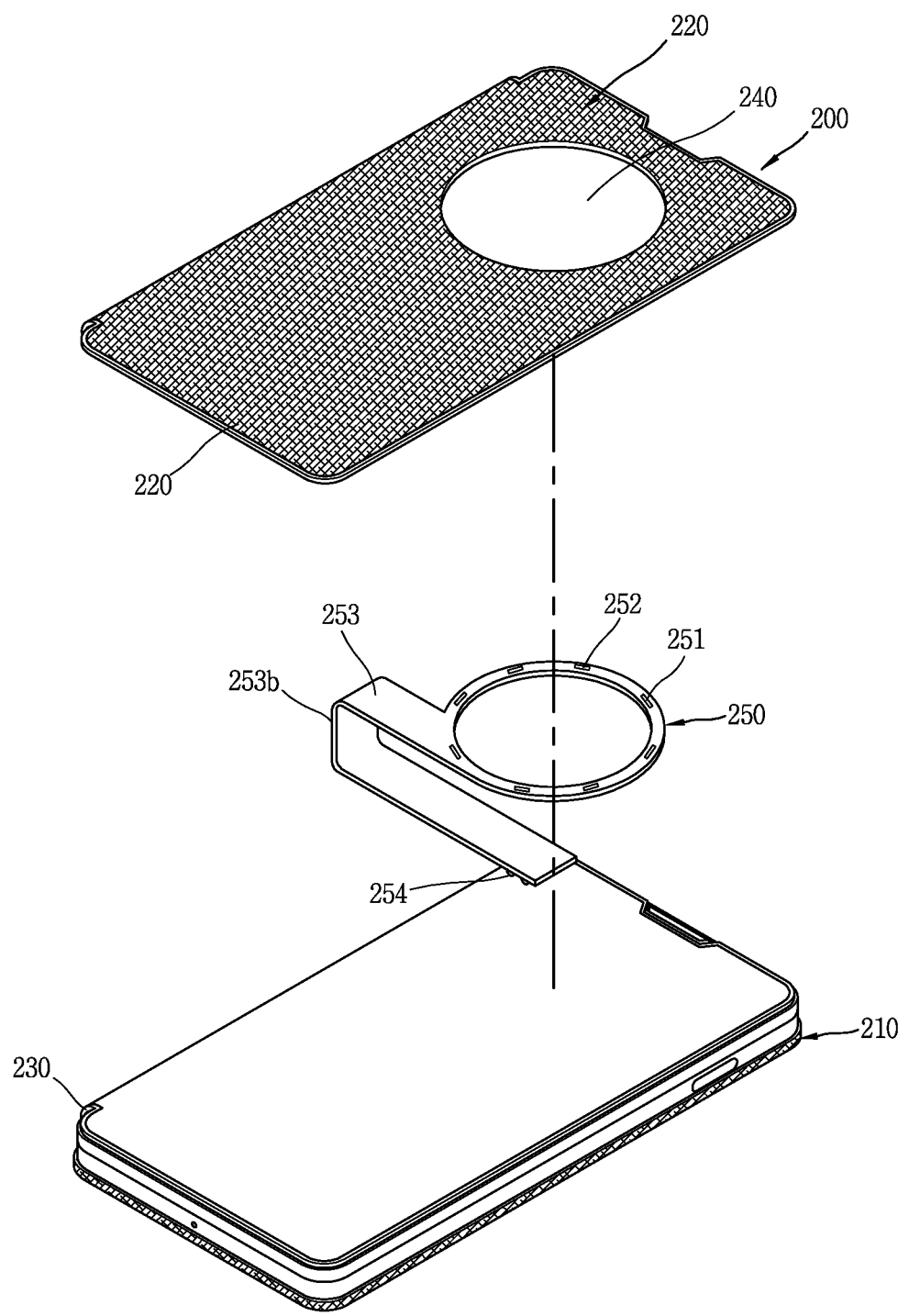
FIG. 3A is an exploded perspective view of a front cover portion in FIG. 2B.
Figure 3B:
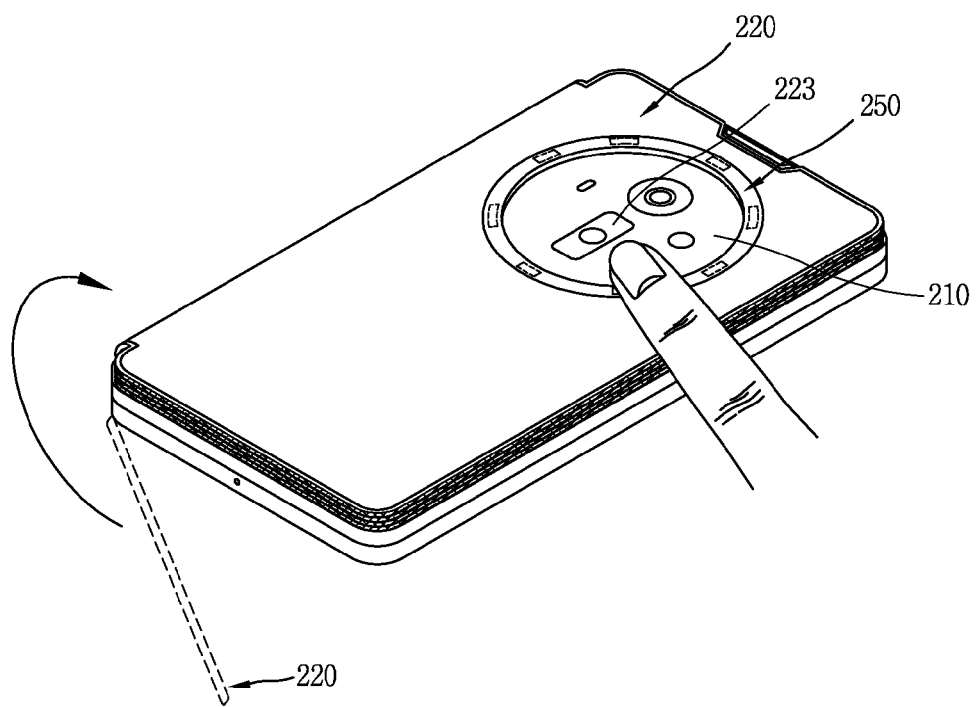
FIG. 3B is a rear perspective view illustrating a state that the front cover portion in FIG. 2B rotates to cover the rear cover portion.
Figure 4:
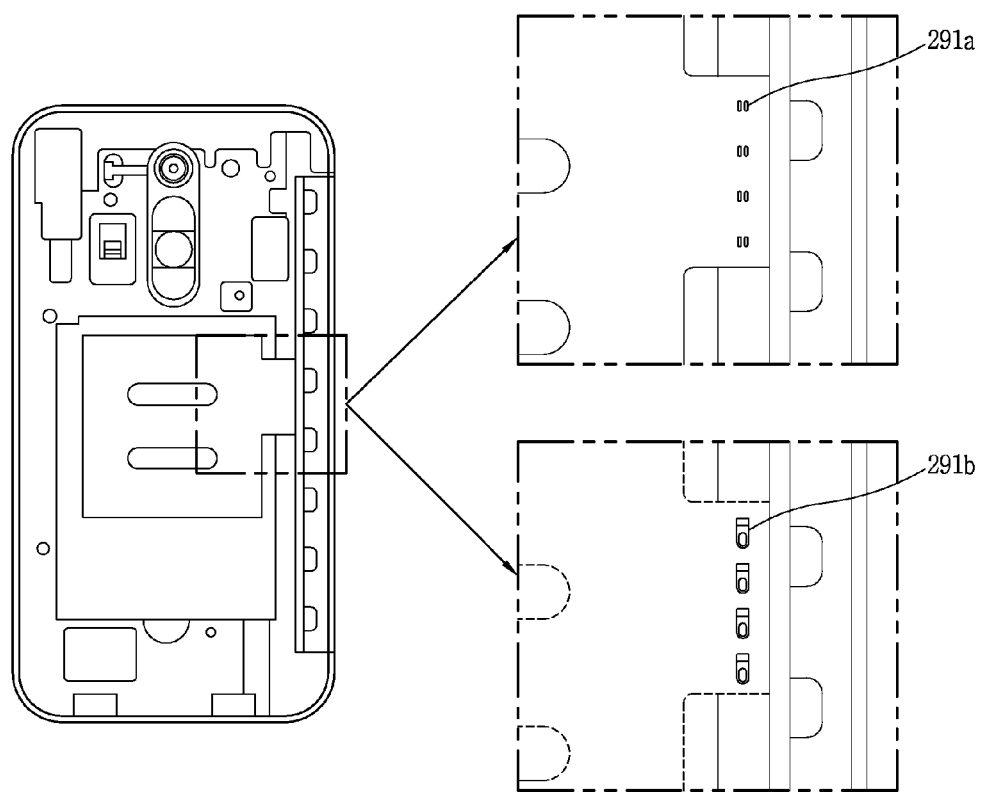
FIG. 4 is a conceptual view illustrating a power connection between the terminal body and a sensor unit of the cover.

FIG. 3A is an exploded perspective view of the cover front part of FIG. 2B. FIG. 3B is a rear perspective view illustrating a state in which the cover front part is rotated to cover the cover rear part in FIG. 2B. FIG. 4 is a conceptual view illustrating power connection between the main body of the terminal and the sensor portion of the cover.

Referring to FIG. 3A, the sensor portion 250 has at least one sensor 251 disposed at an edge portion of the window portion 240. The sensor 251 is formed to sense a user motion with respect to the inside of the window portion 240. For example, the sensor 251 may be an infrared ray sensor, a laser sensor, a photo sensor, or the like. Accordingly, the sensor portion 250 can sense a user motion with respect to the inside of the window portion 240 in a state in which the front cover portion 220 covers the rear surface of the main body.

Referring to FIGS. 3A and 3B, the window portion 240 is formed to expose at least part of the display unit in a state in which the front cover portion 220 covers the front surface of the main body. The window portion 240 is formed to expose at least part of the rear surface in a state in which the front cover portion 220 covers the rear surface of the main body. According to these figures, the state in which the front cover portion 220 covers the rear surface of the main body may substantially become a state in which the front cover portion 220 covers the rear cover portion 210.

Referring to FIG. 3B, a rear input unit 223 is disposed at the rear surface of the mobile terminal, and a through-hole is provided at a position corresponding to the rear input unit 223 in the rear cover portion 210. The rear input unit 223 may be exposed to the outside through the through-hole. The rear input unit 223 is manipulated to receive a command for controlling an operation of the mobile terminal 100, and the received command may be variously set. For example, the rear input unit 223 may receive a command such as on/off of power, start, end or scroll, or a command such as adjustment of the volume of a sound output from the sound output unit or conversion of the display unit into a touch recognition mode. The rear input unit 223 may be implemented in a form where a touch input, a push input or an input based on a combination thereof.

The rear input unit 223 may be disposed to be overlapped with the display unit of the front surface of the main body in the thickness direction. As an example, the rear input unit 223 may be disposed at a rear upper part of the main body, so that when the user holds the main body with one hand, the user can easily manipulate the rear input unit using the index finger of the hand. However, the present disclosure is not necessarily limited thereto, and the position of the rear input unit 223 may be changed. In this case, the window portion 240 of the front cover portion 220 may be disposed at a position where the rear input unit 223 is exposed to the outside. That is, the window portion 240 and the rear input unit 223 may be overlapped with each other in the state in which the front cover portion 220 covers the rear surface of the main body, and accordingly, the rear input unit 230 can be exposed to the exterior. According to the structure described above, the user can apply a push (or touch) for manipulating the rear input unit 223 even in the state in which the front cover portion 220 covers the rear surface of the main body. However, the present disclosure is not necessarily limited thereto, and a structure is possible in which the circumference of the rear input unit 223 is exposed to the outside by the window portion 240, and the user applies a user input to the circumference.

In the present disclosure, the sensor portion 250 is formed to sense a user input applied to the window portion 240 in the state in which the front cover portion 220 covers the rear surface of the main body.

Referring back to FIG. 3A, the sensor portion 250 has a plurality of sensors 251 and 252. The plurality of sensors 251 and 252 may be disposed to be spaced apart from each other along the outer circumference of the window portion 240 and to face the inside of the window portion 240. The motion of a user's finger entering the window portion 240 may be sensed by the plurality of sensors 251 and 252.

More specifically, a flexible circuit board 253 is mounted in the cover. The flexible circuit board 253 has a ring-shaped body part 253a formed in a ring shape to surround the window portion 240, so that the plurality of sensors 251 and 252 are mounted in the ring-shaped body part 253a. The plurality of sensors 251 and 252 may be disposed to be spaced apart from each other at a predetermined distance along the outer circumference of the ring-shaped body part 253a. As shown in this figure, the flexible circuit board 253 has an extending part 253b extended from the ring-shaped body part 253a to be continued from the front cover portion 220 to the rear cover portion 210, the extending part 253b being electrically connected to the main body at the rear cover portion 210.

A connection terminal 254 electrically connected to a power terminal 291a or 291b of the main body to receive power supplied from the main body may be disposed at an end part of the extending part 253b. The connection terminal 254 may be exposed to the outside by passing through one surface of the rear cover portion 210. If the rear cover portion 210 is mounted to the main body of the mobile terminal, the connection terminal 254 exposed to the outside may be formed to come in contact with the power terminal 291a or 291b of the main body. Referring to FIG. 4, the power terminal 291a or 291b is disposed at the rear surface of the main body. The power terminal 291a or 291b may be an elastically deformable terminal, such as a pogo pin or a C-clip.

According to the structure described above, a user motion applied to the window portion can be sensed in a state in which the cover front part is rotated to cover the cover rear part.

To this end, the mobile terminal of the present disclosure is formed to sense the state in which the cover front part is rotated to cover the cover rear part. Hereinafter, structures for sensing the state will be described with reference to FIGS. 5A 5B(a) and 5B(b).

Figure 5A:
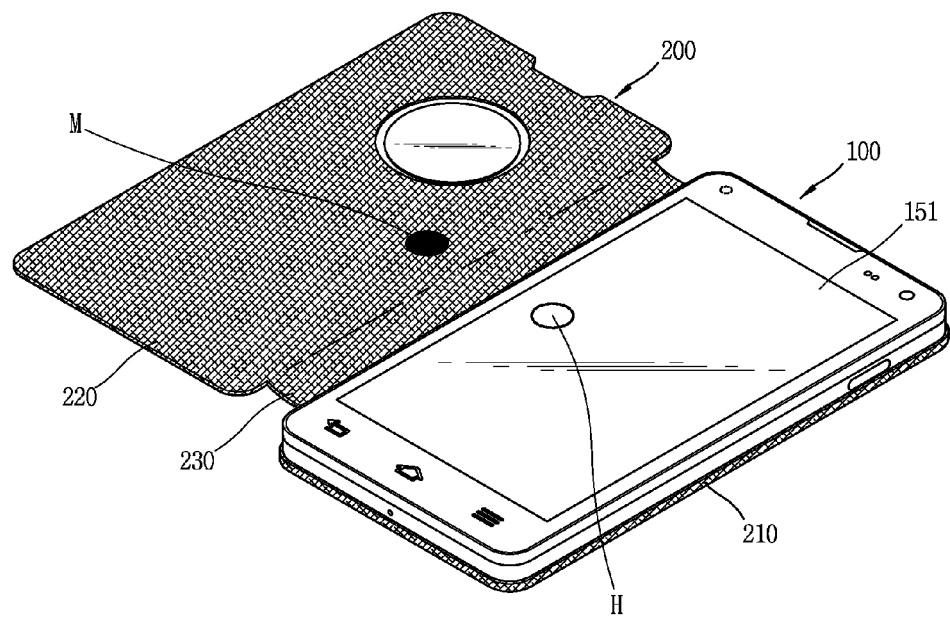
FIGS. 5A, 5B(a) and 5B(b) are embodiments illustrating a combination of a Hall-effect device and a magnet for sensing the state of the cover.
Figure 5B:
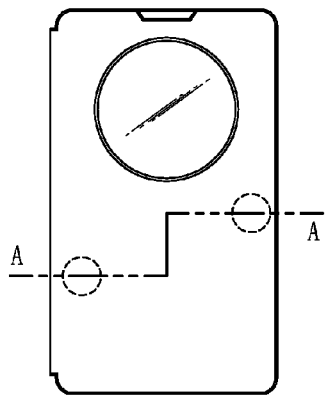
Figure 5B:
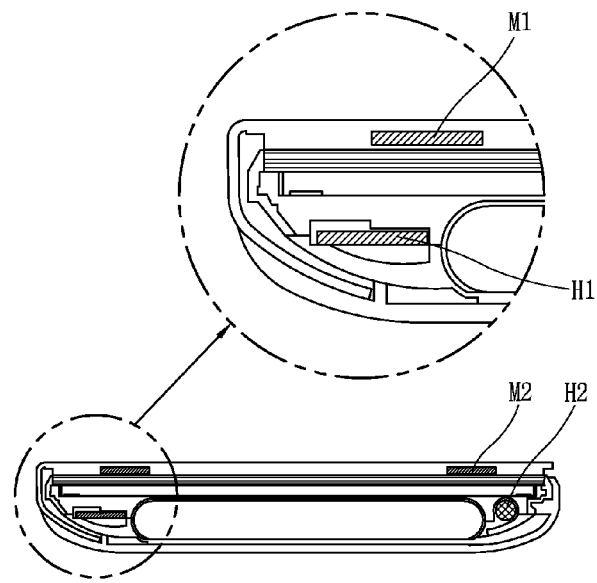

FIGS. 5A, 5B(a) and 5B(b) are embodiments illustrating a combination of a Hall-effect device and a magnet for sensing the state of the cover; according to exemplary embodiments.

Referring to FIG. 5A, the terminal is formed to sense opening/closing of the display unit through the cover 200. As an example, a magnet M may be mounted in the cover 200, and a sensor corresponding to the magnet may be mounted in the terminal. The sensor may be, for example, a Hall-effect device H for sensing magnetic fields. However, the present disclosure is not necessarily limited thereto. For example, the state in which the cover 200 covers the display unit may be recognized using a proximity sensor, or may be recognized using an illumination intensity sensor. As such, that the terminal senses the opening/closing of the display unit through the cover may be identically applied to a modification or another exemplary embodiment of the present disclosure.

Referring to FIG. 5B, one or more magnets M1 and M2 may be attached to the cover 200, a plurality of Hall-effect devices H1 and H2 may be disposed in the main body to respectively sense a state in which the cover 200 covers the front surface of the terminal and a state in which the cover 200 covers the rear surface of the terminal. More specifically, the plurality of Hall-effect devices H1 and H2 include first and second Hall-effect devices H1 and H2, and first and second magnets M1 and M2 respectively corresponding to the first and second Hall-effect devices H1 and H2 may be disposed at positions not opposite to each other at both edges of the cover, respectively. The degree of freedom with respect to the position of the magnet or Hall-effect device can be increased.

As another example, in order to sense the state in which the cover covers the rear surface of the main body, a magnet may be mounted in any one of the cover front part and the cover rear part, and a Hall-effect device for magnetic fields of the magnet may be mounted in the other of the cover front part and the cover rear part. For example, in the exemplary embodiment of FIG. 5A, the Hall-effect device may be mounted in the cover rear part. In this case, the Hall-effect device of the terminal may sense the state in which the cover front part covers the front surface of the main body, and the Hall-effect device of the cover rear part may sense the state in which the cover front part covers the rear surface of the main body.

Meanwhile, the structure of the sensor portion of the present disclosure may be modified in various forms. Hereinafter, these modifications will be described in detail with reference to FIGS. 6A(a), 6A(b), 6B(a), 6B(b), 6C, 6D, 6E(a) and 6E(b).

FIGS. 6A(a), 6A(b), 6B(a), 6B(b), 6C, 6D, 6E(a) and 6E(b) are conceptual views illustrating the modified examples of the sensor unit, respectively.

Referring to FIG. 6A, the sensor portion 250 for sensing a user motion with respect to the inside of the window portion 240 is not provided to the cover but provided to the main body of the mobile terminal.

As an example, referring to FIG. 6A(a), the sensor portion 250 and a rear input unit 223 may be disposed at the rear surface of the terminal. In exemplary embodiments described below, the description of the rear input unit 223 will be replaced by that of the rear input unit described with reference to FIG. 3B. For example, the sensor portion mounted at the rear surface of the terminal may independently sense a user motion with respect to the window portion 240.

More specifically, the sensor portion 250 includes at least one sensor 251 disposed at one side of the rear input unit 223. The sensor 251 is formed to sense a user motion with respect to the inside of the window portion 240, and may be, for example, an infrared ray sensor, a laser sensor, a photo sensor, or the like. The sensor 251 is disposed to be overlapped with the window portion 240 in the state in which the front cover portion 220 covers the rear surface of the main body. As shown in this figure, a camera 221 is disposed at an upper side of the rear input unit 223. The camera 221 may be overlapped with the window portion 240 in the state in which the front cover portion 220 covers the rear surface of the main body. Accordingly, the sensor 251 or a combination of the camera 221 and the sensor 251 can sense a user motion with respect to the inside of the window portion 240 in the state in which the front cover portion 220 covers the rear surface of the main body.

As another example, referring to FIG. 6A(b), the sensor portion 250 may have a first sensor 251a disposed at one side of the rear input unit 223, and a second sensor 251b disposed at the other side of the rear input unit 223. The first sensor 251a may be disposed at the same position as that of FIG. 6A(a), and the second sensor 251b may be disposed at the opposite side based on the rear input unit 223.

Figure 6B:
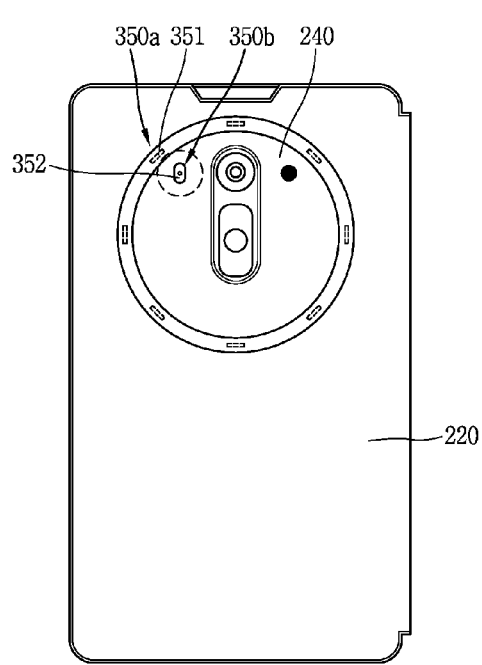
FIGS. 6A(a), 6A(b), 6B(a), 6B(b), 6C, 6D, 6E(a) and 6E(b) are conceptual views illustrating the modified examples of the sensor unit, respectively.
Figure 6B:
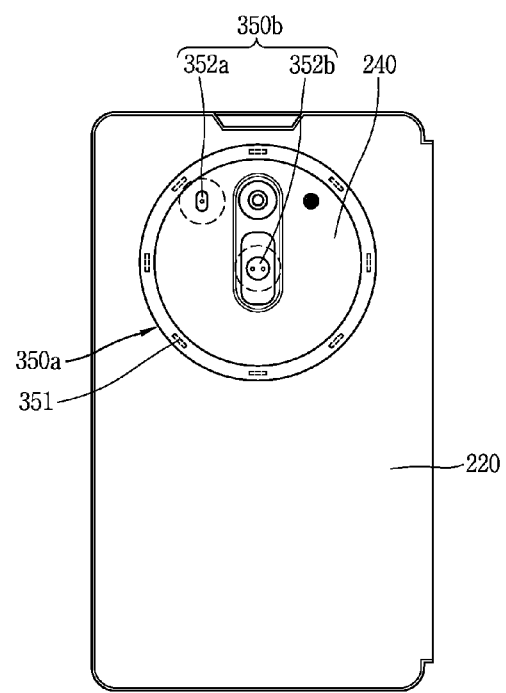

Referring to FIG. 6B, a sensor portion 350 for sensing a user motion with respect to the inside of the window portion 240 may be formed with a combination of a first sensor portion 350a mounted in the cover and a second sensor portion 350b mounted in the terminal.

As an example, referring to FIG. 6B(a), the first sensor portion 350a has at least one sensor 351 disposed at the edge portion of the window portion 240 as described with reference to FIGS. 3A and 3B.

The second sensor portion 350b has at least one first sensor 352 disposed at one side of the rear input unit 223. The first sensor portion 350a is formed, in connection with the second sensor 350b, to sense a user motion with respect to the inside of the window portion 240, and may be, for example, an infrared ray sensor, a laser sensor, a photo sensor, or the like. The first sensor 352 is disposed to be overlapped with the window portion in the state in which the front cover portion 220 covers the rear surface of the main body.

As another example, the first sensor portion 350a mounted in the cover has at least one sensor 351 disposed at the edge portion of the window portion 240. Referring to FIG. 6B(b), the second sensor portion 350b may have at least one first sensor 352a disposed at one side of the rear input unit 223, and a second sensor 352b disposed inside of the rear input unit 223. In this case, the key button may be formed to have the light transmissive property so that the sensing of the second sensor 352b is possible, or a through-hole may be formed at a position opposite to the second sensor 352b in the key button.

The user motion with respect to the inside of the window portion 340 can be sensed by the combination of the first and second sensor portions 350a and 350b.

Meanwhile, the sensor portion for sensing a user motion with respect to the inside of the window portion may be provided at the rear surface of the mobile terminal.

Figure 6C:
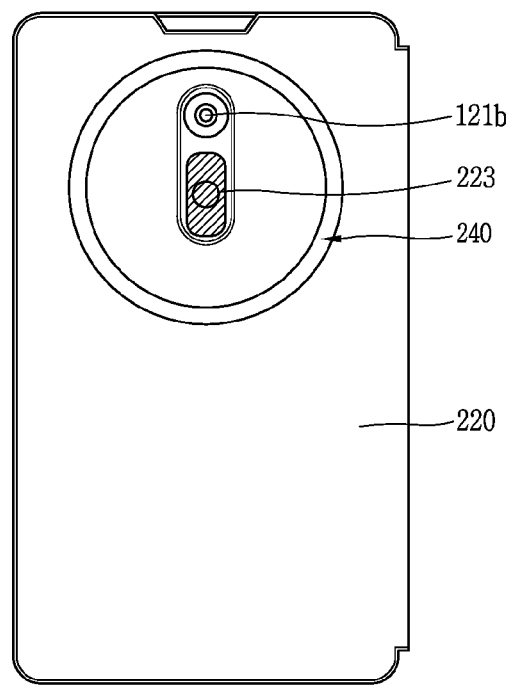

Referring to FIG. 6C, at least part of the rear input unit 223 of the mobile terminal may be implemented in a form where a touch input is possible. As an example, at least one of key buttons of the rear input unit is formed so that a touch input is possible as well as a push input.

The window portion 240 of the front cover portion 220 may be disposed at a position where the rear input unit 223 is exposed to the outside. That is, the window portion 240 and the rear input unit 223 are overlapped with each other in the state in which the front cover portion 220 covers the rear surface of the main body, and accordingly, the rear input unit 223 can be exposed to the outside. According to the structure described above, a user motion applying a tap (or tap input) to the rear input unit at the inside of the window portion 240 can be sensed in the state in which the front cover portion 220 covers the rear surface of the main body. Thus, the rear input unit acts as the sensor portion.

However, the present disclosure is not necessarily limited thereto. Separately from the rear input unit, a touch sensing means may be provided at a portion exposed to the outside by the window portion 240. In this case, the touch sensing means acts as the sensor portion.

Figure 6D:
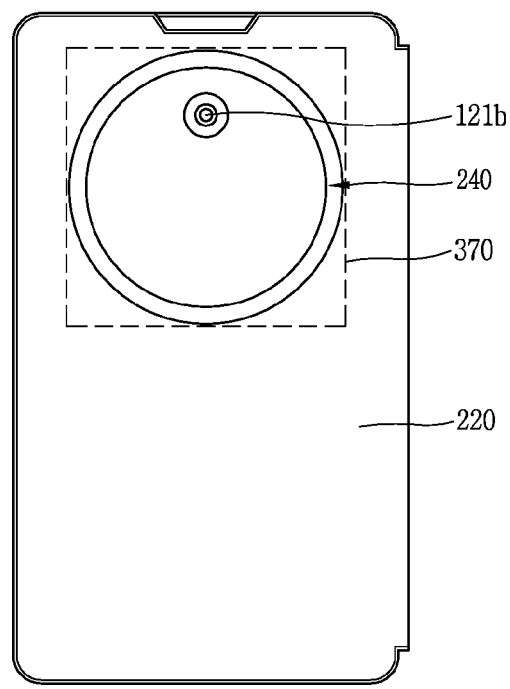

As still another example, as shown in FIG. 6D, a touch sensing means having a form different from the rear input unit described above may be provided at the portion exposed to the outside by the window portion 240. In this case, the touch sensing means acts as the sensor portion.

More specifically, as shown in FIG. 6D, a touch sensing area 370 may be formed in a size greater than that of the window portion. The touch sensing area 370 may be implemented as a touch pad module or optical sensor module is mounted to the rear surface of the mobile terminal. The touch sensing area 370 is formed to sense a touch input with respect to the rear surface of the terminal. In this case, a through-hole with a size corresponding to that of the touch sensing area is formed in the rear cover portion of the cover to expose the touch sensing area to the outside.

Meanwhile, as described in FIGS. 6A and 6B, the sensors disposed in the terminal or the sensor provided in the cover may be activated in the state in which the front cover portion 220 covers the rear surface 103 of the terminal or in the state in which the front cover portion 220 is rotated to be overlapped with the rear cover portion 210.

Further, as shown in FIGS. 6C and 6D, the touch sensor disposed at the rear surface of the terminal may be activated in the state in which the front cover portion 220 covers the rear surface 103 of the terminal or in the state in which the front cover portion 220 is rotated to be overlapped with the rear cover portion 210. That is, the controller 180 may sense a user motion by activating the touch sensor disposed at the rear surface, described in FIGS. 6C and 6D (or the sensor for sensing a user motion with respect to the rear surface, described in FIGS. 6A and 6B), in the state in which the front cover portion 220 covers the rear surface 103 of the terminal or in the state in which the front cover portion 220 covers the rear cover portion 210. Accordingly, in the present disclosure, it is possible to prevent the unnecessary consumption of power in a situation where it is unnecessary to sense a user motion with respect to the rear surface.

Meanwhile, the state in which the front cover portion 220 covers the rear surface 103 of the main body of the mobile terminal 100 may be sensed in various manners. As an example, at least one magnet may be mounted to sense a state in which the cover covers the front or rear surface of the main body, and at least one Hall-effect device corresponding to the magnet may be provided in the main body.

The controller 180 may decide whether the cover covers the rear surface or the front surface, using that magnetic fields formed by the magnet are sensed through the Hall-effect device.

In this state, the controller 180 senses whether the front cover portion 220 covers or does not cover the front surface of the main body. If the front cover portion 220 does not cover the front surface of the main body, the controller 180 may consider that the cover covers the rear surface of the main body.

Alternatively, a plurality of Hall-effect devices may be provided in the main body of the terminal, and the controller 180 may decide whether the front cover portion 220 covers the front or rear surface of the main body.

As still another example, the cover may have the rear cover portion 210 mounted at the rear surface of the main body, and the front cover portion 220 rotatably connected to the rear cover portion 210, the front cover portion 220 having the window portion 240 disposed therein. In order to sense a state in which the cover covers the rear surface, a magnet may be mounted in any one of the rear cover portion 210 and the front cover portion 220, and a Hall-effect device for sensing magnetic fields of the magnet may be mounted in the other of the rear cover portion 210 and the front cover portion 220. Thus, the controller 180 can sense whether the front cover portion 220 covers the rear surface of the terminal, based on a signal corresponding to magnetic fields formed by the magnet and the Hall-effect device, disposed in the cover.

In this manner, if the state in which the cover covers the rear surface of the main body of the terminal, the controller 180 may sense a user motion with respect to the main body by activating the touch sensor disposed at the rear surface of the terminal.

The touch sensing area may be configured as a touch screen. As an example, the touch sensing area may include a display unit (not shown) (hereinafter, referred to as a rear display unit) for displaying simple information even in a state in which the main body of the terminal is turned over. The rear display unit may include an organic light-emitting diode (OLED), a flexible display, a 3D display, and the like.

The simple information displayed by the rear display unit may become a key button that is an object to be input through a touch pad module or optical sensor module. For example, a virtual keyboard may be output on the rear display unit, and the display unit may receive information input from a user through a touch input with respect to the virtual keyboard.

As another example, the terminal may be controlled using a tap input with respect to the touch sensing area. Hereinafter, several operations described in other exemplary embodiments may be implemented by tap inputs with respect to the touch sensing area.

As still another example, the activation of the rear display unit may be determined by a tap input with respect to the touch sensing area. More specifically, if a tap input is applied to the touch sensing area in a state in which the rear display unit is non-activated, the rear display unit may be activated. If a tap input is applied to the touch sensing area in a state in which the rear display unit is activated, the rear display unit may be non-activated.

Meanwhile, it has been described in FIGS. 6A, 6B, 6C and 6D described above that the sensor disposed at the rear surface or the sensor provided in the cover is activated in the state in which the cover covers the rear surface of the terminal. However, in the mobile terminal according to the present disclosure, a user motion with respect to the rear surface of the terminal can be sensed even though the cover 200 is not coupled to the terminal.

Figure 6E:
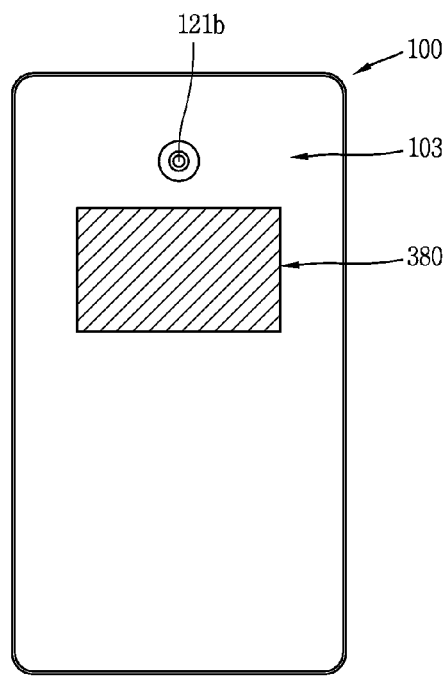
Figure 6E:
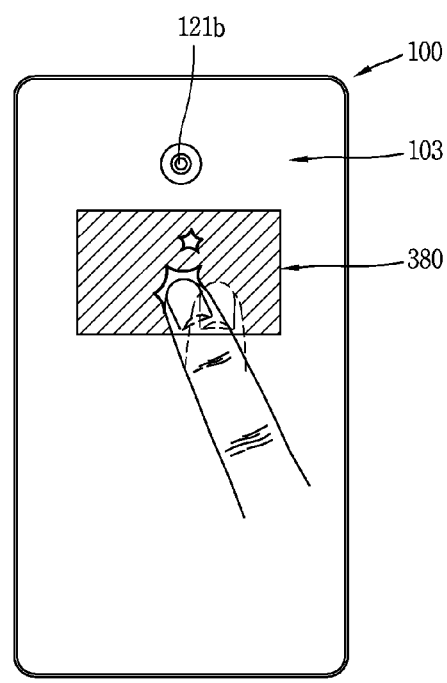

As shown in FIG. 6E(a), a touch sensing region 380 may be provided to at least part of the rear surface 103 of the mobile terminal according to the present disclosure. The touch sensing region 380 may be implemented as a touch pad module or optical sensor module is mounted at the rear surface of the terminal. The controller 180 may sense a user motion with respect to the rear surface 103 of the terminal through the touch sensing area provided as shown in this figure. Meanwhile, when a user motion corresponding to a predetermined manner is sensed, the touch pad module, etc. provided in the touch sensing region 380 may be activated. After the touch pad module is activated, the controller 180 may sense a user motion with respect to the touch sensing region 380, and perform control corresponding to the sensed user motion.

For example, as shown in FIG. 6E(b), the user motion corresponding to the predetermined manner, which activates the touch pad module corresponding to the touch sensing region 380, may be a tap touch having a predetermined number of times. Although not shown in this figure, the user motion corresponding to the predetermined manner, which activates the touch pad module corresponding to the touch sensing region 380, may be a long touch maintained for a predetermined time.

Further, when any user motion is not applied to the touch sensing region 380 for a predetermined time, the state of the touch pad module corresponding to the touch sensing region 380 may be switched to the non-activation state. Alternatively, when the user motion corresponding to the predetermined manner is applied to touch pad module corresponding to the touch sensing area, the touch pad module may be non-activated.

The user motions by which the touch pad module corresponding to the touch sensing region 380 is activated and non-activated may be motions identical to each other or motions different from each other.

Hereinafter, a method for controlling the terminal using a user motion with respect to the terminal will be described in detail with reference to the accompanying drawings.

The user motion with respect to the terminal may be variously changed. As an example, the user motion may be a gesture tapping the rear surface of the mobile terminal once or plural times. The gesture tapping the main body as described above may be referred to as a 'tap' or 'tap gesture'. As another example, the user motion may be a touch gesture touching the rear surface of the mobile terminal. As still another example, the user motion may be a tap (or tap input) or tap gesture tapping a side surface of the terminal. As still another example, the user motion may be a touch gesture touching a side surface of the terminal.

Meanwhile, the mobile terminal according to the present disclosure may have at least one sensor, to sense at least one of the user motions described above.

As an example, the mobile terminal according to the present disclosure may have an acceleration sensor. A tap with respect to at least one of the rear and front surfaces of the terminal may be sensed through the acceleration sensor. Here, the acceleration sensor is a sensor capable of sensing a dynamic force including acceleration, vibration, impact or the like of the main body of the terminal. Accordingly, the controller 180 can sense a vibration or impact generated in the terminal by a tap tapping the terminal. The controller 180 can control an operation of the terminal, corresponding to that the vibration or impact is sensed.

As another example, in the mobile terminal according to the present disclosure, at least one touch sensor may be provided at the side or rear surfaces. The controller 180 may sense a tap or touch with respect to at least one of the side and rear surfaces, using the touch sensor.

As still another example, in the mobile terminal according to the present disclosure, a user motion may be sensed through at least one sensor provided in the cover 200 coupled to the mobile terminal. Particularly, the sensor provided in the cover 200 may be an infrared ray sensor. The infrared ray sensor, as described in FIG. 3A, may be disposed at an edge portion of the window portion 240, to sense a user motion with respect to the inside of the window portion 240. More specifically, the infrared ray sensor disposed at the edge portion of the window portion 240 may sense an object approaching the inside of the window portion 240 or an object existing near the window portion 240, using an electromagnetic force, infrared ray, or the like. Meanwhile, the infrared ray sensor provided in the window portion 240 may sense a user motion applied to the rear surface of the terminal in the state in which the cover covers the rear surface of the terminal.

As still another example, an infrared ray sensor may be disposed at the rear surface of the mobile terminal according to the present disclosure. The controller 180 may sense a user motion by combining information sensed by the infrared ray sensor disposed at the rear surface of the terminal and information sensed through the infrared ray sensor disposed at the edge portion of the window portion 240 in the state in which the cover covers the rear surface of the terminal.

As still another example, in the mobile terminal according to the present disclosure, a user motion may be sensed using a camera 121b disposed at the rear surface of the terminal. In this state, the controller 180 may sense a user motion by combining information sensed through the infrared ray sensor disposed at the edge portion of the window portion 240 and information obtained through the camera 121b, in the state in which the cover covers the rear surface of the terminal.

Figure 7A:
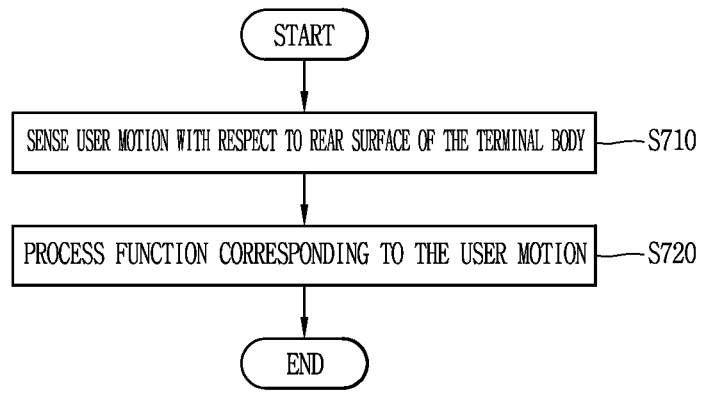
FIGS. 7A and 7B are flow charts for explaining a control method according to an embodiment of the present disclosure.
Figure 7B:
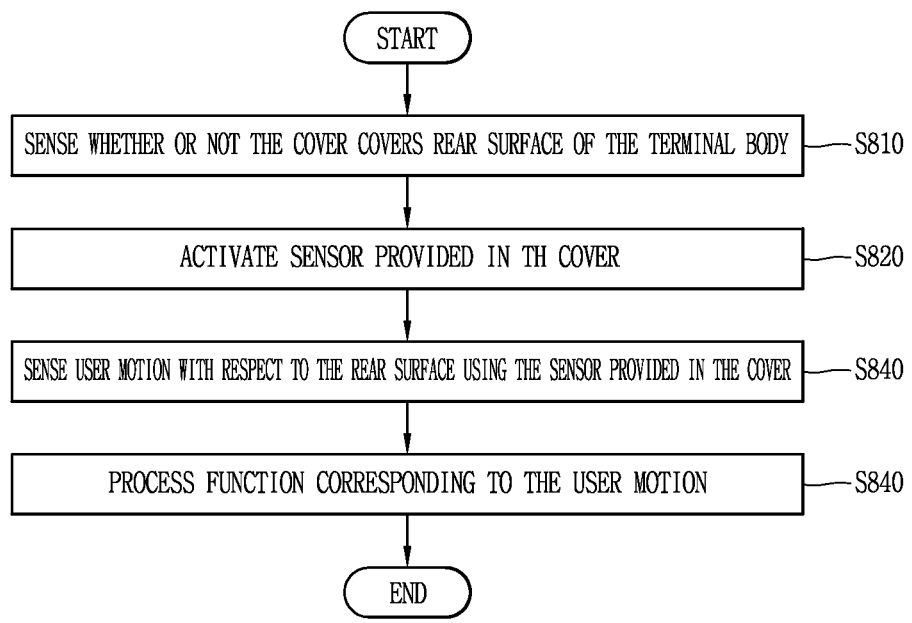

As described above, a mobile terminal according to the present disclosure may perform various controls in response to a user motion using various methods for sensing the user motion with respect to the terminal. Hereinafter, a method of controlling the operation of the terminal, particularly, using a user motion with respect to a terminal rear surface among the user motions with respect to the terminal will be first described with reference to the accompanying drawings. FIGS. 7A and 7B are flow charts for explaining a control method according to an embodiment of the present disclosure, and FIGS. 8A(a), 8A(b), 8B(a), 8B(b), 8B(c), 9A and 9B are conceptual views illustrating the foregoing control method.

First, a mobile terminal according to present disclosure senses a user motion with respect to a rear surface (or rear case 103, hereinafter, commonly referred to as a "rear surface") of the terminal body 100 (S710). Here, user motion may denote a gesture hitting a mobile terminal body 100 (particularly, rear surface) corresponding to a tap or tap gesture as described above. The method of sensing a user motion may sense it using at least one of a touch sensor, an acceleration sensor, a camera sensor and an infrared sensor.

The sensor unit can detect the presence and position of an object, such as the user's finger, within the perimeter of the window. Since the thickness of the cover is small, it can generally be assumed that the presence of an object within the perimeter of the window is likely to correspond to a touch to the portion of the rear surface of the terminal that is exposed by the window. Thus, the sensor unit can effectively act as a form of touch sensor for the rear surface of the terminal (when the cover is covering the rear surface).

Further, the sensor unit comprises one or more movement sensor (e.g., an acceleration sensor) to sense a movement of the body of the mobile terminal. The sensor unit com More specifically, a tap may be understood as an operation of lightly hitting the mobile terminal body 100 with a tap object such as a finger or the like or an operation of allowing it to be brought into contact with the mobile terminal body 100.

On the other hand, a tap object for applying such a tap may be a thing capable of applying an external force to the mobile terminal body 100, for example, finger, stylus pen, pen, pointer, first or the like. Meanwhile, the tap object may not be necessarily limited to a thing capable of applying a touch input to the mobile terminal according to the present disclosure, and any object can be used regardless of the type if it is a thing capable of applying an external force to the mobile terminal body 100 or object.

On the other hand, during the process of sensing a user motion corresponding to the tap, it can be determined that a "tap" for the purpose of the control of the mobile terminal is sensed only when at least two or more taps are applied within a reference period of time.

The controller 180 may determine that a "tap" for controlling one or more functions is sensed only when at least two or more (or a plurality of) taps are consecutively applied within a reference period of time by the sensing unit 140.

In other words, tap gestures may denote at least two or more tap gestures being consecutively sensed within a reference period of time. Hereinafter, sensing a "tap" may denote sensing that the mobile terminal body is hit substantially a plural number of times.

Moreover, the controller 180 may determine that "taps" are sensed only when the tap is applied within a "predetermined region" in addition to being sensed within the reference period of time. For example, the tap may denote a plural number of hitting consecutively sensed within a predetermined region within a reference period of time.

On the other hand, the reference period of time may be a very short period of time. Furthermore, the predetermined region may denote a small region in which positions to which the tap gestures have been applied are the same, or considered as the same position.

To this end, when initially hitting the mobile terminal body is sensed by the sensing unit 140, the sensing unit 140 may calculate a predetermined region from a position on which the initial hitting is sensed. Furthermore, when the next hitting is sensed subsequent to the initial hitting at the predetermined region within a reference period of time from a time point at which the initial hitting is sensed, the sensing unit 140 or controller 180 may determine that a tap has been sensed.

On the other hand, the foregoing reference period of time and predetermined region may be modified in various ways.

In this manner, being recognized as a control command when a plural number of taps are sensed or recognized as a control command when a plural number of taps are sensed within a predetermined region is to determine a user's intention on whether or not a user's tap to a terminal rear surface is applied to control the terminal. In other words, when a plural number of taps or a plural number of taps within a predetermined region are sensed, the controller 180 may determine it as the user applying a user motion for the control of the terminal. Accordingly, when the user inadvertently hits the terminal or hits the terminal without the purpose of controlling the terminal, his or her motion may not be processed as a control command, thereby controlling the operation of the terminal through closely reflecting the user's intention.

On the other hand, as described above, a mobile terminal according to the present disclosure may sense a tap to a terminal rear surface through an acceleration sensor or a touch sensor provided on the terminal rear surface.

The controller 180 may sense a tap hitting the terminal rear surface in case of using the acceleration sensor, and the controller 180 may sense a touch to the terminal rear surface as well as a tap hitting the terminal rear surface in case of using the touch sensor. Here, the controller 180 may sense a user motion corresponding to various types of touches such as a single touch, a double touch, a long touch, a flicking touch, a swipe touch, and the like. Meanwhile, here, the touch sensor may be provided on the entire terminal rear surface or provided on only part of the terminal rear surface.

On the other hand, a mobile terminal according to the present disclosure may be operated in a specific mode in which the minimum current or power is consumed even in a lock state to sense a tap through the acceleration sensor or touch sensor. The specific mode may be referred to as a "doze mode". Accordingly, a mobile terminal according to the present disclosure may sense a tap applied to the terminal body or a touch corresponding to the tap in a state that the illumination of the display unit 151 is off or in a doze mode.

Furthermore, a mobile terminal according to the present disclosure may use only either one of the acceleration sensor and touch sensor or user sequentially use the acceleration sensor and touch sensor or concurrently use the acceleration sensor and touch sensor. Meanwhile, when a tap is sensed through the touch sensor, it may be possible to more accurately find the location of the tap.

In this manner, when a user motion with respect to the terminal body, particularly, the rear surface of the body, is sensed, the process of processing a function corresponding to the sensed user motion is carried out (S720). In other words, when a tap (or user motion) corresponding to a preset condition is applied to a rear surface of the terminal body, the controller 180 may control at least one of functions that are executable on the terminal.

Figure 8A:
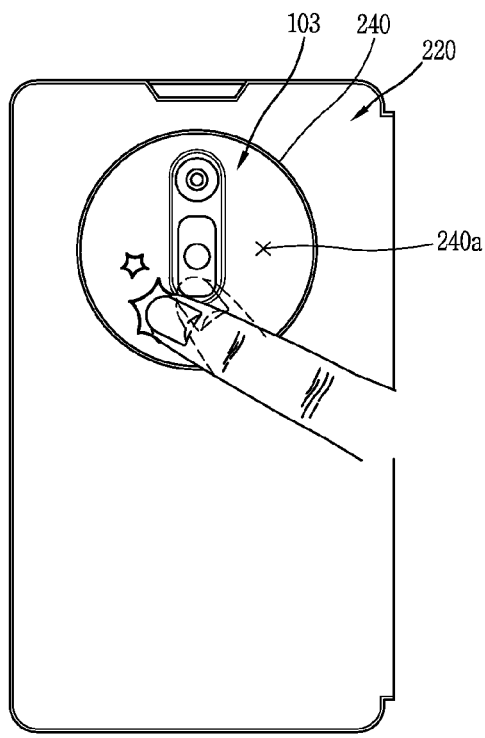
FIGS. 8A(a), 8A(b), 8B(a), 8B(b), 8B(c), 9A and 9B are conceptual views illustrating the foregoing control method.
Figure 8A:

For example, as illustrated in FIG. 8A(a), when one or plural number of taps are applied to the rear surface of the body, the controller 180 may perform a function that is executable on the terminal or specific function in response to said one or plural number of taps as illustrated in FIG. 8A(b).

Here, a function that is executable on the terminal may denote all types of functions that can be executed or driven in the mobile terminal. For example, one of the executable functions may be an execution function of an application installed in the mobile terminal. For example, "an arbitrary function is executed" may denote "an arbitrary application is executed or driven".

For another example, a function that can be executed in the terminal may be a function corresponding to the received event being processed. Here, the received event may be a message receiving event, a call receiving event, and the like. Meanwhile, the event may be an event occurred on an application installed in the mobile terminal.

For still another example, a function that can be executed in the terminal may be a function required for the basic driving of the mobile terminal. For example, for the function required for the basic driving, there may exist a function of turning on or off the lighting provided in the display unit 151, a function of switching a release state of the mobile terminal to a lock state or conversely switching the lock state to the release state, a function of setting a communication network, a function of changing the setting information of the mobile terminal, and the like.

In this manner, according to the present disclosure, when a tap to the rear surface of the mobile terminal body is applied, in particular, when the tap corresponds to a preset condition, the controller 180 may control at least one of executable functions on the mobile terminal.

On the other hand, here, the preset condition may be associated with at least one of a frequency, a location, a speed, a strength, a pattern and a region in which the tap is applied. For example, the controller 180 may control at least one of the executable functions only when the tap is applied three times.

On the other hand, the controller 180 may perform at least one control in response to a second tap only when the second tap is sensed within a preset period of time subsequent to sensing a first tap. In other words, the controller 180 may recognize it as a valid tap only when the second tap is sensed within a predetermined period of time subsequent to sensing the first tap, thereby determining whether the user wants to control the mobile terminal or inadvertently applies the tap.

Here, the numbers of first reference frequency and the second reference frequency may be the same or different. For example, the first reference frequency may be three times, and the second reference frequency may be twice. For another example, both the first and the second reference frequency may be above twice.

On the other hand, when a touch sensor is provided on a rear surface 103 of the mobile terminal body 100, a mobile terminal according to the display panel may perform different functions in correspondence to various types of touches, respectively, sensed through the touch sensor. For an example, the controller 180 may perform a first function (for example, home screen page display function) in response to a first type of touch (for example, single touch) to the touch sensor provided on the rear surface, and perform a second function (for example, display unit 151 illumination off function) in response to a second type of touch (for example, double touch).

As described above, a mobile terminal according to the present disclosure may control the mobile terminal in response to a user motion with respect to a rear surface of the terminal body. Moreover, a mobile terminal according to the present disclosure may sense a user motion with respect to the terminal rear surface using a sensor provided in the cover 200 in addition to a sensor provided in the terminal body.

More specifically, the controller 180 may sense a user motion through an infrared sensor disposed at an edge of the window portion 240 in a state that the cover, more particularly, the front cover portion 220, covers the terminal rear surface. More specifically, the infrared sensor disposed at an edge of the window portion 240 may detect an object approaching an inner side of the window portion 240 or an object existing in the vicinity using an electromagnetic field force, ultraviolet rays, and the like. Meanwhile, the infrared sensor provided in the window portion 240 may sense a user motion applied to the terminal rear surface in a state that the cover covers the rear surface.

When a user's motion with respect to the rear surface of the terminal body is sensed by a sensor disposed at the cover 200, the controller 180 process a function corresponding to the sensed user motion.

On the other hand, the controller 180 may sense a user motion with respect to an inner side of the window portion 240 in a state that the front cover portion 220 covers the rear surface 103 of the terminal or in a state that the front cover portion 220 is rotated to overlap with the rear cover portion 210, and the controller 180 may activate a sensor provided in the cover 200 to sense a user motion in a state that the front cover portion 220 covers the rear surface 103 of the terminal or in a state that the front cover portion 220 covers the rear cover portion 210. The sensor provided in the cover 200 is operated using power supplied from the terminal as described above, and thus unnecessary power may be consumed even in a situation that the sensing of a user motion is not required. As a result, according to the present disclosure, there is proposed a control method of sensing a user motion with respect to the rear surface in a state that the cover 200 covers the rear surface and processing the corresponding function.

To this end, a mobile terminal according to the present disclosure first senses whether or not the cover 200, more particularly, front cover portion 220, covers the rear surface 103 (S810). Here, a "state that the cover covers the rear surface" may denote a state that the front cover portion 220 covers the rear surface 103 of the terminal or a state that the front cover portion 220 is rotated to overlap with the rear cover portion 210.

On the other hand, the state the front cover portion 220 covers the rear surface 103 of the body 100 may be sensed in various ways. For an example, at least one magnet may be mounted on the cover 200 to sense the state of the cover covering the front surface or rear surface of the terminal body, and at least one Hall-effect device corresponding to the magnet may be provided in the body.

Furthermore, the controller 180 may determine whether the cover covers the rear surface or the cover covers the front surface using a magnetic field formed by the magnet being sensed through the Hall-effect device.

Here, the controller 180 may sense whether or not the front cover portion 220 covers the front surface of the body through the Hall-effect device and magnet, and when the cover is not in a state of covering the front surface of the body, the controller 180 may recognize it as a state that the cover covers the rear surface of the body.

On the contrary, the controller 180 may include a plurality of Hall-effect devices in the terminal body, and determine whether the cover 200 is in a state of covering the front surface of the body or in a state of covering the rear surface of the body.

For another example, the cover may be rotatably connected to the rear cover portion 210 mounted on the rear surface of the body, and include the front cover portion 220 disposed with the window portion 240, and a magnet may be mounted on either one of the rear cover portion 210 and front cover portion 220 and a Hall-effect device for sensing a magnet field of the magnet on the other one to sense a state that the cover covers the rear surface. Accordingly, the controller 180 may sense whether or not the front cover portion 220 is in a state of covering the terminal rear surface based on a signal corresponding to the magnetic field formed by the magnet and Hall-effect device disposed at the cover.

On the other hand, the present disclosure may not be necessarily limited to this, and a mobile terminal according to the present disclosure may sense a state of the front cover portion of covering the rear surface of the terminal body using various methods.

On the other hand, as described above, upon sensing a state that the cover covers the rear surface of the terminal body, the process of activating a sensor provided in the cover is carried out (S820).

Here, "activating a sensor provided in the cover" may be construed to have the meaning of "supplying operation power to a sensor provided in the cover" or "activating a sensor provided in the cover to sense a user motion" or "switching a sensor provided in the cover from a sleep mode to an operation mode". For example, a sensor provided in the cover may be operated using power supplied from the terminal, and thus the controller 180 may supply operation power to a sensor provided in the cover 200 such that the sensor provided in the cover 200 senses a user motion only in a state that the front cover portion 220 covers the rear surface of the terminal body. As a result, when operation power may be continuously supplied to a sensor provided in the cover 200, thereby preventing a case where unnecessary power is consumed in a situation that the sensing of the user motion is not required.

On the other hand, the process of sensing a user motion with respect to a rear surface of the terminal body using a sensor provided in the cover 200 in a state that the sensor provided in the cover 200 is activated is carried out (S830). Here, the user motion may be applied to a rear surface of the terminal body through the window portion 240 disposed at the front cover portion 220. As described above, the sensors disposed at the cover may be separated from one another along an outer circumference of the window portion 240, and disposed toward an inner side of the window portion, thereby sensing a user motion applied to an inner side of the window portion 240.

The sensor disposed at the cover 200 may sense a tap hitting a rear surface of the terminal body, a number of taps, a location to which the tap is applied, a number of tap objects (for example, finger) applying the tap, a holding time of the tap, and the like. More specifically, a plurality of infrared sensors may be disposed at the cover 200 as previously described above, thus sensing which area of the rear surface of the body the tap is applied to. Moreover, the controller 180 may sense various user motions using a plurality of sensors disposed at the cover 200. For example, the controller 180 may sense various types of motions through a plurality of sensors disposed at the cover 200 in addition to a tap motion such as a drag motion, a flicking motion, a swipe motion, and the like, thereby performing more various controls using various user motions.

Figure 8B:
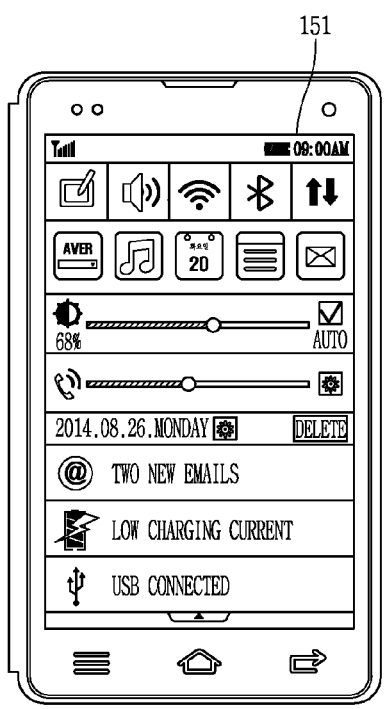
Figure 8B:
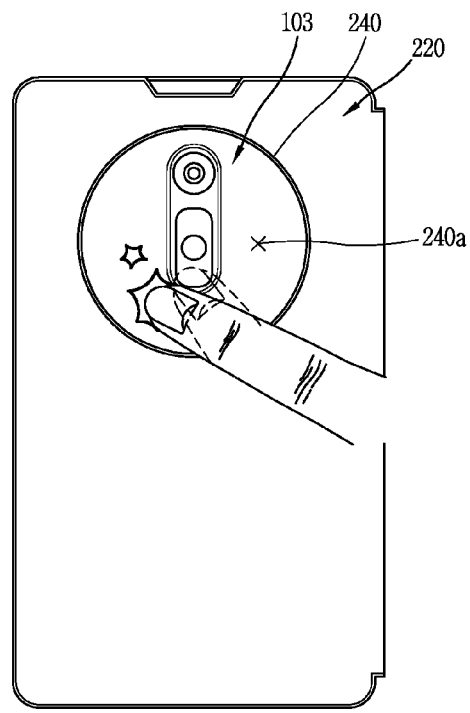
Figure 8B:
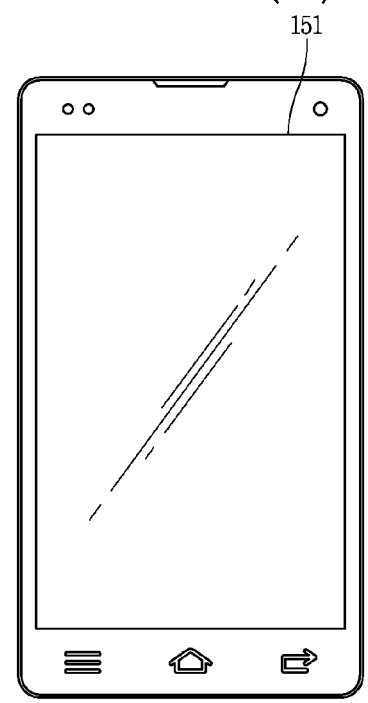

On the other hand, as described above, when a user motion with respect to a rear surface of the terminal body is sensed using a sensor provided in the cover 200, the process of processing the corresponding function (S840) is carried out (refer to FIG. 8B). For example, as illustrated in FIG. 8B(a), when a tap is applied to a rear surface of the terminal body through an inner side of the window portion 240, the controller 180 may perform a function that is executable on the terminal or specific function in response to tap as illustrated in FIG. 8B(b). For example, as illustrated in the drawing, the illumination of the display unit 151 may be turned off based on a tap with respect to the rear surface of the body.

Here, as described above, a function that is executable on the terminal may denote all types of functions that can be executed or driven in the mobile terminal. For example, one of the executable functions may be an execution function of an application installed in the mobile terminal. For example, "an arbitrary function is executed" may denote "an arbitrary application is executed or driven".

For another example, a function that can be executed in the terminal may be a function corresponding to the received event being processed. Here, the received event may be a message receiving event, a call receiving event, and the like. Meanwhile, the event may be an event occurred on an application installed in the mobile terminal.

For still another example, a function that can be executed in the terminal may be a function required for the basic driving of the mobile terminal. For example, for the function required for the basic driving, there may exist a function of turning on or off the lighting provided in the display unit 151, a function of switching a release state of the mobile terminal to a lock state or conversely switching the lock state to the release state, a function of setting a communication network, a function of changing the setting information of the mobile terminal, and the like.

Figure 9A:
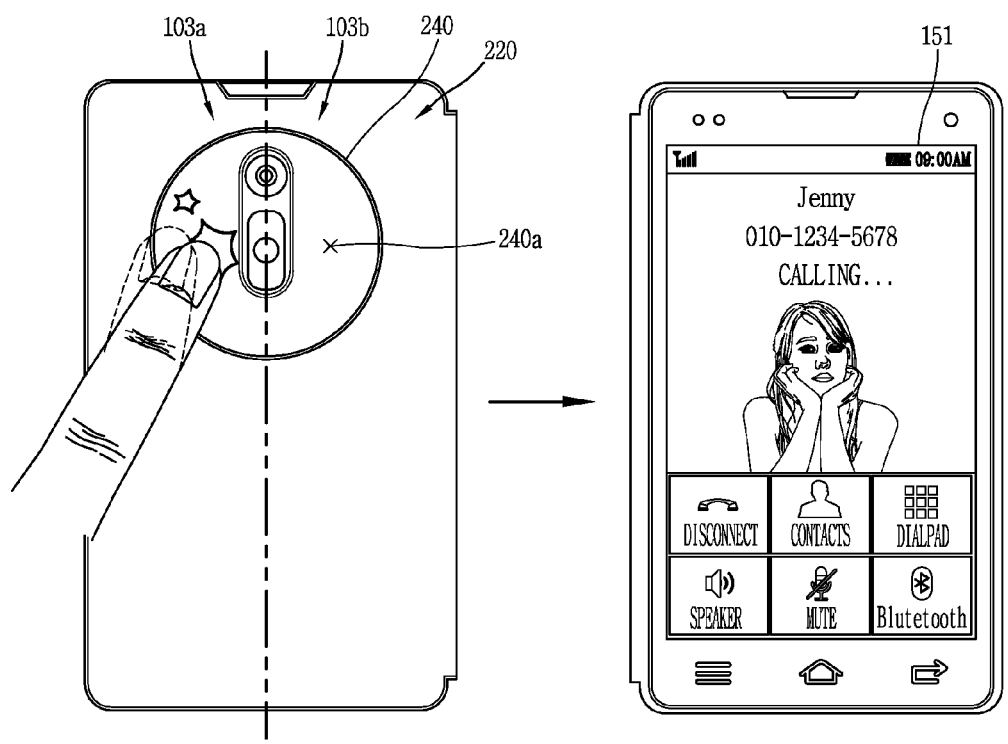
Figure 9B:
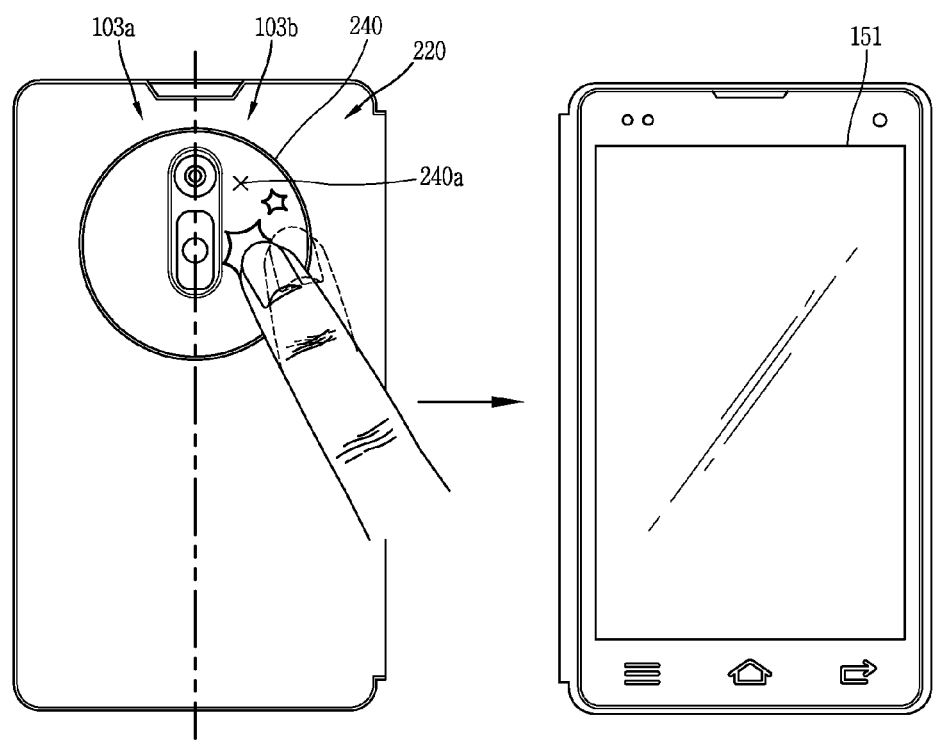

On the other hand, as described above, a mobile terminal according to the present disclosure may sense the location of a tap applied to a rear surface of the terminal body to perform a different function according to the location of the tap. For example, the controller 180 may perform a first function when a tap is applied to a left portion (103*a*, a left side in a state that the terminal rear surface views the user) of the rear surface of the terminal body as illustrated in FIG. 9A, and perform a second function which is different from the first function when a tap is applied to a right portion (103*b*, a right side in a state that the terminal rear surface views the user) of the rear surface of the terminal body as illustrated in FIG. 9B. For example, as described above, a mobile terminal according to the present disclosure may sense the location of a tap applied to a rear surface of the terminal body to perform a different function according to the location of the tap. For example, the controller 180 may display the screen information of an application corresponding to a call function when a tap is applied to a left portion of the rear surface of the terminal body as illustrated in FIG. 9A, and turn off the illumination of the 151 to execute a lock state when a tap is applied to a right portion of the rear surface of the terminal body as illustrated in FIG. 9B. In this manner, a mobile terminal according to the present disclosure may be linked with different functions, respectively, according to the location at which the tap is applied, and the type of the linked function may be determined based on the user's selection.

As described above, a mobile terminal according to the present disclosure may sense a user motion with respect to a rear surface of the terminal body and process the corresponding function using at least one of sensors provided in the terminal body or sensors provided in the cover.

On the other hand, in the above description, it has been described around a user motion applied to a rear surface of the terminal body through the window portion 240 disposed at the front cover portion 220 in a state that the cover covers the terminal body. As described above, the controller 180 may perform various controls in response to a user motion with respect to an inner region 240*a* of the window portion 240. Meanwhile, the inner region 240*a* of the window portion 240 may correspond to a touch sensing region 380 provided on the rear surface as previously illustrated in FIG. 6E, and for example, a terminal that does not have a sensor in the cover 200 may perform control based on a user motion with respect to the touch sensing region 380 provided on the rear surface other than the inner region 240*a* of the window portion 240.

Moreover, a terminal that does not have a sensor in the cover 200 may activate a touchpad module corresponding to the touch sensing region 380 (refer to FIG. 6E) provided on the rear surface rather than activating a sensor provided in the cover 200 in a state that the front cover portion 220 cover the rear surface.

Furthermore, for a terminal that does not have a cover, the steps of S810 and 820 may be substituted by the process of sensing a preset user motion associated with the activation of a touchpad module in the touch sensing region 380, and activating a touchpad module corresponding to the touch sensing region 380 in response to the sensed user motion.

As described above, a mobile terminal according to the present disclosure may sense a user motion with respect to a terminal rear surface through a sensor provided in the cover or a sensor provided on the rear surface of the terminal body, and thus the embodiments described in the present disclosure may be applicable to both the above two cases.

As a result, when a user motion is sensed through a sensor provided in the cover, the inner region 240*a* of the window portion 240 to which the user motion is applied may be understood to have the same or similar meaning to the touch sensing region 380 provided on the rear surface of the terminal body.

Figure 10A:
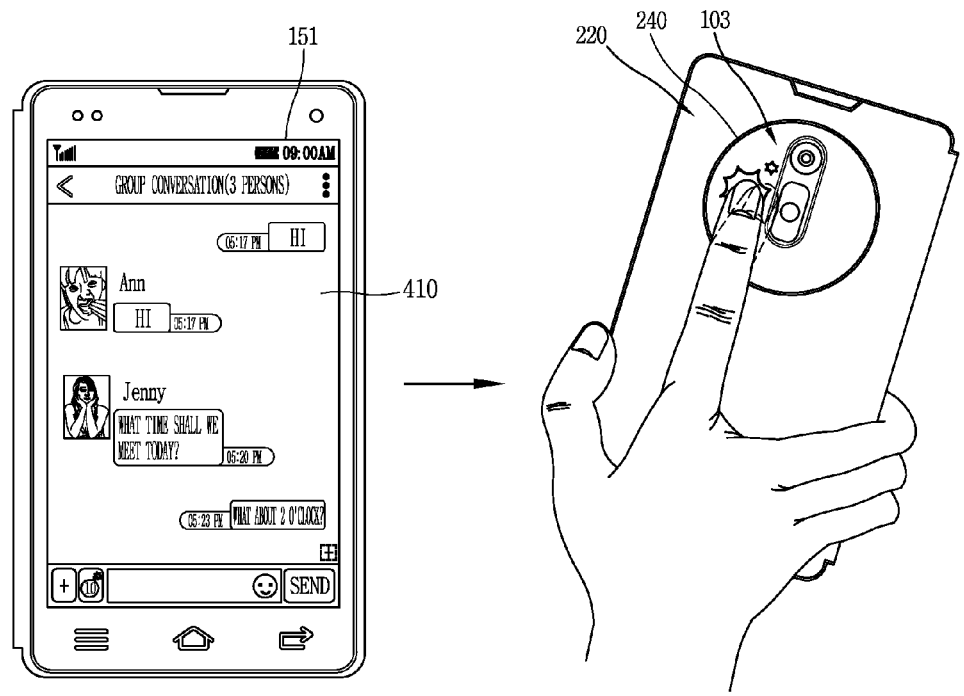
FIGS. 10A(a), 10A(b), 10B(a), 10B(b), 10B(c), 10C(a), 10C(b), 10C(c), 10C(d), 10D(a), 10D(b), 10D(c), 10E(a), 10E(b) and 10E(c) are conceptual views for explaining a method of controlling an application using a user motion with respect to a terminal rear surface in a mobile terminal according to the present disclosure.
Figure 10A:
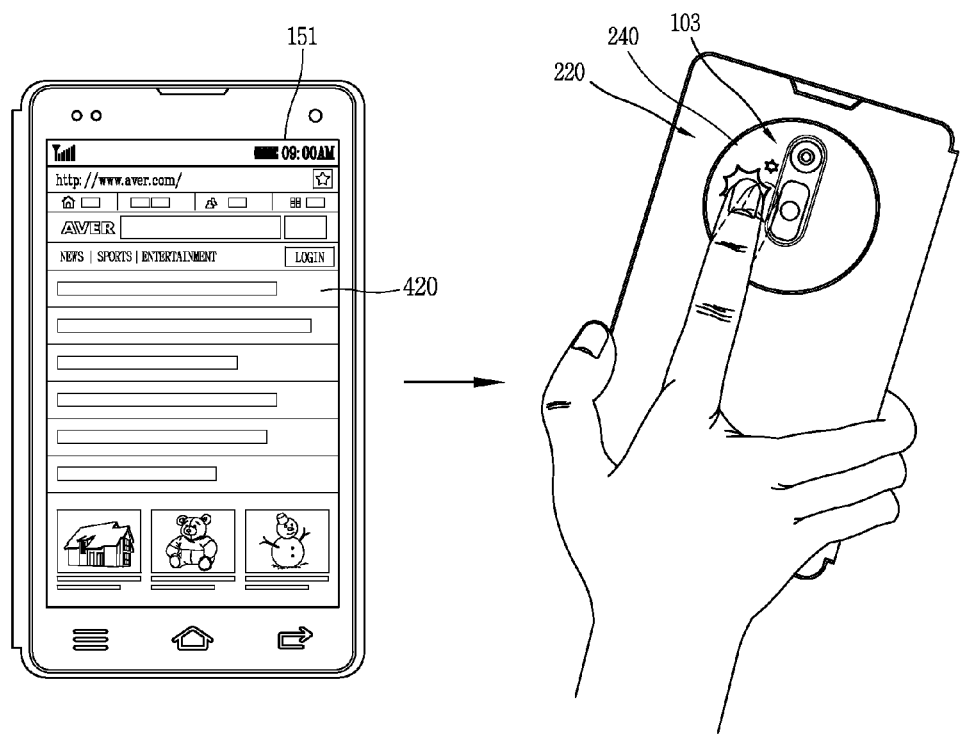

Hereinafter, a specific example in which the operation of a terminal is controlled in response to a user motion with respect to a rear surface of the body will be described. FIGS. 10A(a), 10A(b), 10B(a), 10B(b), 10B(c), 10C(a), 10C(b), 10C(c), 10C(d), 10D(a), 10D(b), 10D(c), 10E(a), 10E(b) and 10E(c) are conceptual views for explaining a method of controlling an application using a user motion with respect to a terminal rear surface in a mobile terminal according to the present disclosure.

Hereinafter, in case where the cover 200 is coupled to the terminal body, a method of sensing a user motion with respect to a rear surface of the terminal body through a sensor provided in the cover 200 will be described as an example, but it should be understood by those skilled in the art that the following examples can be also applicable similarly to a case where a user motion with respect to a rear surface of the terminal body is sensed through a sensor provided in the terminal body. As a result, for the following embodiment, additional description on a case where a user motion with respect to a rear surface of the terminal body is sensed through a sensor provided in the terminal body will be omitted.

A mobile terminal according to the present disclosure may provide a user environment that can easily and quickly approach a specific application, for example, an application frequently used by the user or an application desired to be used again by the user using a user motion with respect to the terminal, particularly, a user motion with respect to the terminal rear surface. In other words, a mobile terminal according to the present disclosure may display the screen information of a specific application again on the display unit 151 at any time using a user motion with respect to a rear surface of the terminal body even though the screen information of the specific application is not being currently displayed on the display unit 151.

More specifically, when a user motion with respect to the terminal, particularly, a user motion with respect to a rear surface of the terminal body, is sensed while using a specific application, a mobile terminal according to the present disclosure may provide a user environment that information on the specific application is stored, and then the screen information of the specific application is immediately displayed on the display unit 151 using the stored information when the screen information of the specific application is not currently being displayed on the display unit 151 or the specific application is not currently being driven. As a result, the user can enhance accessibility to an application desired to be used again by the user or an application frequently used by the user. Accordingly, the user may quickly enter a specific application at any time while using the mobile terminal.

As illustrated in FIG. 10A(a), first screen information 410 corresponding to a first application may be displayed on the display unit 151. Here, the first application may denote any one of a plurality of applications installed in the mobile terminal, and the first application may be an application selected and executed by the user among the plurality of applications.

Furthermore, the first screen information 410 may denoted an execution screen of the first application. In other words, screen information on which the first application is executed and displayed on the display unit 151 may be commonly referred to as first screen information.

For example, when a web browser function application is executed, the first screen information 410 corresponding to the web browser function application may be displayed on the display unit 151 as illustrated in FIG. 10A(a).

In this manner, when a preset user motion for the terminal is received in a state that the first screen information 410 corresponding to the first application is displayed, the controller 180 may store execution information on the first application in response to the user motion. Here, the execution information denotes information required to execute an application corresponding to the screen information displayed on the display unit 151 or display the screen information of the application again when there is a user request upon applying the user motion. The controller 180 may display the screen information of the application again on the display unit 151 with reference to the execution information when there is a user request.

The execution information on such an application may include at least one of a type of application, an execution time, a type of the first screen information 410 and driving state information of the application displayed on the display unit 151 upon applying the user motion.

On the other hand, the execution information may be stored in a random access memory (RAM) to be automatically deleted when the power of the terminal is turned off. In other words, the controller 180 may temporarily store execution information.

When there is a user request for the application with reference to the execution information, the controller 180 may display the screen information of the application that has been most recently displayed on the display unit 151.

Here, one of the preset user motions may be a tap applied to a rear surface of the terminal body. At this time, the user motion may be sensed through a sensor disposed on the cover 200. In other words, the user motion may be applied to an inner side of the window portion 240. Meanwhile, the preset motion may be defined as moving a terminal in a preset direction in addition to a tap to the rear surface of the terminal body. In other words, when a tap to the rear surface of the terminal body is sensed while the terminal moves in the preset first direction or the terminal moves in the preset first direction and then a tap to the rear surface of the terminal body is sensed, the controller 180 may store execution information on the first application as illustrated in FIG. 10A(a).

The execution information on the application is stored when a preset user motion is sensed as described above in a state that the screen information of the application is displayed. The execution information may be store in a plural number of times, for example, when the execution information on a first application is stored as illustrated in FIG. 10A(a), and then the preset user motion is applied while displaying the second screen information 420 of a second application as illustrated in FIG. 10A(b), the controller 180 may store the execution information of the second application. Here, both the execution information of the first and the second application may be stored in the memory unit 170.

In other words, unless execution information is deleted by a user's delete request for the prestored execution information or under the authority of the controller, the controller 180 may maintain the storage status of the prestored execution information even if there is an execution information store request for another application.

Accordingly, the user may provide a user environment capable of executing or using a user's desired application in a more intuitive and faster manner among a plurality of applications.

On the other hand, when the execution information of an application is stored based on a user motion, a mobile terminal according to the present disclosure may display visual information on the display unit to notify the user that the execution information of the relevant application has been stored.

Figure 10B:
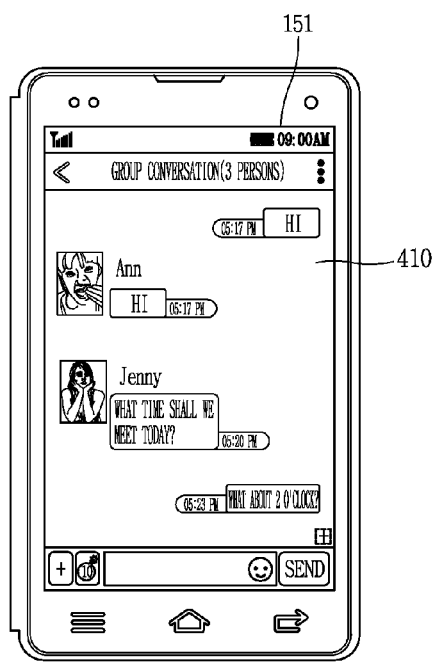
Figure 10B:
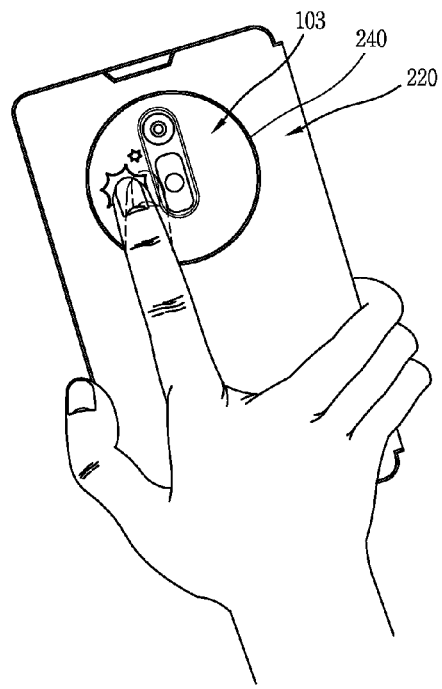
Figure 10B:
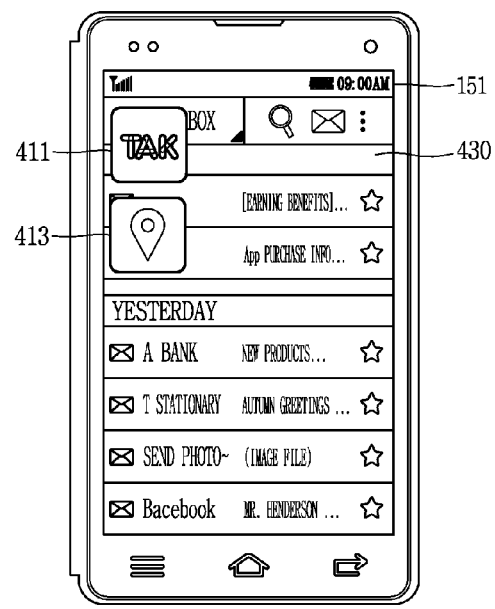

For example, when a preset user motion is applied to the terminal in a state that the screen information of the first application is displayed as illustrated in FIG. 10B(a), the controller 180 may display a graphic object 411 associated with the first application in one region of the display unit 151 as illustrated in FIG. 10B(c).

In other words, the controller 180 may display the graphic object 411 representing the first application in one region of the display unit 151. Furthermore, the visual image of the graphic object 411 may be the same or similar to at least part of the first screen information. Furthermore, the graphic object 411 may be displayed as a color representing the first application. Furthermore, the graphic object 411 may be an icon image linked to the first application. Furthermore, the visual information of the graphic object 411 may be changed in various ways.

On the other hand, when the execution information of an application which is different from the first application is also stored, the controller 180 may display a graphic object 413 corresponding to the different application along with the graphic object 411 corresponding to the first application as illustrated in FIG. 10B(c). Accordingly, the user may recognize the execution information of which application is currently stored in the memory unit 170.

In this manner, when a preset user motion associated with the storage of the execution information of an application is applied, the controller 180 may display a list including the graphic objects of the application and an application corresponding to the prestored execution information. The display of the list may be terminated on the display unit 151 based on a user's request or automatically disappear on the display unit 151 after a preset period of time has passed.

Furthermore, the graphic object or the list may be displayed on the display unit 151 based on a user's request.

The user request may be carried out in various ways, and may be also defined as a preset motion with respect to the terminal.

On the other hand, when a preset user motion associated with the execution information storage of an application corresponding to the screen information currently displayed on the display unit 151 is applied, the controller 180 may store the execution information of the application, and terminate the display of the screen information on the display unit 151. At this time, screen information 430 which is different from the first screen information 410 of the first application is displayed on the display unit 151. Here, information displayed as the different screen information 430 may be screen information (or an execution screen) of a different application from the first application or a standby screen. Here, the application which is different from the first application may be an application corresponding to screen information prior to displaying screen information corresponding to the first application or corresponding to most recently displayed screen information.

The first application may not be terminated even when the display of the first screen information 410 of the first application is terminated and the different screen information 430 is displayed in response to the preset user motion. The controller 180 may terminate the display of the first screen information 410 of the first application and continuously drive the first application on the background.

As described above, subsequent to storing the execution information of an application, the screen information of the application on which the execution information has been stored may be displayed again on the display unit based on a user's request.

Here, the user request may be defined as a preset user motion with respect to the terminal body. Here, one of the preset user motions may be a tap applied to a rear surface of the terminal body. At this time, the user motion may be sensed through a sensor disposed on the cover 200. In other words, the user motion may be applied to an inner side of the window portion 240. Meanwhile, the preset motion may be defined as moving a terminal in a preset direction in addition to a tap to the rear surface of the terminal body. In other words, when a tap to the rear surface of the terminal body is sensed while the terminal moves in the preset first direction or the terminal moves in the preset first direction and then a tap to the rear surface of the terminal body is sensed, the controller 180 may provide information on an application for which the execution information has been stored as illustrated in FIG. 10C(a).

On the other hand, a movement direction of the terminal body corresponding to a user motion corresponding to a user request for redisplaying information on an application for which the execution information has been stored may be a different direction from the movement direction corresponding to a user motion for storing the execution information of the application as illustrated in FIG. 10A. The movement directions may be directions opposite to each other.

Figure 10C:
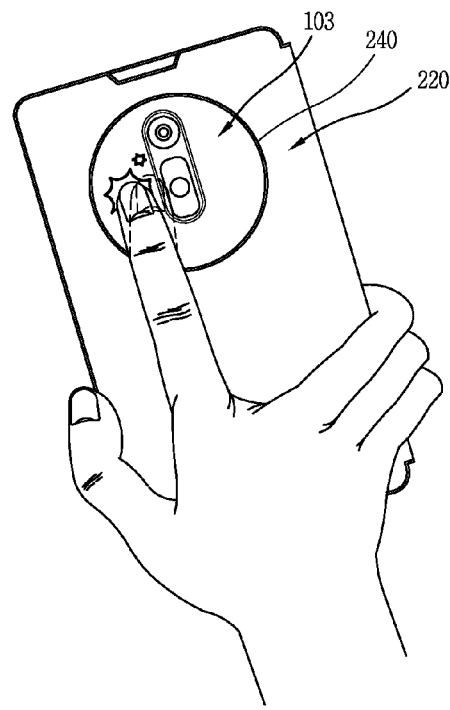
Figure 10C:
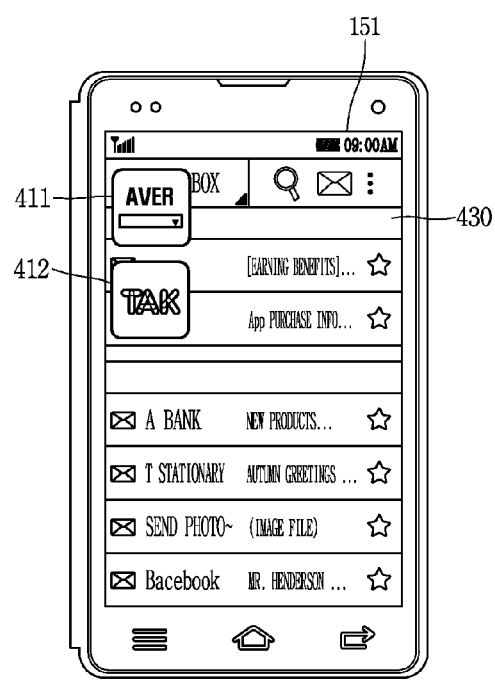
Figure 10C:
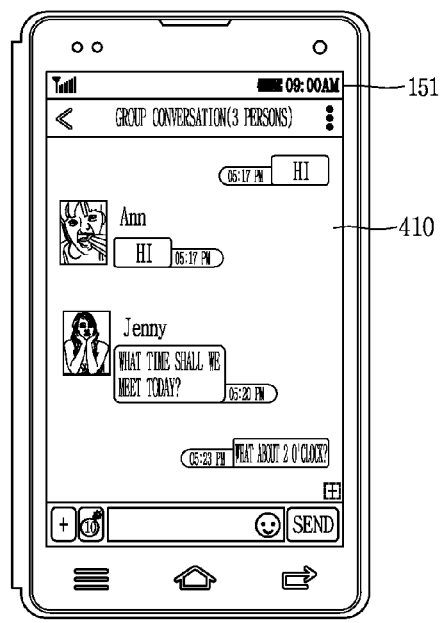
Figure 10C:
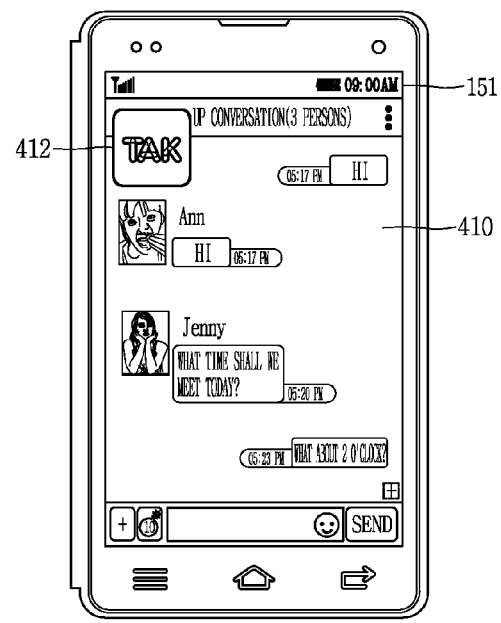

On the other hand, as illustrated in FIG. 10C(b), the controller 180 may display an application list for which the execution information has been stored or graphic objects 411, 412 in response to the preset user motion. Here, the application list for which the execution information has been stored or graphic objects 411, 412 may be displayed to overlap with screen information that has been displayed on the display unit 151 prior to applying the preset user motion. Furthermore, though not shown in the drawing, the application list for which the execution information has been stored or graphic objects 411, 412 may be displayed in a different region from the region in which the screen information that has been displayed on the display unit not to overlap with the screen information that has been displayed on the display unit 151.

On the other hand, when any one of the application list or graphic object 411, 412 is selected, the controller 180 may display the screen information 410 of an application corresponding to the selected graphic object as illustrated in FIG. 10C(d). The screen information may be a screen that has been finally displayed on the display unit 151 when the execution information of the application is stored. Moreover, the screen information 410 of an application corresponding to the selected graphic object may be screen information updated as the application is driven and executed on the background. In this case, the screen information of the application may not be a screen that has been finally displayed on the display unit 151 when the execution information of the application is stored.

For another example, the controller 180 may immediately display the screen information 410 of an application for which the execution information has been stored as illustrated in FIG. 10C(c) in response to a user request for redisplaying information on the application for which the execution information has been stored. Here, when there are a plurality of applications for which the execution information has been stored, the controller 180 may display the screen information 410 of an one of the plurality of applications on the display unit 151 and display a graphic object 412 corresponding to the remaining applications to overlap with the screen information 410.

The controller 180 may determine an application for which the screen information is to be displayed based on a preset criteria among a plurality of applications. For an example, the controller 180 may display the screen information of an application for which the execution information has been recently stored among the plurality of applications on the display unit. For another example, the controller 180 may display the screen information of an application for which the execution information has been initially stored among the plurality of application on the display unit. For another example, the controller 180 may determine an application for which the screen information is to be displayed among a plurality of applications based on the user's motion. For example, the user motion may be defined based on a location of the tap applied to the rear surface of the body, a number of taps, a pattern of the tap (defined by a plurality of taps) and the like. The controller 180 may determine an application for which the screen information is to be displayed among a plurality of applications based on a location of the tap applied to the rear surface of the body, a number of taps, a pattern of the tap (defined by a plurality of taps) and the like.

On the other hand, the graphic object 412 may disappear on the display unit 151 as illustrated in FIG. 10C(d) based on a user's request or based on the passage of a preset period of time.

On the other hand, when the graphic object 412 is selected by the user in a state that the graphic object 412 and screen information 410 are displayed at the same time as described above, the controller 180 may switch the currently displayed screen information 410 to the screen information of an application corresponding to the selected graphic object 412.

Furthermore, though not shown in the drawing, for another example, where there is a user request for redisplaying information on an application for which the execution information has been stored and there are a plurality of applications for which the execution information has been stored, the controller 180 may display the screen information of the plurality of applications at the same time on the display unit 151. In this case, the display region of the display unit 151 may be partitioned into a plurality of regions, and the screen information of different applications may be displayed in the partitioned display regions, respectively. Furthermore, when any one of screen information displayed in the plurality of regions, respectively, is selected, the controller 180 may switch screen information corresponding to the any one to an entire screen. In this case, the display of screen information displayed in the plurality of regions, respectively, may be terminated, and only screen information corresponding to the any one may be displayed on the display unit 151.

In this manner, according to the present disclosure, though a specific application is not currently used, in order to immediately use the specific application when it is desired to be used again later, the user may display the execution screen of the specific application again on the display unit 151 using a user motion to store execution information on the specific application, and then using a user motion which is different from the user motion. Accordingly, the user may quickly approach the specific application using a user motion.

On the other hand, a mobile terminal according to the present disclosure may delete the stored execution information from the memory unit 170 when a different preset user motion is applied in a state that the execution information of an application is stored based on a preset user motion.

In this case, even though there is a display request for the screen information of an application for which the execution information has been stored or a display request of a graphic object representing the application for which the execution information has been stored, the controller 180 does not display the screen information or graphic object.

In this manner, the controller 180 may delete the stored execution information in response to a preset user motion, thereby preventing the unnecessary occupation of the memory with a simple manipulation.

On the other hand, a user motion corresponding to a delete request for prestored execution information may be defined in various ways. For example, when a tap is applied to the rear surface of the terminal body in a state that graphic objects 411, 412 corresponding to the applications for which the execution information has been stored are displayed as illustrated in FIG. 10D(a), and in a state that the display unit 151 is moved to show the bottom as illustrated in FIG. 10D(b), or when a tap is applied to the rear surface of the terminal body while moving the display unit 151 to view the bottom (or ground), the controller 180 may delete the stored execution information as illustrated in FIG. 10D(c).

In other words, an operation in which the terminal is hit by the user in a state that the display unit 151 faces the bottom (or ground) is an operation similar to an operation in which the user vacates the trash in his or her life, and according to the present disclosure, the user can more intuitively control the terminal through a user motion based on the user's experience.

Figure 10D:
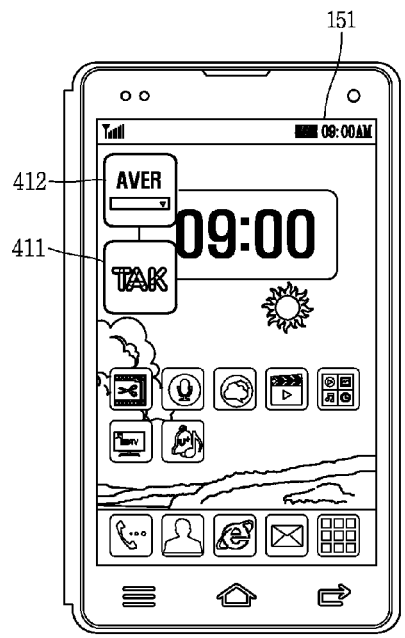
Figure 10D:
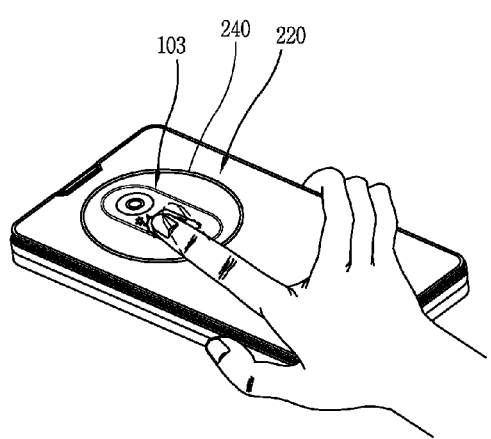
Figure 10D:

Furthermore, though not shown in the drawing, as illustrated in FIG. 10D(a), when a preset type of touch (for example, drag touch or flicking touch) is applied to any one graphic object in a state that graphic objects 411, 412 corresponding to applications for which the execution information has been stored are displayed, the controller 180 may delete only the execution information of an application corresponding to a graphic object to which the preset type of touch is applied. In this manner, according to the present disclosure, it may be possible to delete the entire stored execution information or selectively delete only the execution information based on the user's selection.

On the other hand, as illustrated in FIG. 10D, even when graphic objects corresponding to applications for which the execution information has been stored are not displayed, the controller 180 may delete the stored execution information when a preset user motion is applied to the terminal.

Figure 10E:
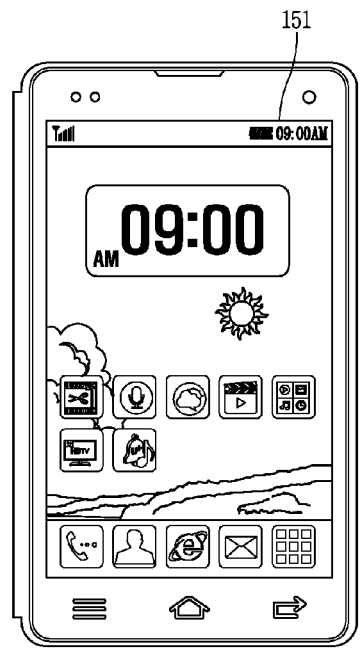
Figure 10E:
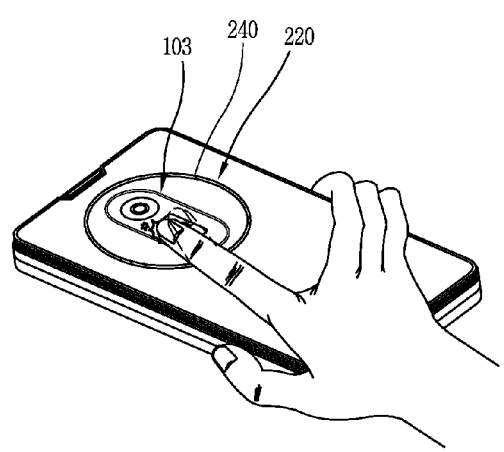
Figure 10E:

For example, when a user motion corresponding to the deletion of the execution information is applied as illustrated in FIG. 10E(b) in a state that any screen information is displayed on the display unit 151 as illustrated in FIG. 10E(a), the controller 180 may delete the stored execution information as illustrated in FIG. 10E(c). Here, the user motion may be a motion of tapping the rear surface of the terminal body in a state that the display unit 151 has been moved to view the bottom or a motion of tapping the rear surface of the terminal body whole moving the display unit 151 to view the bottom (or ground).

On the other hand, when the screen information of an application is stored based on the execution information, and then the screen information of an application is switched to another screen information or the application is terminated without reapplying a user motion for storing the execution information of the relevant application, the controller 180 may delete the stored execution information.

In this manner, according to the present disclosure, there is proposed a method of storing execution information on a specific application using a user motion to allow the user to immediately use the specific application when he or she wants to use it again later though the specific application is not currently used, and then using the specific application again in response to a user request. Accordingly, the user may quickly approach the specific application using a user motion. Moreover, execution information may be stored, used and deleted using an intuitive user motion, thereby enhancing the use convenience of the terminal.

Figure 11A:
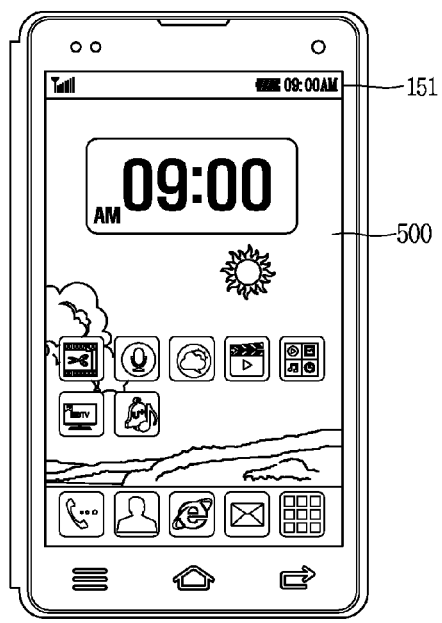
FIGS. 11A(a), 11A(b), 11A(c), 11B(a), 11B(b), 11B(c), 11C(a), 11C(b), 11C(c), 11C(d), 11D(a), 11D(b), 11D(c), 11E(a), 11E(b), 11E(c), 12A, 12B, 12C and 12D are conceptual views for explaining a method of controlling a terminal operation using a user motion with respect to a terminal rear surface in a mobile terminal according to the present disclosure.
Figure 11A:
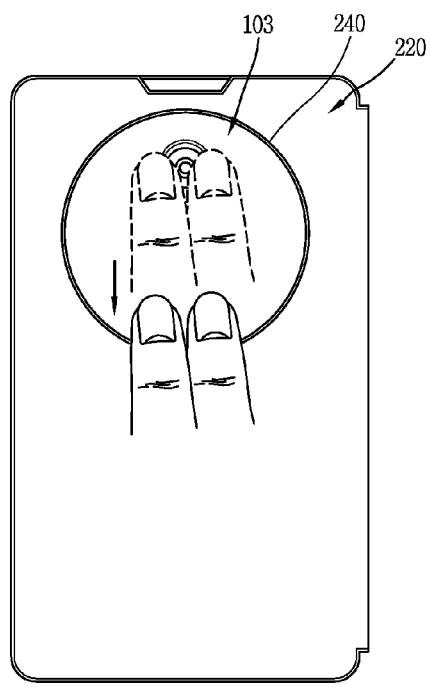
Figure 11A:
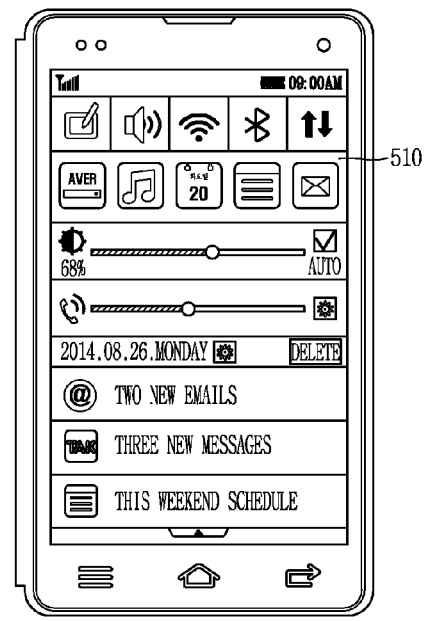

On the other hand, a mobile terminal according to the present disclosure may control screen information displayed on the display unit 151 based on a tap to the rear surface of the terminal body. When a tap to the rear surface of the body is sensed through a sensor disposed on the cover, the controller 180 is able to control information displayed on the terminal using a user motion sensed through a sensor provided on the cover. Hereinafter, a method of controlling a status display window for displaying information displayed on the mobile terminal, particularly, information associated with the function control of the mobile terminal, the check and control of an event that has occurred, and the like, using a user motion corresponding to a tap with respect to the rear surface of the terminal body will be described in more detail with reference to the accompanying drawings. FIGS. 11A(a), 11A(b), 11A(c), 11B(a), 11B(b), 11B(c), 11C(a), 11C(b), 11C(c), 11C(d), 11D(a), 11D(b), 11D(c), 11E(a), 11E(b), 11E(c), 12A, 12B, 12C and 12D are conceptual views for explaining a method of controlling a terminal operation using a user motion with respect to a terminal rear surface in a mobile terminal according to the present disclosure.

Information associated with the operation status of the mobile terminal (for example, wireless communication status, application update status, etc.), environmental status (for example, current time), event reception of an application, and the like may be displayed in one region in a mobile terminal according to the present disclosure. Said one region may be located adjacent to any one of the edge regions of the display unit, and a region displayed with the information may be referred to as a "status display line" or "status bar". Meanwhile, when a preset type of touch (for example, drag touch) is applied to a region displayed with the status display line, the controller 180 displays detailed information on information displayed on the status display line, an icon, a graphic object or the like associated with the function control of the terminal on the display unit 151.

The controller 180 may terminate the display of screen information displayed in a display area excluding the status display line prior to applying the preset type of touch to display detailed information on information displayed on the status display line, an icon, a graphic object or the like associated with the function control of the terminal in response to the preset type of touch to the status display line. Here, the controller 180 may control the display unit 151 to include detailed information on information displayed on the status display line, an icon, a graphic object or the like associated with the function control of the terminal on the information display window 510 (refer to FIG. 11A(b)), and gradually display the information display window 510 (refer to FIG. 11A(b)) in response to a preset type of touch to the status display line. At this time, the information display window 510 (refer to FIG. 11A(b)) may be displayed to overlap with screen information previously displayed on the display unit 151. The information display window 510 (refer to FIG. 11A(b)) may disappear on the display unit in response to a preset type of touch to the information display window 510 (refer to FIG. 11A(b)), and at this time, screen information that has been previously displayed on the display unit 151 prior to displaying the information display window 510 (refer to FIG. 11A(b)) may be displayed again.

When the preset type of touch is a drag touch, the controller 180 may display the information display window 510 (refer to FIG. 11A(b)) in response to a drag touch in a first direction to the status display line, and allow the information display window 510 (refer to FIG. 11A(b)) to disappear in response to a drag touch in a second direction opposite to the first direction to the information display window 510 (refer to FIG. 11A(b)).

In this manner, the information display window 510 (refer to FIG. 11A(b)) may be displayed or disappear based on a touch to the display unit 151, and according to the present disclosure, there is proposed a method capable of additionally controlling the information display window 510 (refer to FIG. 11A(b)) in addition to a touch to the display unit 151.

A mobile terminal according to the present disclosure may display the information display window 510 (refer to FIG. 11A(b)) on the display unit 151 in response to a preset type of user motion with respect to the rear surface of the terminal body. For example, when a preset type of user motion (for example, drag motion in a first direction) is applied to the rear surface (particularly, inner side of the window portion 240) of the terminal body as illustrated in FIG. 11A(b) in a state that any screen information 500 is displayed as illustrated in FIG. 11A(a), to controller 180 may display an information display window 510 as illustrated in FIG. 11A (c). The information display window 510 may be displayed on the display unit 151 in response to a drag motion in the first direction being applied to the terminal rear surface.

Figure 11B:
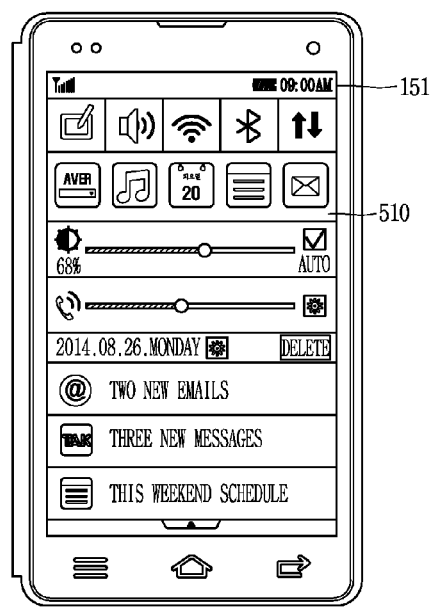
Figure 11B:
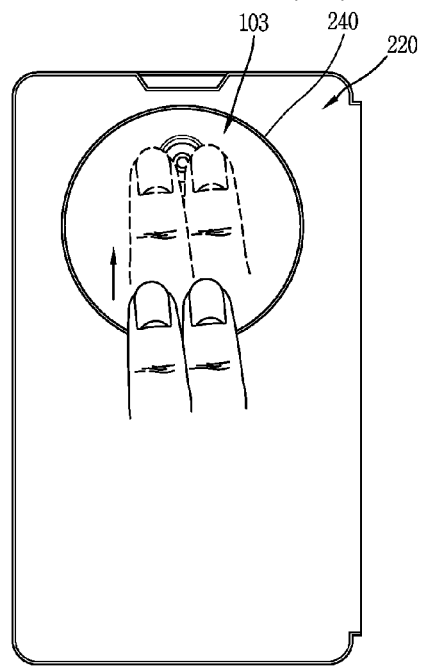
Figure 11B:
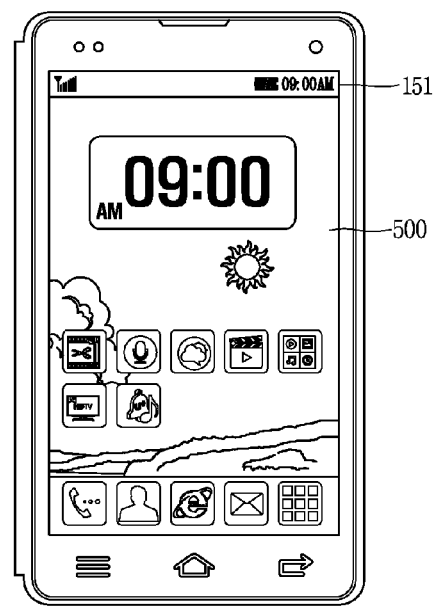

On the other hand, in this manner, the display of the displayed information display window 510 may be terminated as illustrated in FIG. 11B(c) in response to a preset user motion (for example, a drag motion in a second direction opposite to the first direction or a preset number of tap motions) as illustrated in FIG. 11B(b). In this case, the any screen information 500 that has been displayed on the display unit 151 prior to displaying the information display window 510 may be displayed again on the display unit 151.

On the other hand, the preset type of user motion may be defined in various ways in combination with a number of objects applying the motion (for example, number of fingers), a movement direction of the motion, a location to which the motion is applied, a frequency, and the like.

Moreover, a mobile terminal according to the present disclosure may perform control associated with information contained in the information display window using a user motion applied to the rear surface of the terminal body as illustrated in FIG. 11A(c).

Figure 11C:
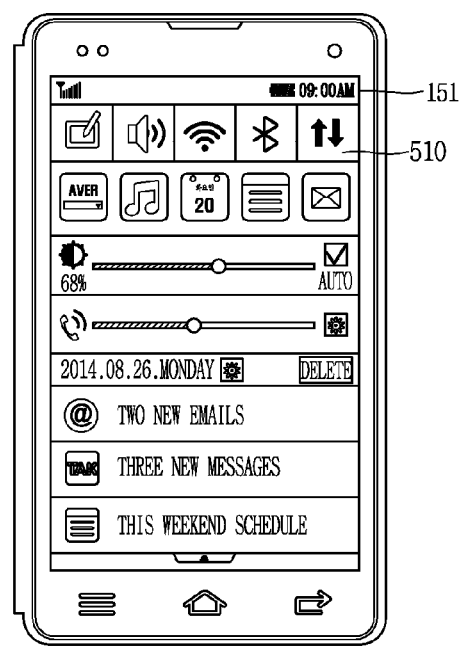
Figure 11C:
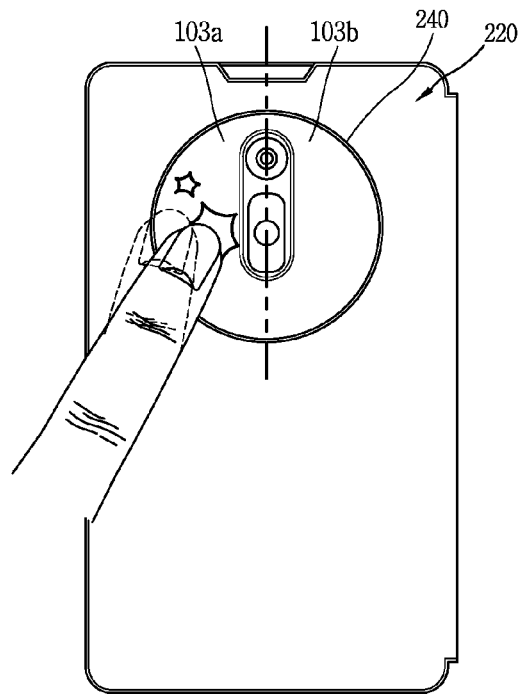
Figure 11C:
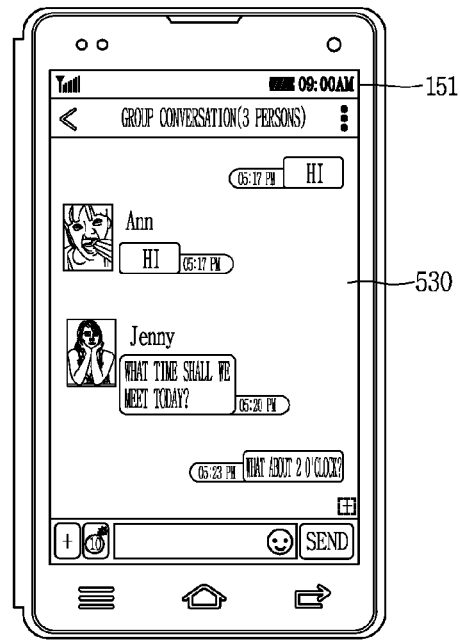
Figure 11C:
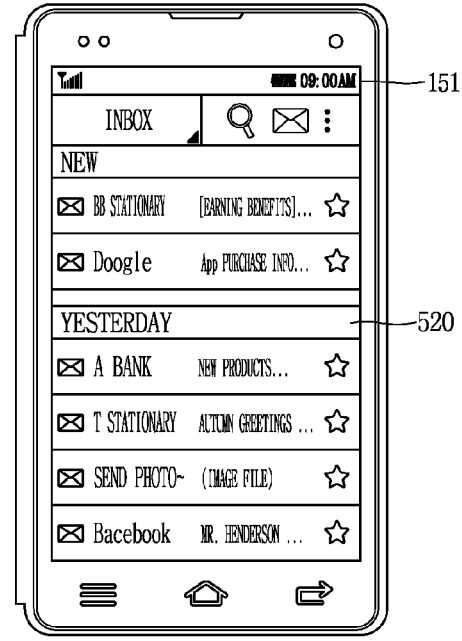

For example, when a preset user motion is applied to the terminal as illustrated in FIG. 11C(b) in a state that at least one event information is displayed on the information display window 510 as illustrated in FIG. 11C(a), the controller 180 may execute an application corresponding to any one of the event information displayed on the information display window 510 and display the detailed information of the event information as illustrated in FIG. 11C(c).

The examples of an event occurred on the mobile terminal body 100 may include receiving a message, receiving a call signal, a missed call, an alarm, a schedule notification, receiving an email, receiving information through an application, and the like.

On the other hand, the preset user motion may be defined as a preset number of tap motions to a specific region (for example, left region in a state the display unit 151 of the terminal is placed toward the user) of the terminal rear surface exposed through the window portion 240. For example, as illustrated in FIG. 11C(b), when two taps are applied to the right region 103a, the controller 180 may execute an application corresponding to any one of the event information displayed on the information display window 510, and display the detailed information of the event information.

On the other hand, for the right region 103a and left region 103b of the rear surface, a portion at the right side thereof may be defined as the right region 103a and a portion at the left side thereof as the left region 103b in a direction in which the display unit 151 faces the user on the assumption that the terminal is divided into two in a length direction.

On the other hand, when a plurality of event information corresponding to a plurality of applications are included in the information display window 510, the controller 180 may first display event information corresponding to any one of the plurality of applications based on a preset criteria. Here, the preset criteria may be set in various ways, and for example, detailed information 520 associated with an event may be displayed in response to a preset user motion corresponding to a display request of the detailed information associated with the event information based on an application in which the event has most recently occurred, an application in which the event has initially occurred, a frequently used application or a most recently used application, and the like as illustrated in FIG. 11C(c).

On the other hand, when the preset user motion is applied again as illustrated in FIG. 11C(b), the controller 180 may display the execution screen of an application corresponding to the next display sequence among applications corresponding to event information contained in the information display window 510 as illustrated in FIG. 11C(d). The execution screen 530 of the application may include information associated with an event.

Figure 11D:
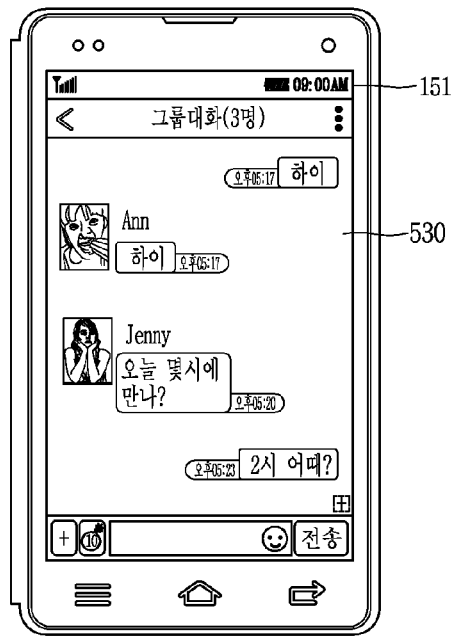
Figure 11D:
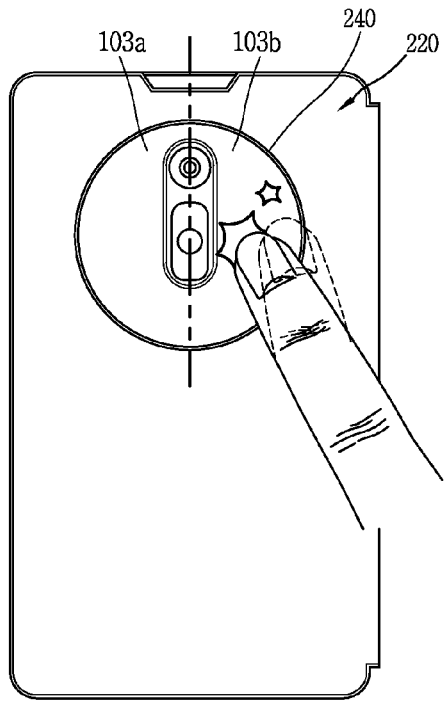
Figure 11D:
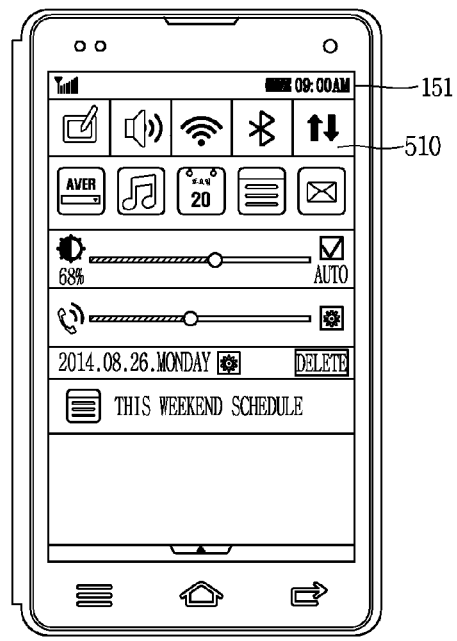

On the other hand, when a preset user motion is applied to the terminal in a state that the execution screen of an application corresponding to the event information is displayed as illustrated in FIG. 11D(a), the controller 180 may terminate the display of the execution screen 530 and display the information display window 510 again as illustrated in FIG. 11D(c).

Here, a preset user motion for displaying the information display window 510 again may be defined as a preset number of tap motions with respect to a specific region (for example, right region in a state the display unit 151 of the terminal is placed toward the user) of the terminal rear surface exposed through the window portion 240 as illustrated in FIG. 11D(b). For example, as illustrated in the drawing, when two taps are applied to the right region 103*b*, the controller 180 may display the information display window 510 again as illustrated in FIG. 11D(c).

On the other hand, as illustrated in FIG. 11D(c), event information checked through a user's selection to the information display window 510 or through the foregoing scheme along with FIG. 11C among the event information contained in the information display window 510 may be no longer displayed on the information display window 510.

On the other hand, according to the present disclosure, when there are a plurality of applications in which an event has occurred, the controller 180 may display the screen information of the plurality of applications at the same time on the display unit. In this case, the user may check event information through execution screens for the plurality of applications.

Figure 11E:
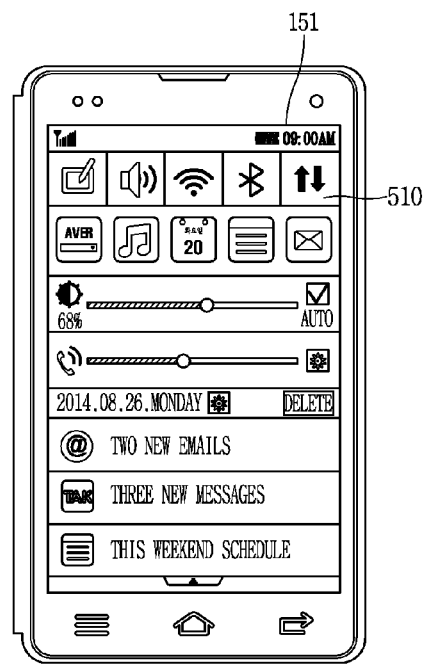
Figure 11E:
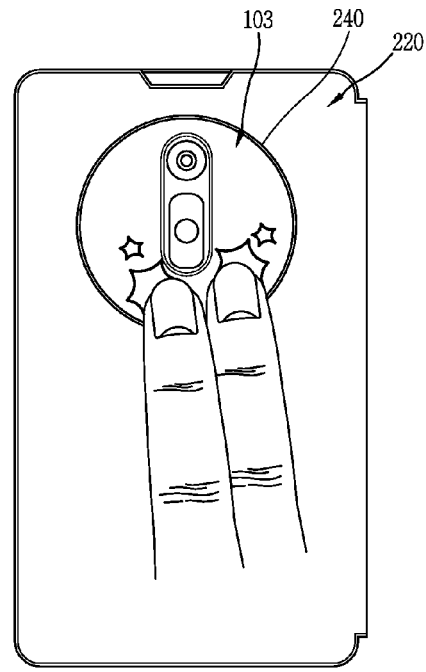
Figure 11E:
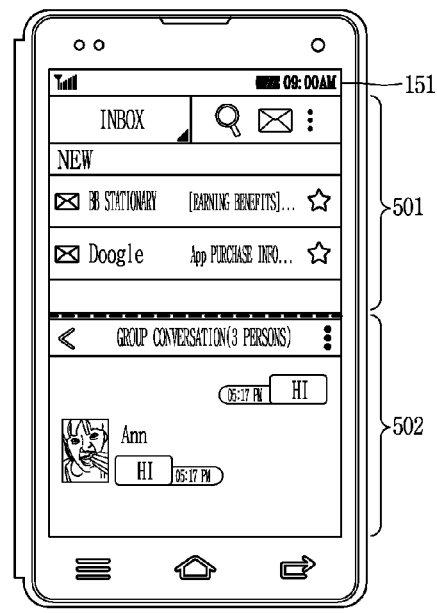

For example, a preset number of taps being applied to the rear surface of the body by a plurality of tap objects (for example, a plurality of fingers) are sensed by a sensor provided on the cover 200, the controller 180 may display execution screens corresponding to the plurality of applications, respectively, as illustrated in FIG. 11E(c) for the plurality of applications, thereby displaying event information.

In this manner, the display area of the display unit 151 may be partitioned into a plurality of regions 501, 502, and the screen information of different applications, respectively, may be displayed for each of the partitioned display area. Furthermore, when any one of screen information displayed in a plurality of regions, respectively, is selected, the controller 180 may switch screen information corresponding to the any one to the entire screen. In this case, the display of the screen information displayed in the plurality of regions, respectively, may be terminated, and only screen information corresponding to the any one may be displayed on the display unit 151.

Figure 12A:
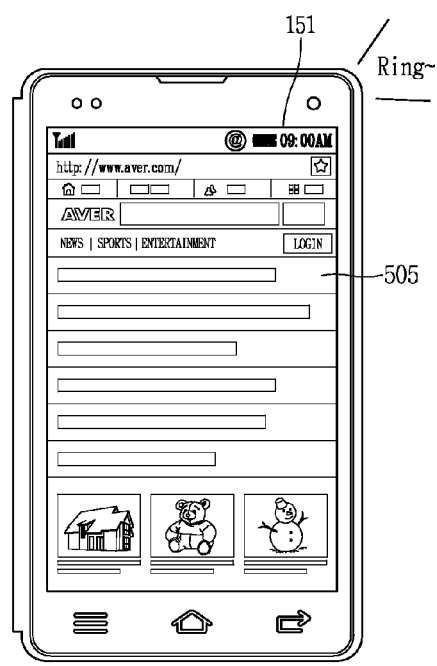
Figure 12B:
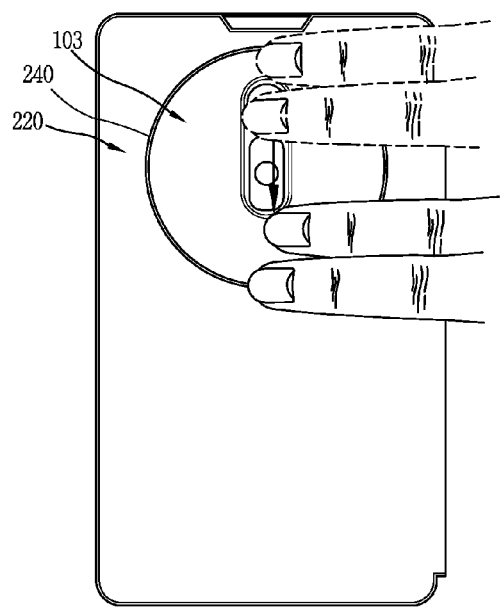
Figure 12D:
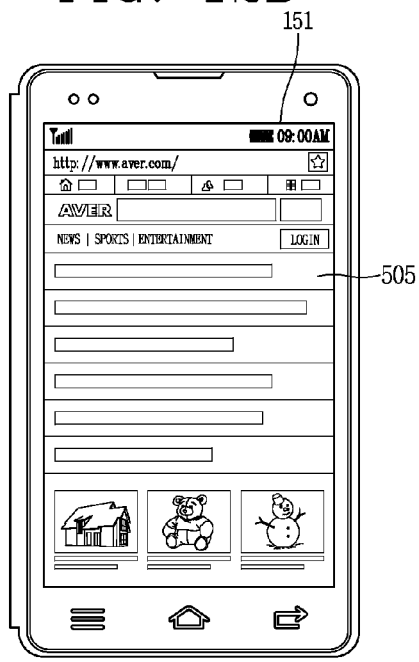

On the other hand, according to the present disclosure, event information may be provided using a different method from that of providing event information through the information display window 510 (refer to FIG. 11A) in response to a preset user motion (for example, a drag motion in a second direction opposite to the first direction or a preset number of tap motions) being applied to the rear surface of the body as described above. For example, when a preset type of user motion (for example, a drag motion in a first direction) is applied to the rear surface (particularly, an inner side of the window portion 240) as illustrated in FIG. 12B in case where an event occurs from at least one of applications installed in the mobile terminal while displaying any screen information, such as displaying the execution screen of any application or displaying a home screen page on the display unit 151 as illustrated in FIG. 12A, the controller 180 may display an execution screen 550 containing the event information of an application in which the event has occurred as illustrated in FIG. 12C.

Figure 12C:
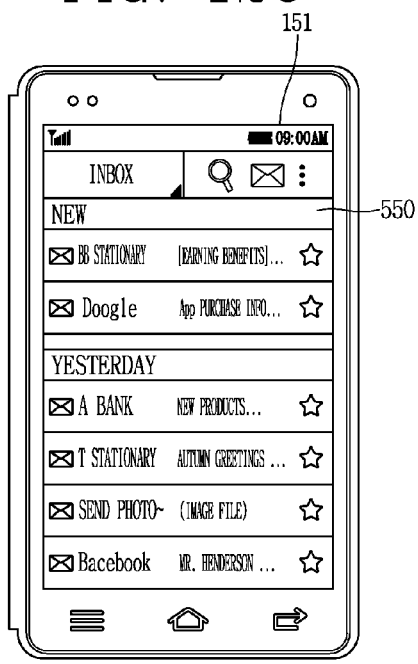

Here, though not shown in the drawing, when a user motion opposite to a preset user motion (for example, a drag motion in a second direction opposite to the first direction or a preset number of tap motions) or another type of user motion is applied in a state that the execution screen 550 containing the event information of an application in which the event has occurred as illustrated in FIG. 12C, the controller 180 may redisplay any screen information 505 that has been displayed on the display unit 151 prior to displaying the execution screen 550.

On the other hand, the preset type of user motion may be defined in various ways in combination with a number of objects applying the motion (for example, number of fingers), a movement direction of the motion, a location to which the motion is applied, a frequency, and the like.

Figure 13A:
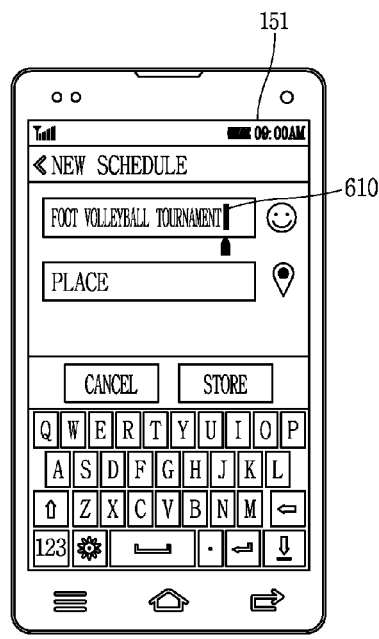
FIGS. 13A(a), 13A(b), 13A(c), 13B(a), 13B(b), 13B(c), 13C(a), 13C(b) and 13C(c) are conceptual views for explaining a method of providing a text edit function using a user motion with respect to a terminal rear surface in a mobile terminal according to the present disclosure.
Figure 13A:
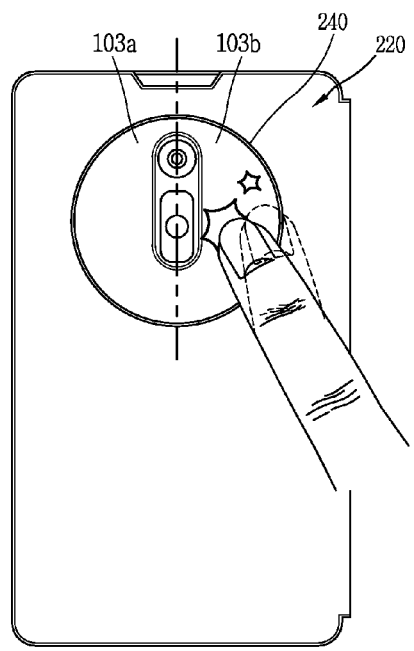
Figure 13A:
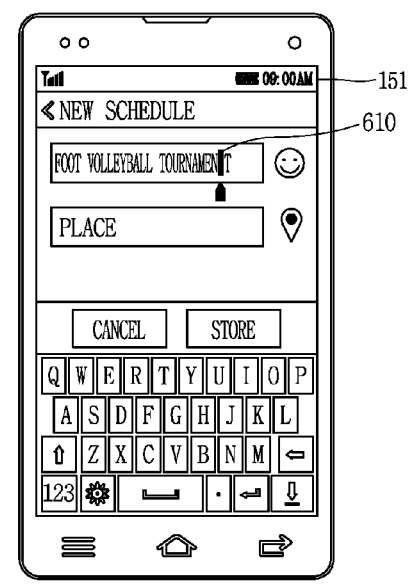

Hereinafter, a method of providing a text edit function in response to a user motion with respect to the rear surface of the terminal rear surface will be described with respect to the accompanying drawings. FIGS. 13A(a), 13A(b), 13A(c), 13B(a), 13B(b), 13B(c), 13C(a), 13C(b) and 13C(c) are conceptual views for explaining a method of providing a text edit function using a user motion with respect to a terminal rear surface in a mobile terminal according to the present disclosure.

A mobile terminal according to the present disclosure may provide a text edit function in response to a user motion with respect to the rear surface of the terminal body. More specifically, according to the present disclosure, the controller 180 may move a cursor 610 indicating a location at which information is entered in response to a user motion with respect to the rear surface of the terminal body. The controller 180 may control the movement direction and movement distance of a cursor based on a location to which the tap is applied, a number of taps, a holding time of the tap, and the like.

For example, when a tap to the left region 103*b* on the rear surface of the terminal as illustrated in FIG. 13A(b) in a state that the display unit 151 of the terminal is placed toward the user as illustrated in FIG. 13A(a), the controller 180 moves the cursor 610 in the left direction as illustrated in FIG. 13A(c).

Figure 13B:
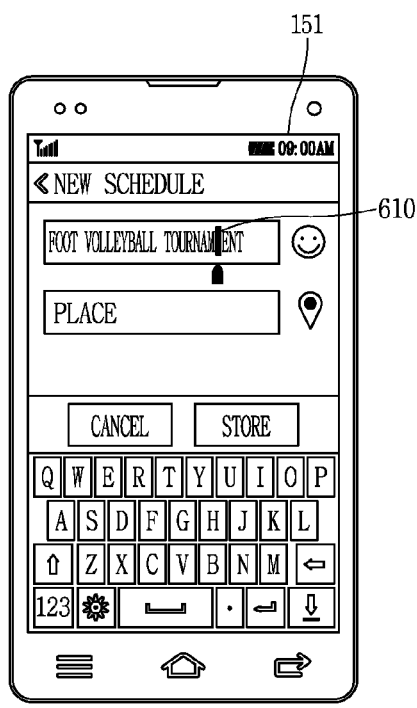
Figure 13B:
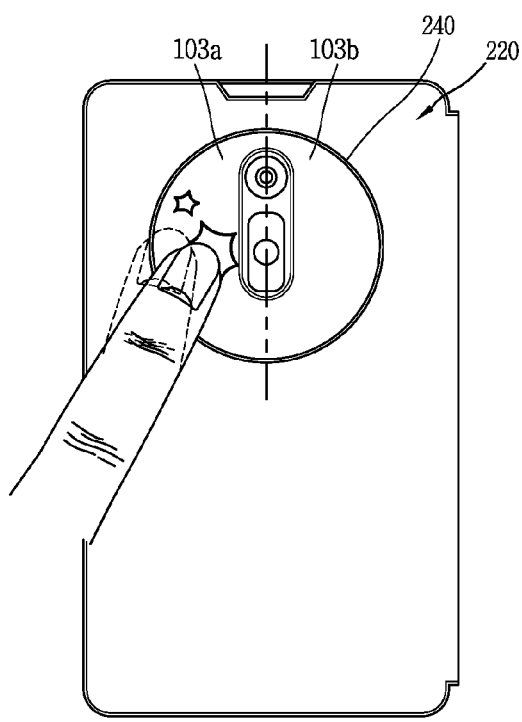
Figure 13B:
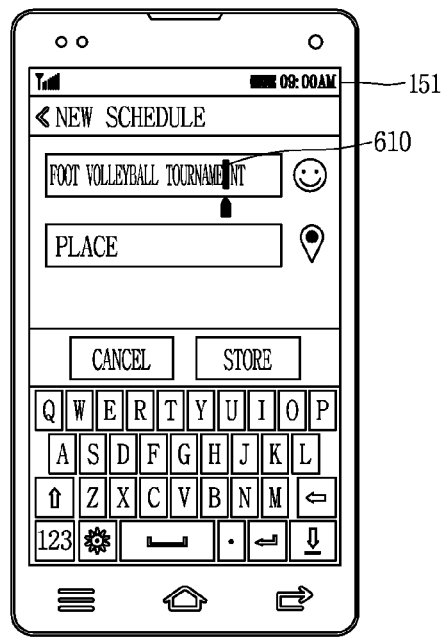

Furthermore, when a tap to the right region 103*a* on the rear surface of the terminal as illustrated in FIG. 13B(b) in a state that the display unit 151 of the terminal is placed toward the user as illustrated in FIG. 13B(a), the controller 180 moves the cursor 610 in the right direction as illustrated in FIG. 13B(c).

The controller moves the cursor by a number of taps applying thereto. For example, the controller 180 may move the cursor by one space (a unit for displaying text) when one tap is applied, and the controller 180 may move the cursor by two spaces when two taps is applied.

On the other hand, for the right region 103*a* and left region 103*b* of the rear surface, a portion at the right side thereof may be defined as the right region 103*a* and a portion at the left side thereof as the left region 103*b* in a direction in which the display unit 151 faces the user on the assumption that the terminal is divided into two in a length direction.

Figure 13C:
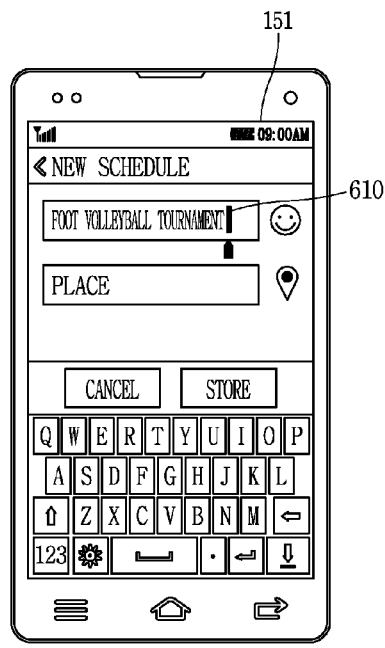
Figure 13C:
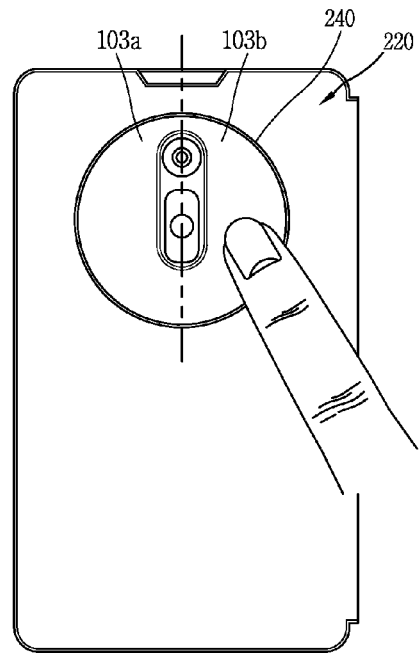
Figure 13C:
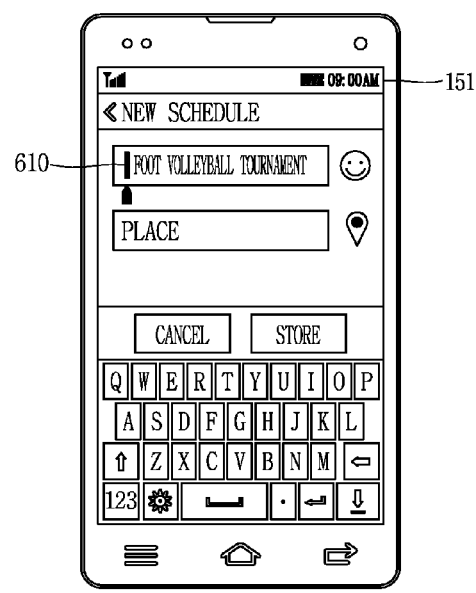

For another example, when a holding time of the tap exceeds a preset period of time, the controller 180 may move the cursor 610 to the beginning or end of input text. For example, when a tap applied to the left region 103*b* of the rear surface is maintained for more than a preset period of time as illustrated in FIG. 13C(b), the controller 180 may move the cursor 610 to the beginning of input text as illustrated in FIG. 13C(c).

For still another example, though not shown in the drawing, the controller 180 may move the cursor in response to a drag motion applied to the rear surface of the body. At this time, the movement direction of the cursor may correspond to the direction of the drag motion. Moreover, the location movement extent of the cursor may vary based on at least one of a speed of the drag motion and a movement distance of the drag motion. For example, the controller 180 may move the cursor by one space when the speed of the drag motion is a first speed, and move the cursor by two spaces when the speed of the drag motion is a second speed which is faster than the first speed.

Moreover, the controller 180 moves the cursor by two spaces in response to a drag motion with a first movement distance and move the cursor by four spaces in response to a drag motion with a second movement distance which is larger than the first movement distance.

As described above, a mobile terminal according to the present disclosure may provide the convenience of a text edit function using a user motion with respect to the rear surface of the terminal body.

Hereinafter, a method of providing a convenience function associated with a call using a user motion with respect to the rear surface of the terminal body will be described in more detail with reference to the accompanying drawings. FIGS. 14A(a), 14A(b), 14A(c), 14B(a), 14B(b), 14B(c), 14C(a), 14C(b) and 14C(c) are conceptual views for explaining a method of providing a call-related function using a user motion with respect to a terminal rear surface in a mobile terminal according to the present disclosure.

When a user motion is applied to the rear surface of the terminal body while performing a call function (for example, a state in which a call is connected to the counter terminal, a mobile terminal according to the present disclosure may provide a function of storing a phone number currently connected to the terminal (or identification information corresponding to this, for example, a mail address or the like).

The controller 180 may store the phone number (or identification information) in a random access memory (RAM) to automatically delete it when the power of the terminal is turned off. In other words, the controller 180 may temporarily store the phone number (or identification information). Meanwhile, the controller 180 may temporarily store the phone number (or identification information) in a RAM even when stored in an address book. In this manner, the phone number stored in the RAM may be deleted based on a user's request or deleted when a preset period of time has passed. Meanwhile, on the contrary, the phone number (or identification information) may be also stored in a different memory other than the RAM.

On the other hand, when a user motion (for example, a tap motion hitting the rear surface of the terminal body a plural number of times) with respect to the rear surface of the terminal body as illustrated in FIG. 14A(b) while making a call as illustrated in FIG. 14A(a), the controller 180 stores the phone number (or identification information) of the terminal corresponding to the counterpart as illustrated in FIG. 14A(c). Meanwhile, notification information for notifying that the phone number has been stored may be displayed through various schemes (a visual scheme, a tactile scheme or an auditory scheme), and also may not be displayed.

Figure 14B:
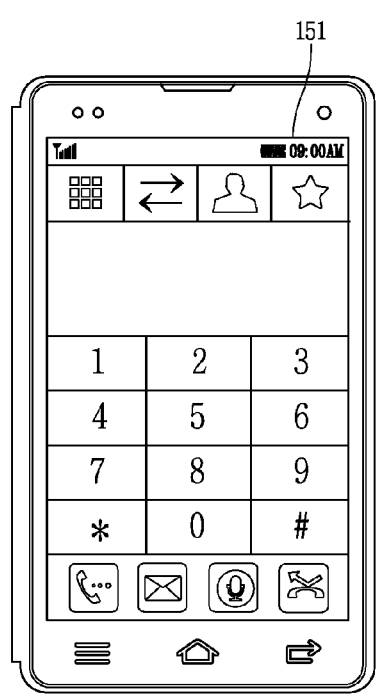
FIGS. 14A(a), 14A(b), 14A(c), 14B(a), 14B(b), 14B(c), 14C(a), 14C(b) and 14C(c) are conceptual views for explaining a method of providing a call-related function using a user motion with respect to a terminal rear surface in a mobile terminal according to the present disclosure.
Figure 14B:
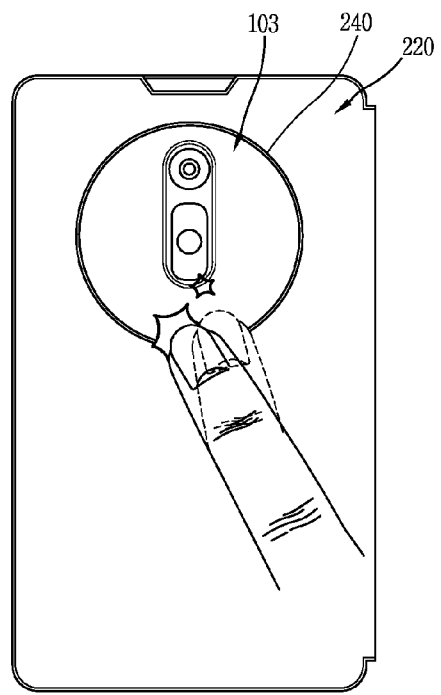
Figure 14B:
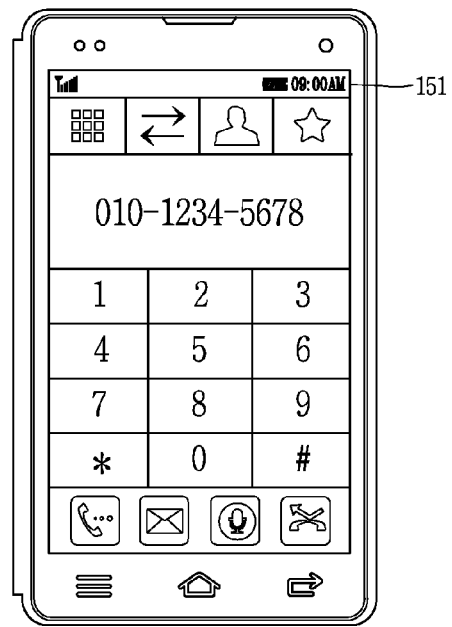

On the other hand, in this manner, the stored phone number (or identification information) may be displayed on the display unit 151 whenever there is a user request. For example, as illustrated in FIG. 14B(a), when a user motion with respect to the rear surface of the terminal body (for example, a tap motion hitting the rear surface of the terminal body a plural number of times) is applied as illustrated in FIG. 14B(b) in a state that screen information corresponding to an outgoing call function is displayed as illustrated in FIG. 14B(a), the controller 180 may display the stored phone number (or identification information) in a scheme described above along with FIG. 14A. In this manner, a phone number (or identification information) stored during a call may be reused based on a user motion. Meanwhile, the user may temporarily store a phone number which is undesired to be stored in his or her address book, and use it again based on a user motion, thereby enhancing user convenience.

Figure 14C:
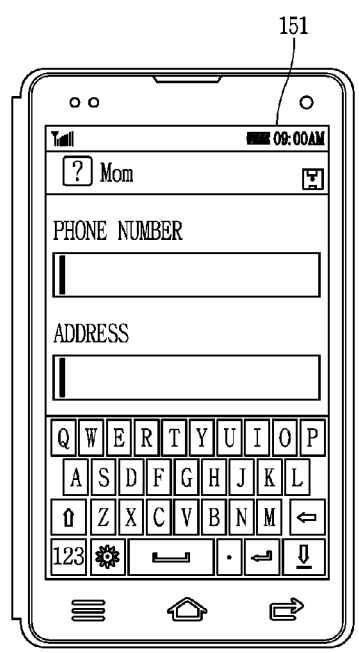
Figure 14C:
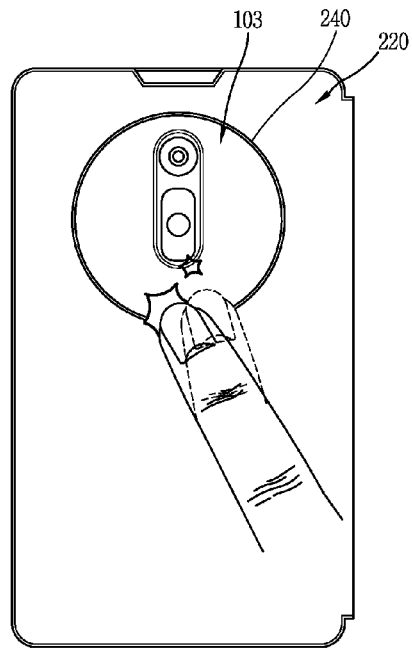
Figure 14C:
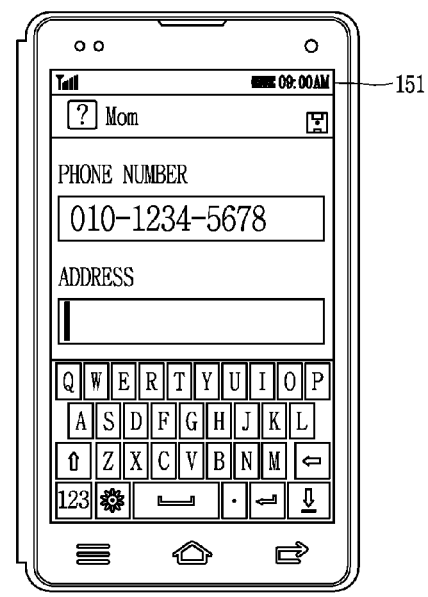

For another example, when a phone number store function is executed through an address book function application as illustrated in FIG. 14C(a), if a user motion with respect to the rear surface of the terminal body (for example, a tap motion hitting the rear surface of the terminal body a plural number of times) is applied as illustrated in FIG. 14C(b), then the controller 180 may enter a phone number (or identification information) stored in a scheme described above along with FIG. 14A in a phone number input region (or field) as illustrated in FIG. 14C(c). Accordingly, it may be possible to solve inconvenience in which the user should directly enter a phone number desired to be stored.

Figure 15A:
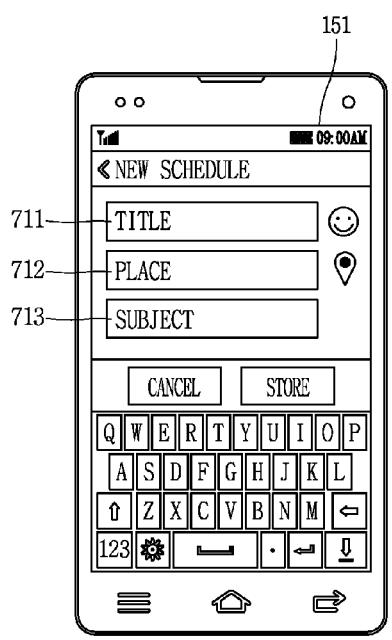
FIGS. 15A(a), 15A(b), 15A(c), 15B(a) and 15B(b) are conceptual views for explaining a method of arranging input windows using a user motion with respect to a terminal rear surface in a mobile terminal according to the present disclosure.
Figure 15A:
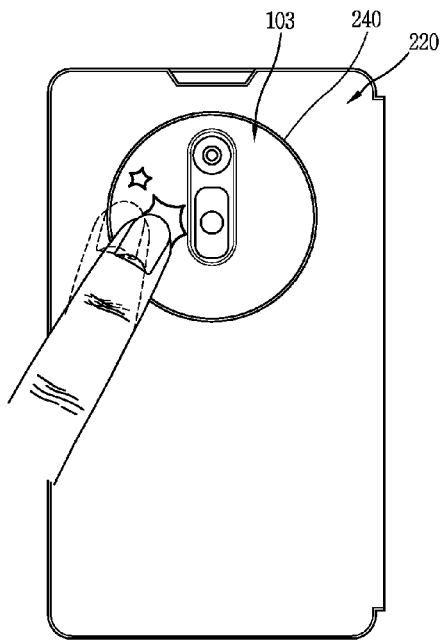
Figure 15A:
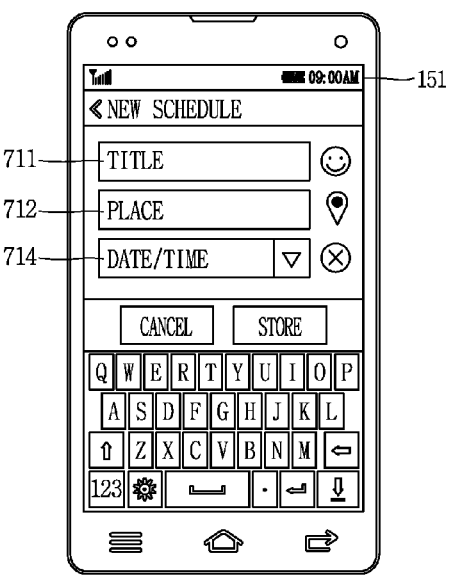

Hereinafter, a method of providing a convenience function using a user motion with respect to the rear surface of the terminal body will be described in more detail with reference to the accompanying drawings. FIGS. 15A(a), 15A(b), 15A(c), 15B(a) and 15B(b) are conceptual views for explaining a method of arranging input windows using a user motion with respect to a terminal rear surface in a mobile terminal according to the present disclosure.

A mobile terminal according to the present disclosure may provide a function of preferentially arranging an input region corresponding to a preset criteria in response to a user motion being applied to the rear surface of the terminal body in a state that a plurality of input regions (or input fields) are displayed. For example, when a function for storing information entered from the user (for example, address book function, schedule input function, etc.) is executed, there may exist a plurality of information input regions (or input fields) for receiving information from the user. Meanwhile, the user may enter information only in some of information input regions without entering information in all the plurality of information input regions. Accordingly, when a user motion with respect to the rear surface of the terminal body is applied, the controller 180 may change an arrangement order of the plurality of information input regions based on a preset criteria. For example, when a user motion with respect to the rear surface of the terminal body (for example, a tap motion hitting the rear surface of the terminal body a plural number of times) is applied as illustrated in FIG. 15A(b) in a state that a predetermined input function is executed and predetermined input regions 711, 712, 713 are displayed as illustrated in FIG. 15A(a), the controller 180 may change an arrangement order of the predetermined input regions as illustrated in FIG. 15A(c). At this time, the arrangement order may be determined based on an input region having a high use frequency.

Figure 15B:
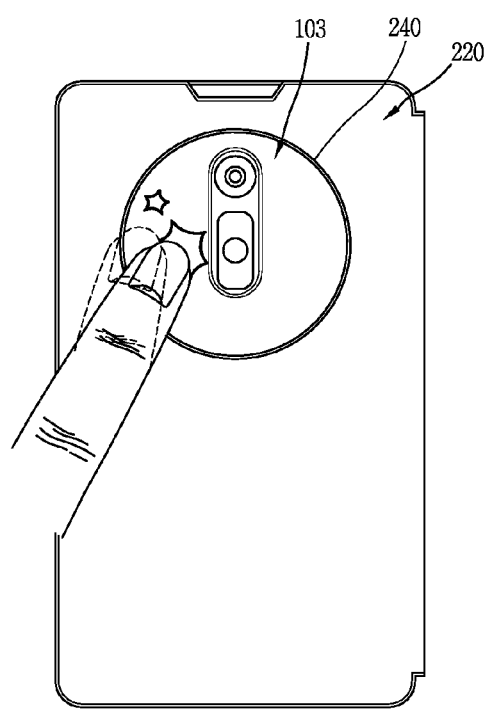
Figure 15B:
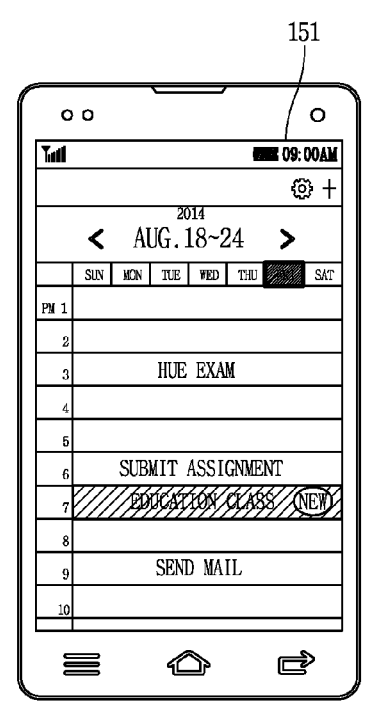

On the other hand, when a user motion with respect to the rear surface of the terminal body (for example, a tap motion hitting the rear surface of the terminal body a plural number of times) is applied subsequent to receiving information from the user for the information input region as illustrated in FIG. 15B(a), the received information may be stored as illustrated in FIG. 15B(b).

Figure 16A:
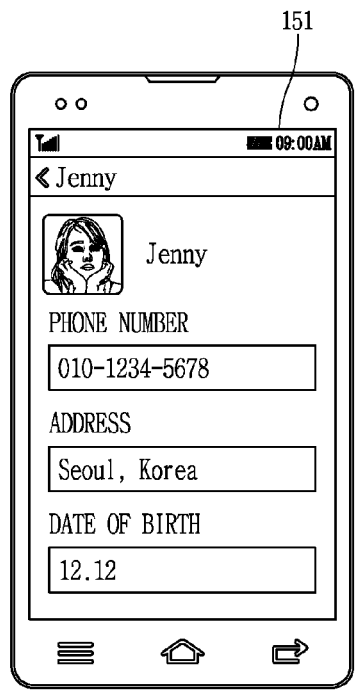
FIGS. 16A, 16B and 16C are conceptual views for explaining a method of deleting specific information using a user motion with respect to a terminal rear surface in a mobile terminal according to the present disclosure.
Figure 16B:
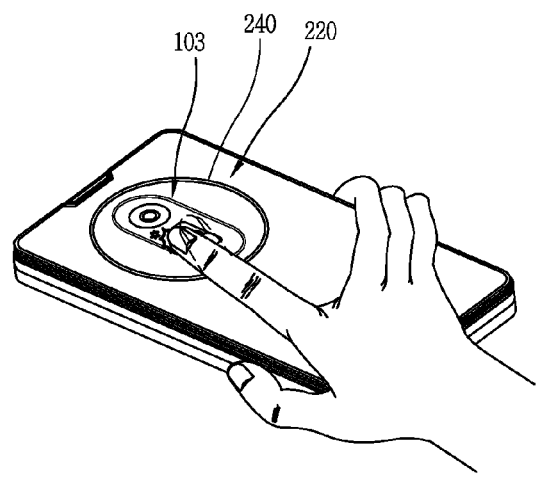
Figure 16C:
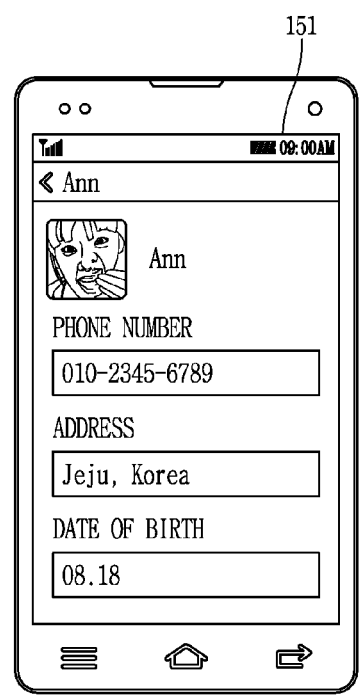

FIGS. 16A, 16B and 16C are conceptual views for explaining a method of deleting specific information using a user motion with respect to a terminal rear surface in a mobile terminal according to the present disclosure.

A mobile terminal according to the present disclosure may perform a delete function for information stored in the memory based on a user motion with respect to the rear surface of the terminal body. For example, when a tap is applied to the rear surface of the terminal body in a state that the display unit 151 moves to face the bottom as illustrated in FIG. 16B while displaying the stored information (address book information) as illustrated in FIG. 16A, or when a tap is applied to the rear surface of the terminal body while the display unit 151 moves to face the bottom (or ground), the controller 180 may delete the stored information.

In other words, an operation in which the terminal is hit by the user in a state that the display unit 151 faces the bottom (or ground) is an operation similar to an operation in which the user vacates the trash in his or her life, and according to the present disclosure, the user can more intuitively control the terminal through a user motion based on the user's experience.

On the other hand, when information that has been displayed on the display unit is deleted as described above, the controller 180 may display information corresponding to a sequence to be displayed next to the deleted information on the display unit as illustrated in FIG. 16C.

Figure 17A:
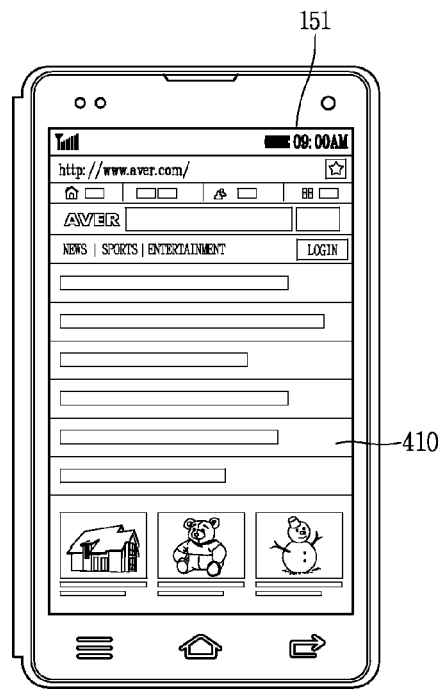
FIGS. 17A(a), 17A(b), 17A(c), 17B(a), 17B(b), 17C(a), 17C(b), 17D(a), 17D(b), 17E(a), 17E(b), 17F(a), 17F(b), 17F(c), 17G(a), 17G(b) and 17G(c) are conceptual views for explaining a method of controlling an application using a user motion with respect to a terminal rear surface in a mobile terminal according to the present disclosure.
Figure 17A:
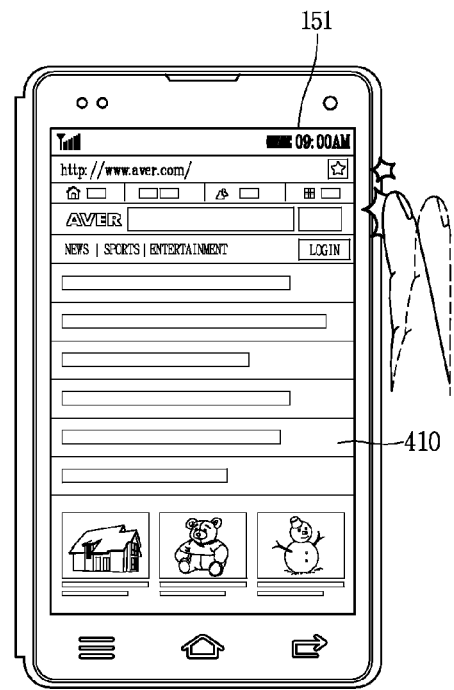
Figure 17A:
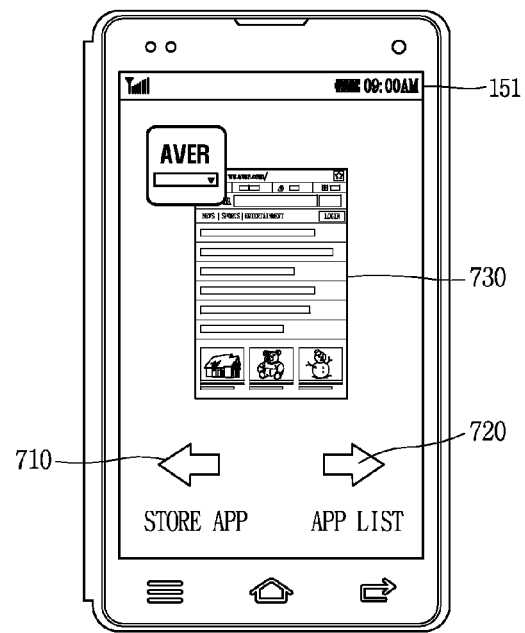

Hereinafter, a specific example of controlling the operation of the terminal with respect to a user motion with respect to the rear surface of the body will be described. FIGS. 17A(a), 17A(b), 17A(c), 17B(a), 17B(b) 17C(a), 17C(b), 17D(a), 17D(b), 17E(a), 17E(b), 17F(a), 17F(b), 17F(c), 17G(a), 17G(b) and 17G(c) are conceptual views for explaining a method of controlling an application using a user motion with respect to a terminal rear surface in a mobile terminal according to the present disclosure.

In the above, as illustrated in FIGS. 10A(a), 10A(b), 10B(a), 10B(b), 10B(c), 10C(a), 10C(b), 10C(c), 10C(d), 10D(a), 10D(b), 10D(c), 10E(a), 10E(b) and 10E(c), a method of storing the execution information of a specific application based on a user motion with respect to the terminal body, and redisplaying the screen information of a specific application using this has been descried. The present disclosure may not be necessarily limited to an embodiment for the rear surface of the terminal body, and a function described in FIGS. 10A(a), 10A(b), 10B(a), 10B(b), 10B(c), 10C(a), 10C(b), 10C(c), 10C(d), 10D(a), 10D(b), 10D(c), 10E(a), 10E(b) and 10E(c) may be executed using a user motion with respect to a lateral surface of the terminal body.

A mobile terminal according to the present disclosure may provide a user environment that can easily and quickly approach a specific application, for example, an application frequently used by the user or an application desired to be used again by the user using a user motion with respect to the terminal, particularly, a user motion with respect to the terminal lateral surface.

In other words, a mobile terminal according to the present disclosure may display the screen information of a specific application again on the display unit 151 at any time using a user motion with respect to a lateral surface of the terminal body even though the screen information of the specific application is not being currently displayed on the display unit 151.

Here, user motion may be defined based on a location of the tap applied to the rear surface of the body, a number of taps, a pattern of the tap (defined by a plurality of taps) and the like. Here, the user motion may be a double tap motion applied to the right lateral surface of the body. In response to a user motion with respect to the terminal, particularly, a user motion with respect to a lateral surface of the terminal body, while using a specific application, a mobile terminal according to the present disclosure may provide a user environment that information on the specific application is stored, and then the screen information of the specific application is immediately displayed on the display unit 151 using the stored information when the screen information of the specific application is not currently being displayed on the display unit 151 or the specific application is not currently being driven. As a result, the user can enhance accessibility to an application desired to be used again by the user or an application frequently used by the user. Accordingly, the user may quickly enter a specific application at any time while using the mobile terminal. For example, as illustrated in FIG. 17A(a), first screen information 410 corresponding to a first application may be displayed on the display unit 151. Here, the first application may denote any one of a plurality of applications installed in the mobile terminal, and the first application may be an application selected and executed by the user among the plurality of applications.

Furthermore, the first screen information 410 may denoted an execution screen of the first application. In other words, screen information on which the first application is executed and displayed on the display unit 151 may be commonly referred to as first screen information.

For example, when a web browser function application is executed, the first screen information 410 corresponding to the web browser function application may be displayed on the display unit 151 as illustrated in FIG. 17A(a).

In this manner, when a preset user motion for the terminal is received in a state that the first screen information 410 corresponding to the first application is displayed, the controller 180 may store execution information on the first application in response to the user motion. Here, the execution information denotes information required to execute an application corresponding to the screen information displayed on the display unit 151 or display the screen information of the application again when there is a user request upon applying the user motion. The controller 180 may display the screen information of the application again on the display unit 151 with reference to the execution information when there is a user request.

The execution information on such an application may include at least one of a type of application, an execution time, a type of the first screen information 410 and driving state information of the application displayed on the display unit 151 upon applying the user motion.

On the other hand, the execution information may be stored in a random access memory (RAM) to be automatically deleted when the power of the terminal is turned off. In other words, the controller 180 may temporarily store execution information.

When there is a user request for the application with reference to the execution information, the controller 180 may display the screen information of the application that has been most recently displayed on the display unit 151.

Here, one of the preset user motions may be a tap applied to a rear surface of the terminal body. At this time, the user motion may be sensed through an acceleration sensor provided in the terminal, or a pressure sensor or touch sensor provided on the terminal lateral surface. Furthermore, the type of sensors for sensing a user motion applied to the lateral surface of the terminal body may not be necessarily limited to the foregoing sensors.

On the other hand, the execution information on the application is stored when a preset user motion is sensed as described above in a state that the screen information of the application is displayed. The execution information may be store in a plural number of times, for example, when the execution information on a first application is stored as illustrated in FIG. 17A(a), and then the preset user motion is applied while displaying the second screen information 420 of a second application as illustrated in FIG. 10A(b), the controller 180 may store the execution information of the second application. Here, both the execution information of the first and the second application may be stored in the memory unit 170.

In other words, unless execution information is deleted by a user's delete request for the prestored execution information or under the authority of the controller, the controller 180 may maintain the storage status of the prestored execution information even if there is an execution information store request for another application.

Accordingly, the user may provide a user environment capable of executing or using a user's desired application in a more intuitive and faster manner among a plurality of applications.

On the other hand, when the execution information of an application is stored based on a user motion, a mobile terminal according to the present disclosure may display visual information on the display unit to notify the user that the execution information of the relevant application has been stored.

For example, when a preset user motion is applied to the terminal in a state that the screen information of the first application is displayed as illustrated in FIG. 10B(a), the controller 180 may display a graphic object 411 associated with the first application in one region of the display unit 151 as illustrated in FIG. 10B(b).

On the other hand, as described above, the execution information of an application may stored based on an additional user motion without being directly stored.

For example, when a user motion is applied to a lateral surface of the terminal body (for example, a double tap motion is applied to the right lateral surface of the terminal body) as illustrated in FIG. 17A(a), the controller 180 may display information associated with the storage of the execution information of the first application as illustrated in FIG. 17A(c).

Here, the information associated with the storage of the execution information may include guide information 710 on information that should be additionally entered (or user motion that should be additionally applied) to store the execution information.

Furthermore, as illustrated in FIG. 17A(a), when a user motion is applied to the lateral surface of the terminal body (for example, when a double tap motion is applied to the right lateral surface of the terminal body), the controller 180 may further display guide information 720 on information that should be additionally entered (or user motion that should be additionally applied) to display the display of the information of an application corresponding to the execution information that has been previously stored).

In other words, when the preset motion is applied to the lateral surface of the body, the controller 180 may display information 730 indicating the first application. In other words, the controller 180 may display information 730 corresponding to an application subject to the storage of current execution information. The information 730 may include at least one of the execution screen and icon of the application.

On the other hand, as illustrated in FIG. 17A(c), when a user motion associated with the storage of execution information or a user motion associated with the display of a list indicating information on an application for which the execution information has been stored in a state that guide information 710, 720 are displayed, the controller 180 perform a function corresponding to each user motion.

Figure 17B:
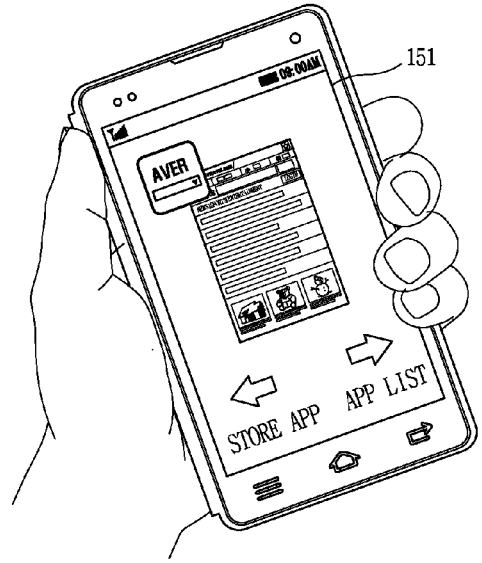
Figure 17B:
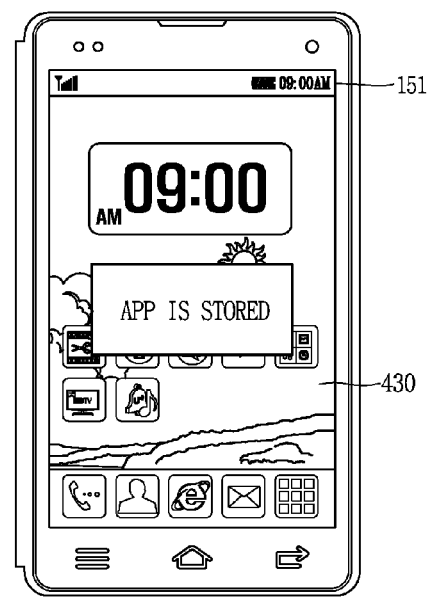

For example, when the terminal body moved in a direction guided by the guide information (for example, first direction) as illustrated in FIG. 17B(a), the execution information of the first application is stored as illustrated in FIG. 17B(b).

When a preset user motion associated with the execution information storage of an application corresponding to the screen information currently displayed on the display unit 151 is applied, the controller 180 may store the execution information of the application, and terminate the display of the screen information on the display unit 151. At this time, screen information 430 which is different from the first screen information 410 of the first application is displayed on the display unit 151. Here, information displayed as the different screen information 430 may be screen information (or an execution screen) of a different application from the first application or a standby screen. Here, the application which is different from the first application may be an application corresponding to screen information prior to displaying screen information corresponding to the first application or corresponding to most recently displayed screen information.

The first application may not be terminated even when the display of the first screen information 410 of the first application is terminated and the different screen information 430 is displayed in response to the preset user motion. The controller 180 may terminate the display of the first screen information 410 of the first application and continuously drive the first application on the background.

Figure 17C:
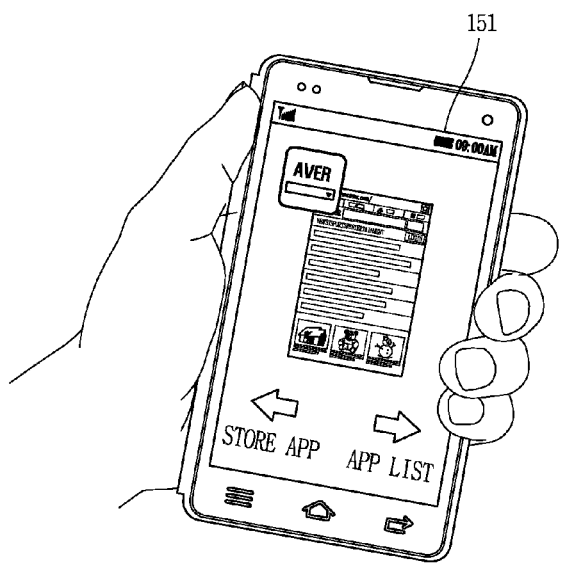
Figure 17C:
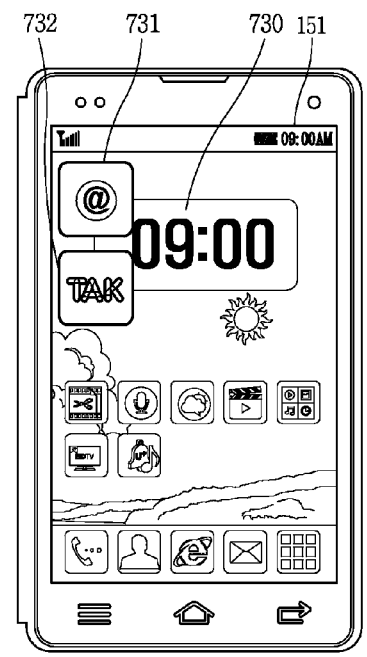

Furthermore, on the contrary, when a user motion associated with the display of a list is applied as illustrated in FIG. 17C(a), a list 730 indicating applications stored with the execution information may be displayed as illustrated in FIG. 17C(b).

For example, when the terminal body moves in a direction guided by the guide information (for example, a second direction opposite to the first direction described along with FIG. 17B(a)) as illustrated in FIG. 17C(a), the list 730 is displayed as illustrated in FIG. 17C(b).

The list 730 may include graphic objects 731, 732 corresponding to applications for which the execution information has been stored. Here, the application list 730 may be displayed to overlap with screen information that has been displayed on the display unit 151 prior to applying the user motion. Furthermore, though not shown in the drawing, the application list 730 may be displayed in a different region from the region in which the screen information that has been displayed on the display unit not to overlap with the screen information that has been displayed on the display unit 151.

On the other hand, when any one of the application list 730 is selected, the controller 180 may display the screen information of an application corresponding to the selected item or graphic object. The screen information may be a screen that has been finally displayed on the display unit 151 when the execution information of the application is stored.

Moreover, the screen information 410 of an application corresponding to the selected graphic object may be screen information updated as the application is driven and executed on the background. In this case, the screen information of the application may not be a screen that has been finally displayed on the display unit 151 when the execution information of the application is stored.

Figure 17D:
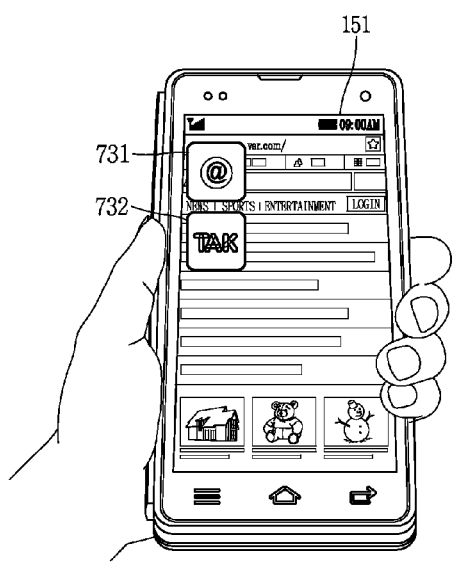
Figure 17D:
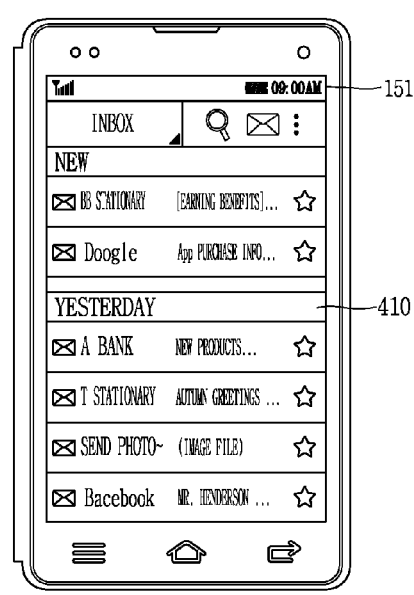

For another example, the controller 180 may immediately display the screen information of an application for which the execution information has been stored as illustrated in FIG. 17D(b) in response to a user motion (for example, a motion for inclining the terminal in a third direction different from the foregoing first and the second direction) for redisplaying information on the application for which the execution information has been stored as illustrated in FIG. 17D(a). Here, when there are a plurality of applications for which the execution information has been stored, the controller 180 may display the screen information 410 of an one of the plurality of applications on the display unit 151 and display a graphic object corresponding to the remaining applications to overlap with the screen information 410 (not shown). Meanwhile, a graphic object corresponding to the remaining applications may disappear based on a user's request or based on the passage of a preset period of time.

On the other hand, the controller 180 may determine an application for which the screen information is to be displayed based on a preset criteria among a plurality of applications. For an example, the controller 180 may display the screen information of an application for which the execution information has been recently stored among the plurality of applications on the display unit. For another example, the controller 180 may display the screen information of an application for which the execution information has been initially stored among the plurality of application on the display unit.

On the other hand, when the graphic object 412 is selected by the user in a state that the graphic object 412 and screen information 410 are displayed at the same time as described above, the controller 180 may switch the currently displayed screen information 410 to the screen information of an application corresponding to the selected graphic object 412.

Furthermore, though not shown in the drawing, for another example, where there is a user request for redisplaying information on an application for which the execution information has been stored and there are a plurality of applications for which the execution information has been stored, the controller 180 may display the screen information of the plurality of applications at the same time on the display unit 151. In this case, the display region of the display unit 151 may be partitioned into a plurality of regions, and the screen information of different applications may be displayed in the partitioned display regions, respectively. Furthermore, when any one of screen information displayed in the plurality of regions, respectively, is selected, the controller 180 may switch screen information corresponding to the any one to an entire screen. In this case, the display of screen information displayed in the plurality of regions, respectively, may be terminated, and only screen information corresponding to the any one may be displayed on the display unit 151.

In this manner, according to the present disclosure, though a specific application is not currently used, in order to immediately use the specific application when it is desired to be used again later, the user may display the execution screen of the specific application again on the display unit 151 using a user motion to store execution information on the specific application, and then using a user motion which is different from the user motion. Accordingly, the user may quickly approach the specific application using a user motion.

On the other hand, a mobile terminal according to the present disclosure may delete the stored execution information from the memory unit 170 when a different preset user motion is applied in a state that the execution information of an application is stored.

In this case, even though there is a display request for the screen information of an application for which the execution information has been stored or a display request of a graphic object representing the application for which the execution information has been stored, the controller 180 does not display the screen information or graphic object.

In this manner, the controller 180 may delete the stored execution information in response to a preset user motion, thereby preventing the unnecessary occupation of the memory with a simple manipulation.

Figure 17E:
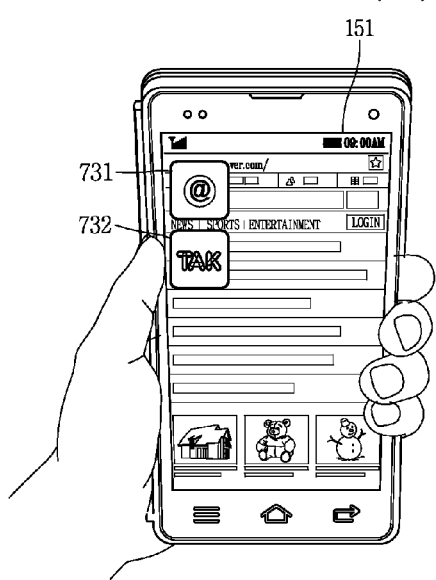
Figure 17E:
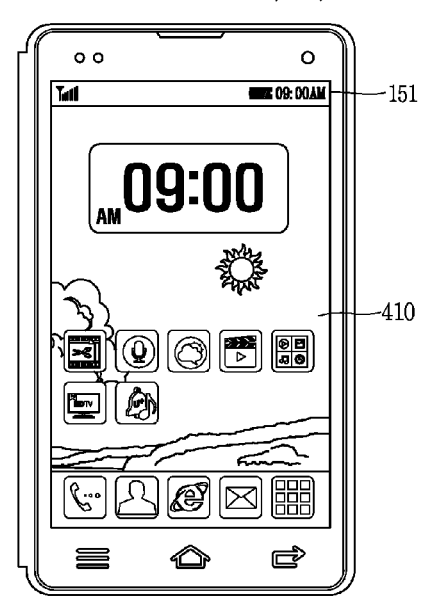

On the other hand, a user motion corresponding to a delete request for prestored execution information may be defined in various ways. For example, when a preset user motion (for example, a motion for inclining the terminal in a third direction different from the foregoing first and the second direction) is applied in a state that a list 730 corresponding to an application for which the execution information has been stored is displayed as illustrated in FIG. 17E(a), the controller 180 may delete the execution information as illustrated in FIG. 17E(b).

Figure 17F:
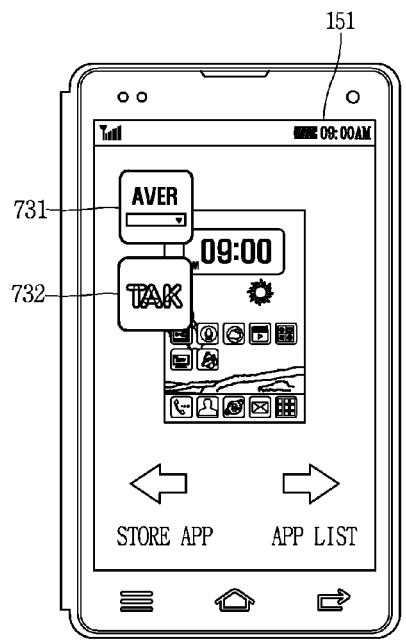
Figure 17F:
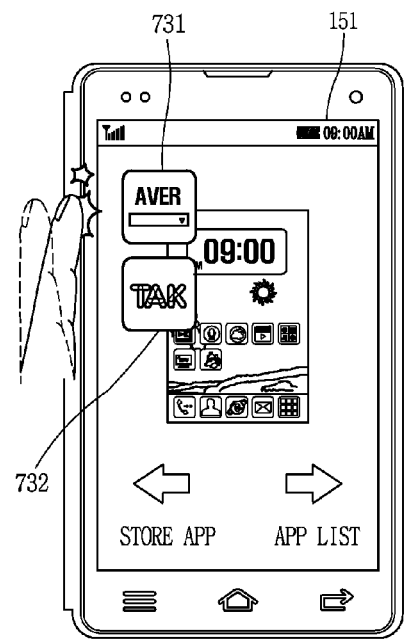
Figure 17F:
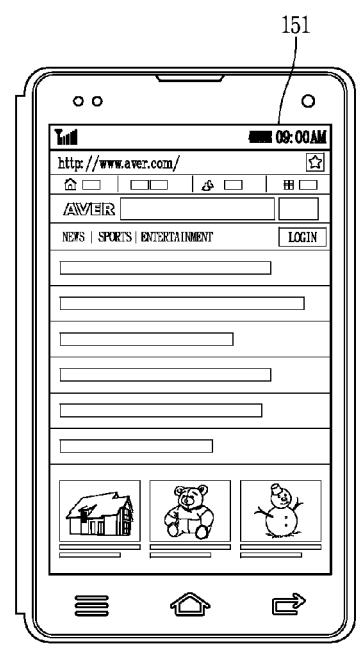

For anther example, when a preset number of taps are applied to the lateral surface (for example, left lateral surface) of the terminal in a state that a list 730 corresponding to an application for which the execution information has been stored as illustrated in FIG. 17F(a), the controller 180 may delete the execution information as illustrated in FIG. 17F(b). At this time, the controller 180 may delete only the execution information of an application corresponding to the graphic object 731 displayed in response to a location to which the tap is applied among the items (or graphic objects 731, 732) contained in the list.

Figure 17G:
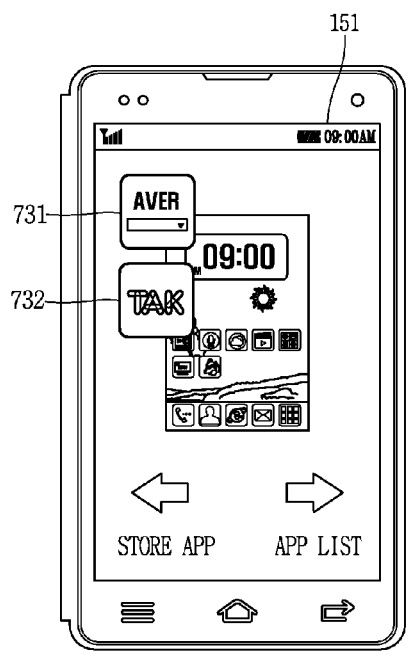
Figure 17G:
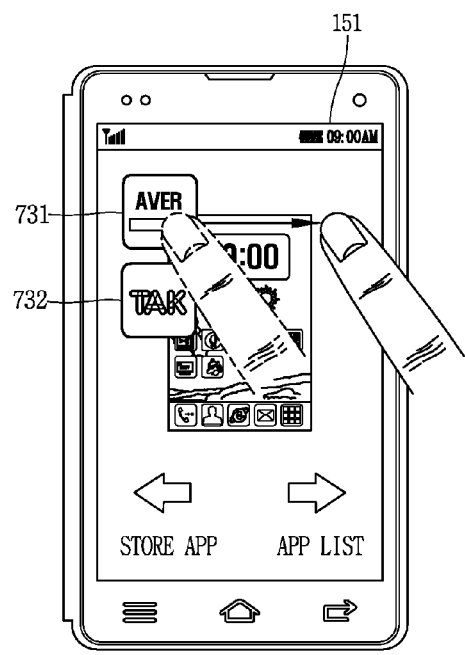
Figure 17G:
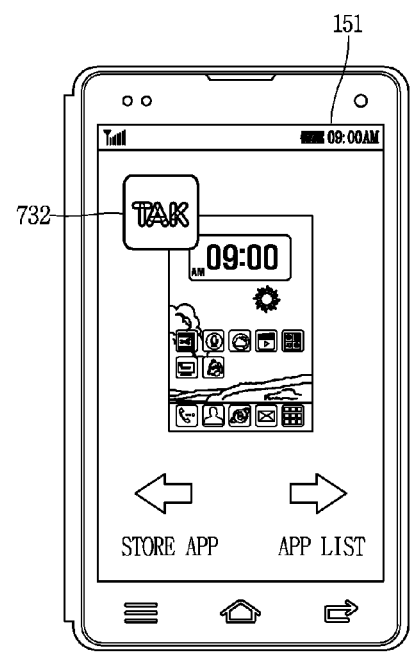

Furthermore, as illustrated in FIG. 17G(a), when a preset type of touch (for example, drag touch or flicking touch) is applied to any one item or graphic object 731 contained in a list in a state that the list 730 indicating information on applications for which the execution information has been stored, the controller 180 may delete only the execution information of an application corresponding to the graphic object 731 to which the preset type of touch is applied. In this manner, according to the present disclosure, it may be possible to delete the entire stored execution information or selectively delete only the execution information based on the user's selection.

On the other hand, as described above, even when the list 730 corresponding to applications for which the execution information has been stored is not displayed, the controller 180 may delete the stored execution information when a preset user motion is applied to the terminal.

On the other hand, when the screen information of an application is stored based on the execution information, and then the screen information of an application is switched to another screen information or the application is terminated without reapplying a user motion for storing the execution information of the relevant application, the controller 180 may delete the stored execution information.

In this manner, according to the present disclosure, there is proposed a method of storing execution information on a specific application using a user motion to allow the user to immediately use the specific application when he or she wants to use it again later though the specific application is not currently used, and then using the specific application again in response to a user request. Accordingly, the user may quickly approach the specific application using a user motion. Moreover, execution information may be stored, used and deleted using an intuitive user motion, thereby enhancing the use convenience of the terminal.

Figure 18A:
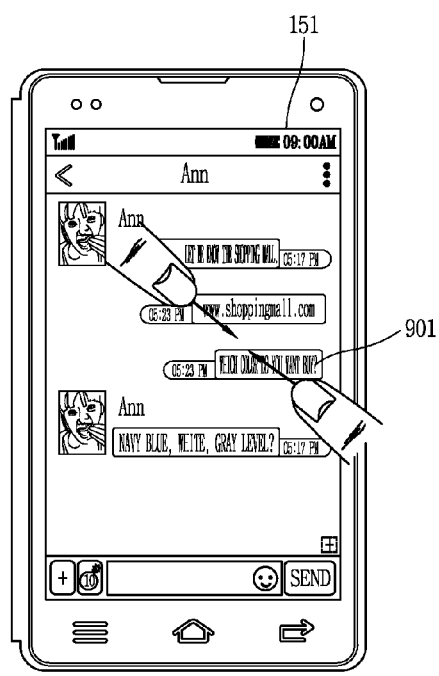
FIGS. 18A(a), 18A(b), 18B, 18C(a), 18C(b), 18C(c), 18D(a), 18D(b), 18E(a), 18E(b), 18E(c), 18E(d), 18E(e), 18F(a), 18F(b), 19A(a), 19A(b), 19A(c), 19B(a), 19B(b), 19B(c), 20A(a), 20A(b), 20A(c), 20B(a), 20B(b), 20B(c), 20C(a), 20C(b), 20C(c), 20D(a), 20D(b), 20D(c), 21A(a), 21A(b), 21A(c), 21A(d), 21B(a), 21B(b), 21B(c), 22A, 22B, 22C, 23A, 23B and 23C are conceptual views for explaining a method of arranging or filtering information using a user motion with respect to a terminal rear surface in a mobile terminal according to the present disclosure.
Figure 18A:
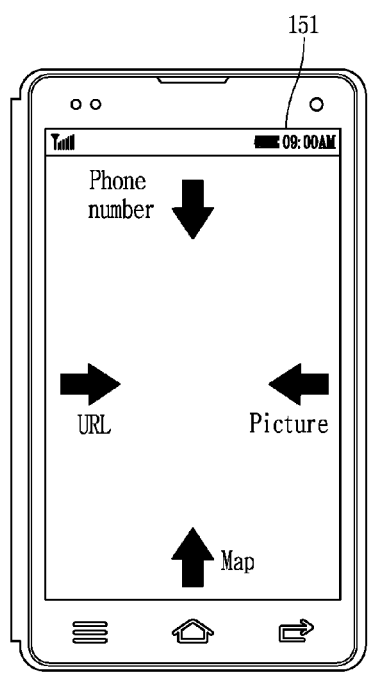

Hereinafter, a method of providing an arrangement function (or filtering function) using a user motion with respect to the rear surface of the terminal body will be described in more detail with reference to the accompanying drawings. FIGS. 18A(a), 18A(b), 18B, 18C(a), 18C(b), 18C(c), 18D(a), 18D(b), 18E(a), 18E(b), 18E(c), 18E(d), 18E(e), 18F(a), 18F(b), 19A(a), 19A(b), 19A(c), 19B(a), 19B(b), 19B(c), 20A(a), 20A(b), 20A(c), 20B(a), 20B(b), 20B(c), 20C(a), 20C(b), 20C(c), 20D(a), 20D(b), 20D(c), 21A(a), 21A(b), 21A(c), 21A(d), 21B(a), 21B(b), 21B(c), 22A, 22B, 22C, 23A, 23B and 23C are conceptual views for explaining a method of arranging or filtering information using a user motion with respect to a terminal rear surface in a mobile terminal according to the present disclosure.

First, referring to FIGS. 18A through 18F, in a dialog box in which incoming messages and outgoing messages are displayed, a user motion is processed as a control command input, thereby performing an arrangement function (or filtering function) for the dialog box.

For example, when a user motion is applied while a message or messenger application, the sensor unit may sense it, and the controller may perform an arrangement function (or filtering function) in the application.

Referring to FIG. 18A, when a user's touch input, for example, pinch-in, is applied in a state that the execution screen of an application is displayed on the display unit, a guide for items becoming a criteria for performing an arrangement function (or filtering function) is displayed on the display unit.

For a more specific example, when a user's touch input, for example, pinch-in, is applied to any one 901 of the outgoing messages (my dialog) and incoming messages (counterpart dialog) in a state that a dialog box is displayed as the execution screen of a message or messenger application on the display unit, an arrangement function (or filtering function) may be carried out on the messages of the corresponding dialog person. Prior to performing an arrangement function (or filtering function), a guide for items becoming a criteria for performing an arrangement function (or filtering function) may be displayed on the display unit. The items may be categories, for example, URL, photo, map, and the like, and the guide may be displayed in four directions in an arrow shape indicating a tap applied to the lateral surface of the terminal.

Figure 18B:
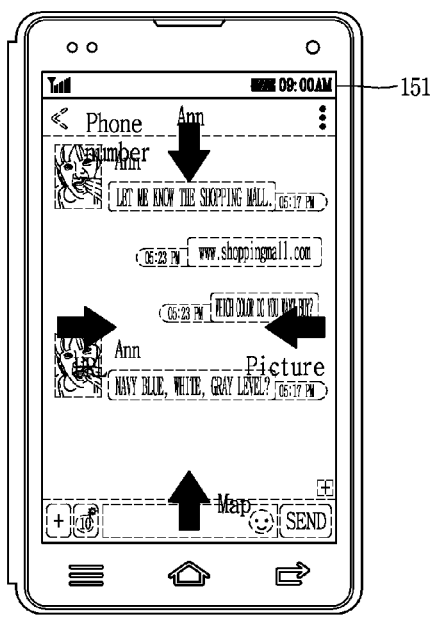

For another example, referring to FIG. 18B, when a user's touch input, for example, pinch-in, is applied to in a state that a dialog box as the execution screen of a message or messenger application is displayed on the display unit, a guide for items becoming a criteria for performing an arrangement function (or filtering function) may be displayed to overlap with the dialog box. In this case, receiving a message from the counterpart is enabled, but transmitting a message to the counterpart may be disabled. The dialog box overlapped with the guide may be updated by reflecting an incoming message when receiving the message.

For another example, when the user's touch input, for example, pinch-in, is applied to any one of the outgoing messages (my dialog) and incoming messages (counterpart dialog), the guide may be also displayed to overlap with only the messages of the corresponding dialog person while listing them.

Figure 18C:
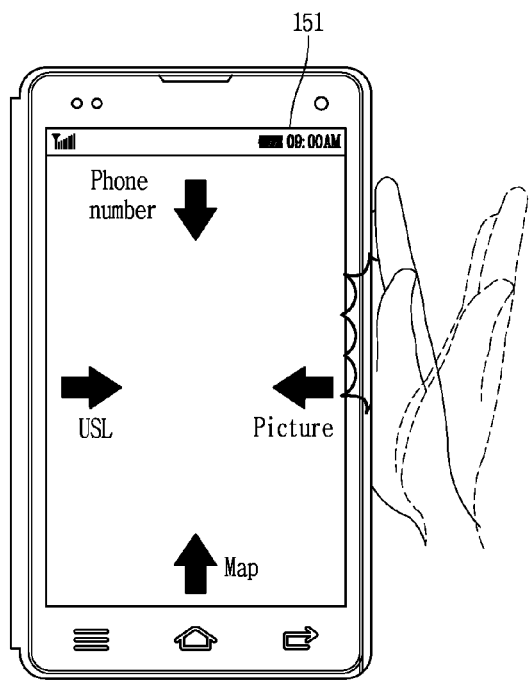
Figure 18C:
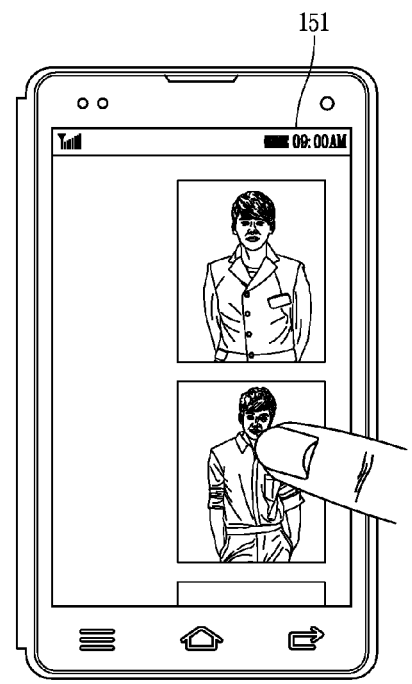
Figure 18C:
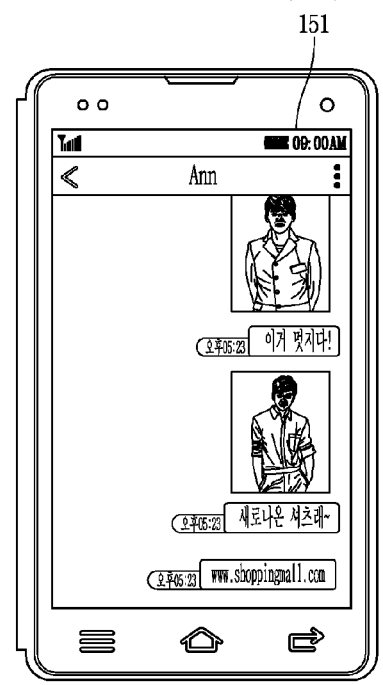

Referring to FIG. 18C, when a tap is applied to the terminal lateral surface along a direction indicated by the guide in the state of FIG. 18A or 18B (see FIG. 18C(a), the sensor unit senses it and the controller processes the tap as the relevant category being selected. For such an example, when a tap is applied to the right lateral surface toward a portion displayed with photo at the right side, the dialog contents may disappear to list only photos. In this case, the subject who transmits photos may be a dialog person of the message to which a pinch-in is applied in the foregoing user input in FIG. 18A or 18B.

As illustrated in FIG. 18C(b), the user may apply a touch input (for example, long touch or short touch) to any one photo on a screen listed with only photos to select the relevant photo. In response to the selection, as illustrated in FIG. 18C(c), messages sent and received around the message that has sent the selected photo may be displayed on the dialog box. In other words, messages prior to or subsequent to the message that has sent the selected photo may be sequentially displayed.

For another example, as illustrated in FIG. 18C(c), when a touch input (for example, drag touch) is applied to a message corresponding to the selected photo in a state that the message that has sent the selected photo is displayed along with messages prior or subsequent thereto the messages may be vertically scrolled. In the scrolled state, when a touch input is applied to a message having URL information in a state that the message that has sent the selected photo is displayed along with messages prior or subsequent thereto, a web browser corresponding to the relevant URL may be displayed (or popped up). However, the present disclosure may not be necessarily limited to this, and for example, when a touch input is applied to a message having URL information without making a drag touch for the scrolling, a web browser corresponding to the relevant URL may be displayed (or popped up).

On the other hand, in the scrolled state, when the drag touch is released, the controller may display an original photo list on the display unit.

Figure 18D:
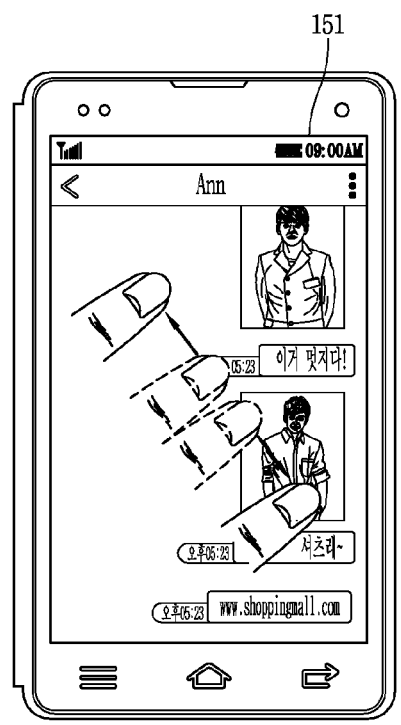
Figure 18D:
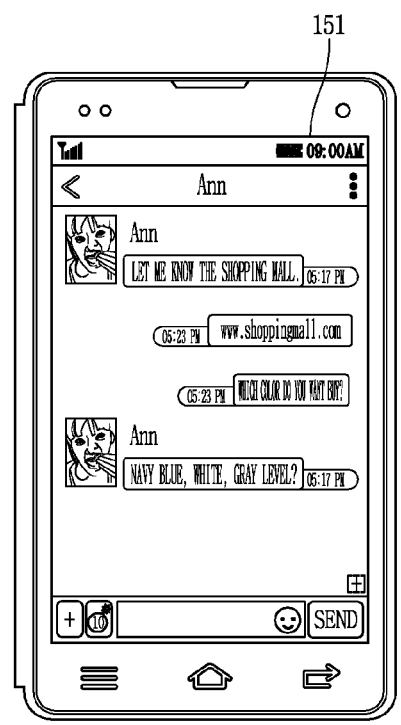

For another example, referring to FIG. 18D, when another touch input, for example, pinch-out, is applied to the selected photo in a state that messages prior or subsequent to the message that has sent the selected photo are sequentially displayed, it may be restored to a state in which a dialog box is initially displayed as the execution screen of a message or messenger application on the display unit.

In the above, a user motion for applying a tap to the lateral surface of the terminal has been mostly described, but the user motion may be generated on both the lateral surface and rear surface of the terminal.

Figure 18E:
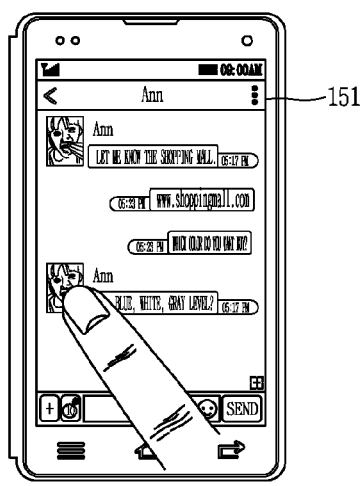
Figure 18E:
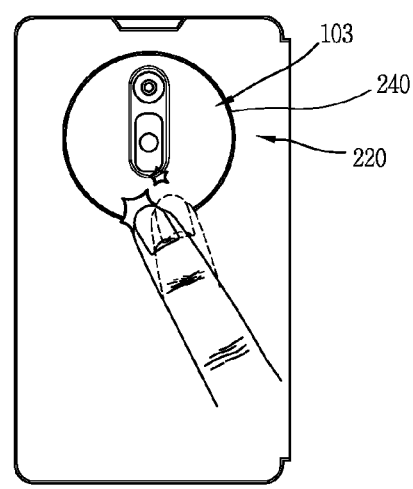
Figure 18E:
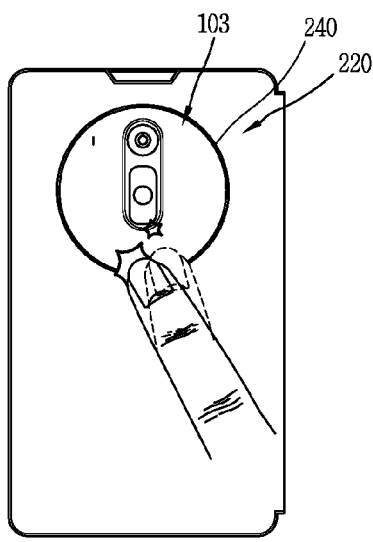
Figure 18E:
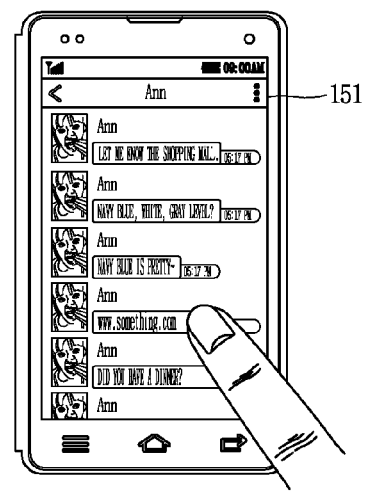
Figure 18E:
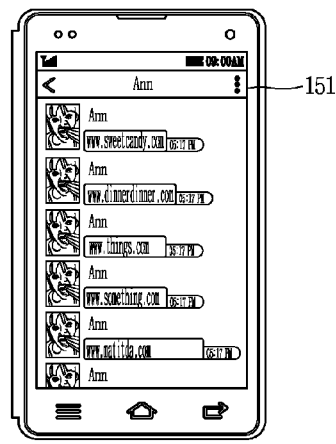

For such an example, as illustrated in FIG. 18E(a), when a user's touch input is applied to any one of the outgoing messages (my dialog) and incoming messages (counterpart dialog) in a state that a dialog box is displayed as the execution screen of a message or messenger application on the display unit, the corresponding dialog person is set as a condition of the arrangement function (or filtering function). Then, as illustrated in FIG. 18E(b), when a tap is applied to the rear surface of the mobile terminal, the sensor unit senses it, and the controller performs an arrangement function (or filtering function) to list only the messages of the corresponding dialog person. In this state, as illustrated in FIG. 18E(c), a message having URL information may be selected by a user's touch input, and in this case, the URL information may be set as a condition of the arrangement function (or filtering function). Then, as illustrated in FIG. 18E(d), when a tap is applied to the rear surface of the mobile terminal, the sensor unit senses it, and the controller performs an arrangement function (or filtering function) to list only messages having the URL information. In this manner, a touch input to a message may be defined as a condition setting of the arrangement function (or filtering function), and a tap input to the rear surface of the mobile terminal may be defined as the execution of the arrangement function (or filtering function).

Figure 18F:
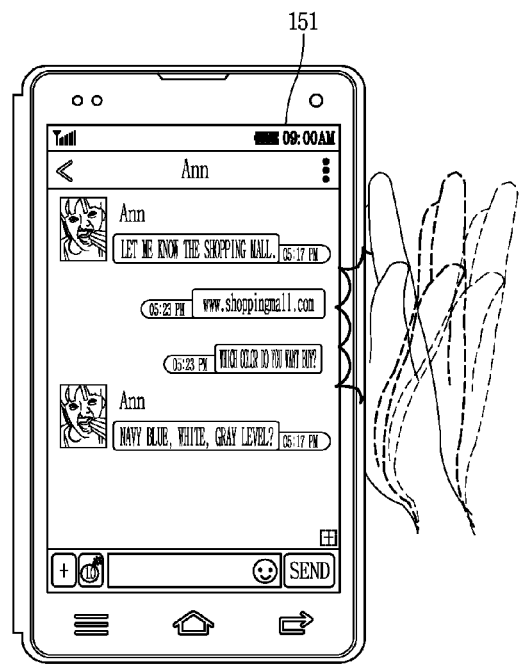
Figure 18F:
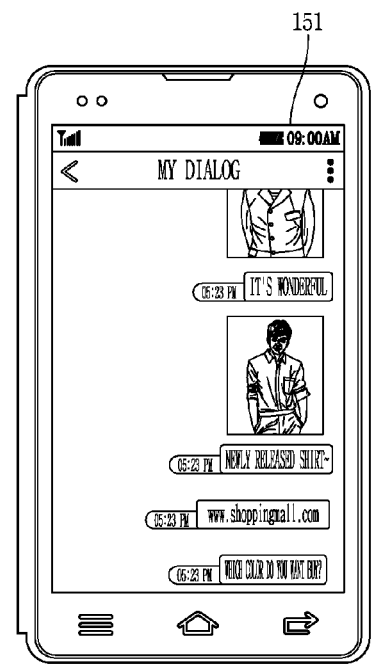

For another example, the object of the arrangement function (or filtering function) may be determined according to a tap applied to which lateral surface of the terminal. More specifically, a tap applied to a first lateral surface of the terminal may be set to a control command for arranging (or filtering) outgoing messages (my dialog), and a tap applied to a second lateral surface (a lateral surface opposite to the first lateral surface) of the terminal may be set to a control command for arranging (or filtering) incoming messages (counterpart dialog). Accordingly, as illustrated in FIG. 18F, when a user's tap (or tap input) is applied to the right lateral surface of the terminal in a state that a dialog box is displayed as the execution screen of a message or messenger application on the display unit, the outgoing messages (my dialog) may be set as a condition of the arrangement function (or filtering function) to list the relevant messages.

Figure 19A:
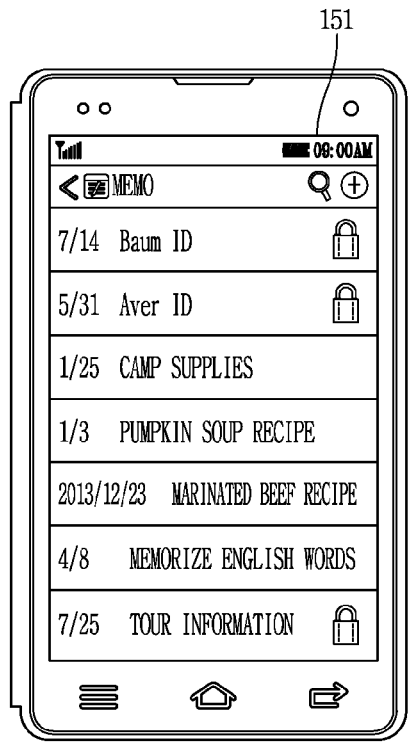
Figure 19A:
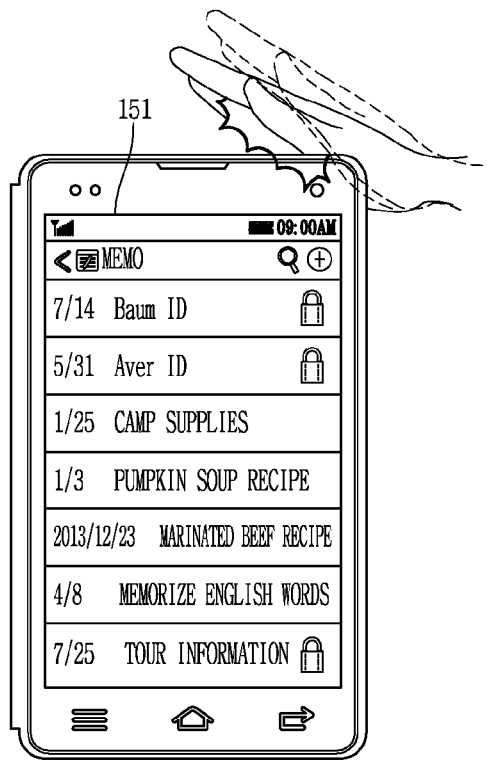
Figure 19A:
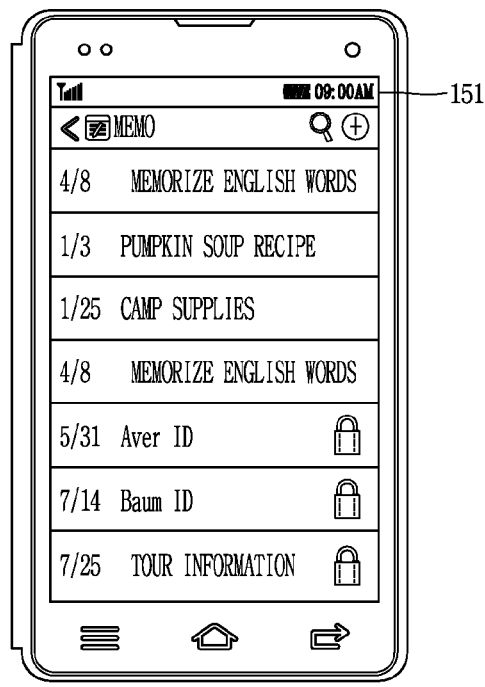
Figure 19B:
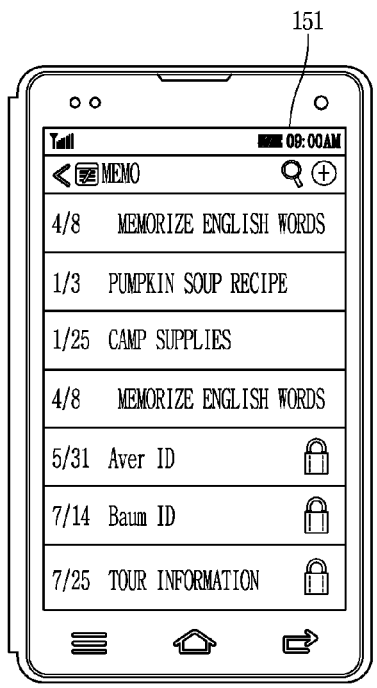
Figure 19B:
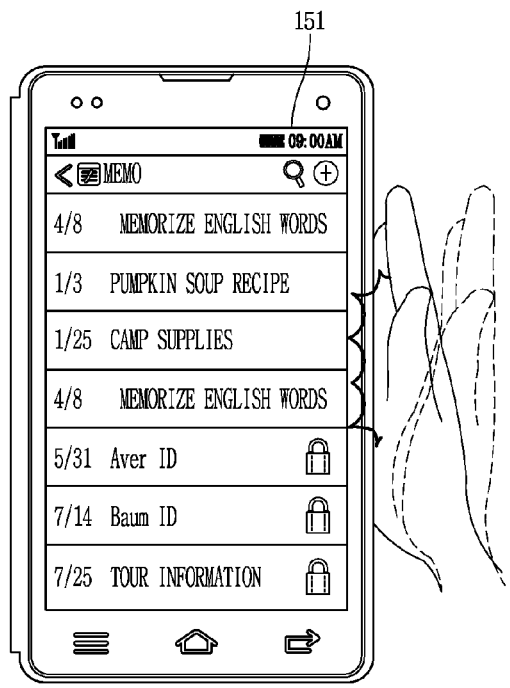
Figure 19B:
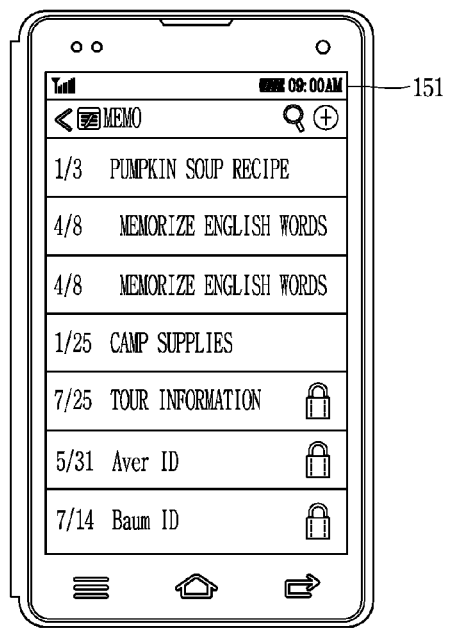

Next, referring to FIGS. 19A and 19B, a criteria of the arrangement may be determined in a list of the specific application according to a location to which a user motion is applied, and the arrangement function (or filtering function) for the list may be carried out based on this.

FIGS. 19A and 19B illustrate a memo application (or to-do application, email application) for such an example, Referring to FIG. 19A(a), when the memo application (or to-do application, email application) is carried out, an execution screen having a list of memos (or to-dos, emails) is displayed on the display unit.

In this case, when a tap (or tap input) is applied to the first location of the terminal, the arrangement scheme may be set based on a first condition, and when a tap (or tap input) is applied to the second location of the terminal, the arrangement scheme may be set based on a second condition.

First, referring to FIG. 19A, when a tap (or tap input) is applied to a right upper end portion of the terminal, the arrangement scheme is changed based on date, and the list is displayed to sequentially show items based on date. For another example, when a tap (or tap input) is applied to a right central portion of the terminal, the arrangement scheme is changed based on subject, and the list is displayed to sequentially show items based on the alphabetical order of the subjects. In this case, the first and the second location may be a right upper end portion and a right central portion, respectively, and the first and the second condition may be date and subject, respectively. For another example, when a tap (or tap input) is applied to a right lower end thereof, a list-up may be carried out based on color, amount of content, priority, and the like.

FIGS. 20A, 20B, 20C, 20D, 21A, 21B, 22 and 23 are conceptual views for explaining a method of arranging or filtering information using a user motion with respect to a terminal rear surface in a mobile terminal according to the present disclosure.

A case of changing an arrangement function (or filtering function) in a list of the specific application according to a location to which user motions are applied while sequentially providing the user motions will be described with reference to FIGS. 20A, 20B, 20C and 20D.

Figure 20A:
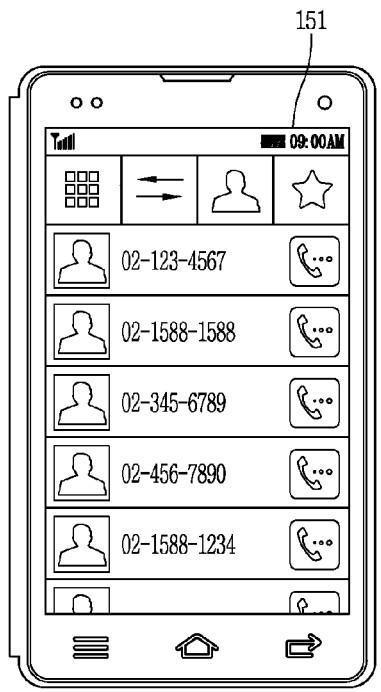
Figure 20A:
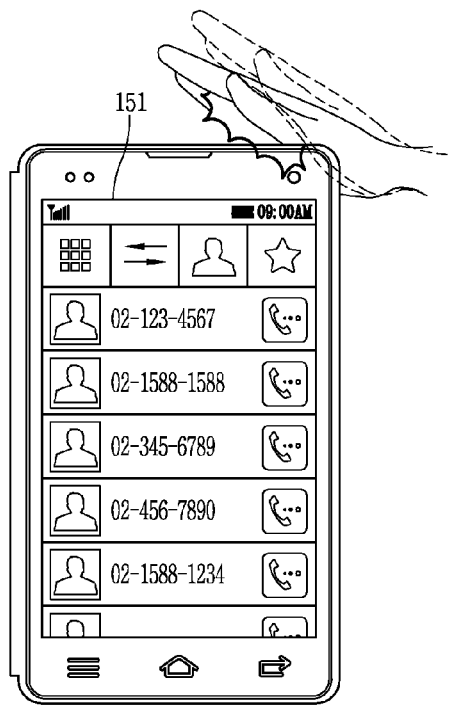
Figure 20A:
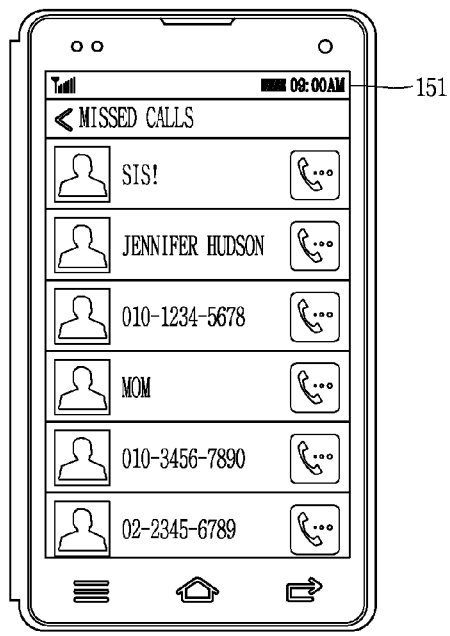

When a tap (or tap input) is applied to the first location of the terminal as illustrated in FIG. 20A(b) in a state that a screen listed with a call log is displayed in a phone application as illustrated in FIG. 20A(a), the arrangement scheme is set based on a first condition to arrange (or filter) the call log in another format. For such an example, when a tap (or tap input) is applied to a right upper end portion of the terminal in a state that the call log is displayed in the time sequence, a missed call list may be filtered and displayed as illustrated in FIG. 20A(c).

Figure 20B:
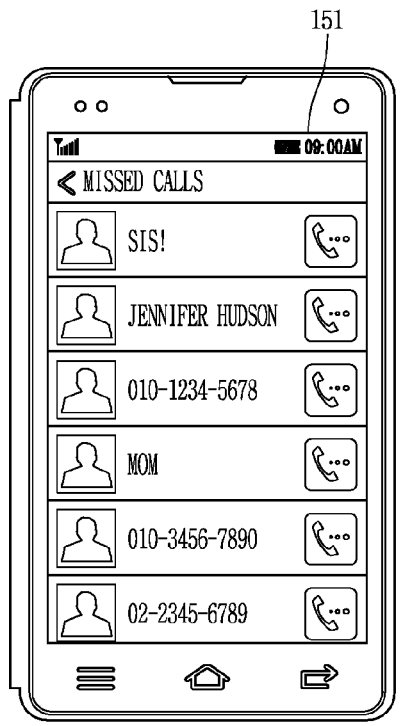
Figure 20B:
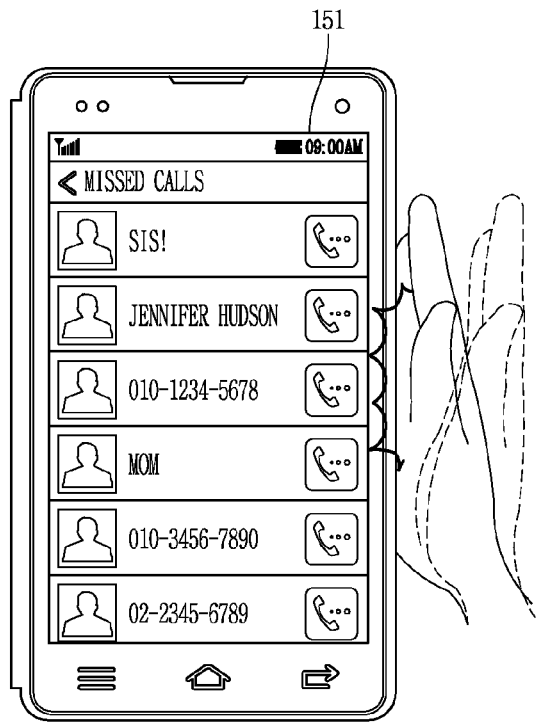
Figure 20B:
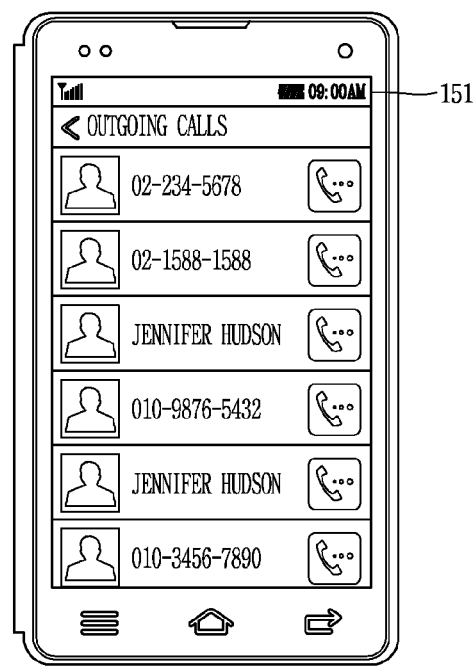

Next, when a tap (or tap input) is applied to the second location of the terminal as illustrated in FIG. 20B(b) in a state that the missed call list is filtered and displayed as illustrated in FIG. 20B(a), the arrangement scheme is set based on a second condition to arrange (or filter) the missed call list in another format. For such an example, when a tap (or tap input) is applied to a right central portion of the terminal in a state that the missed call list is displayed, an outgoing call list may be filtered and displayed as illustrated in FIG. 20B(c). In this case, when a tap (or tap input) is applied to a right lower portion thereof, an incoming call list may be filtered and displayed.

Figure 20C:
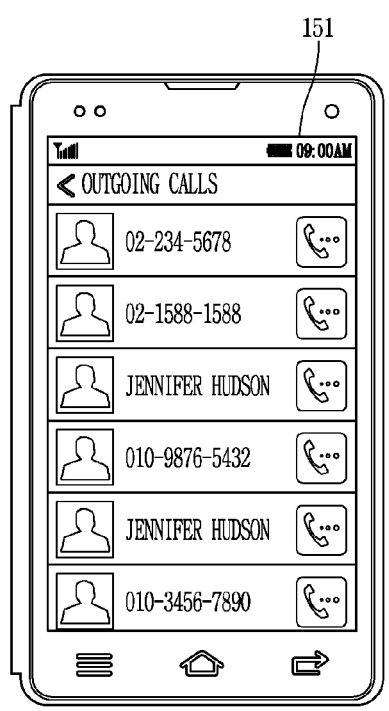
Figure 20C:
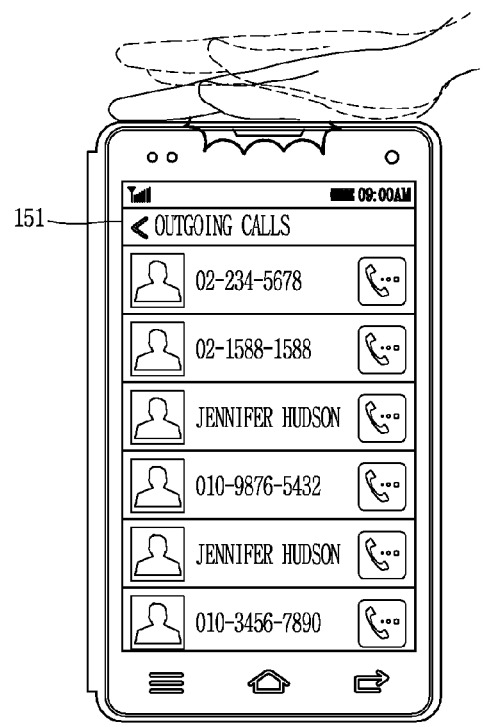
Figure 20C:
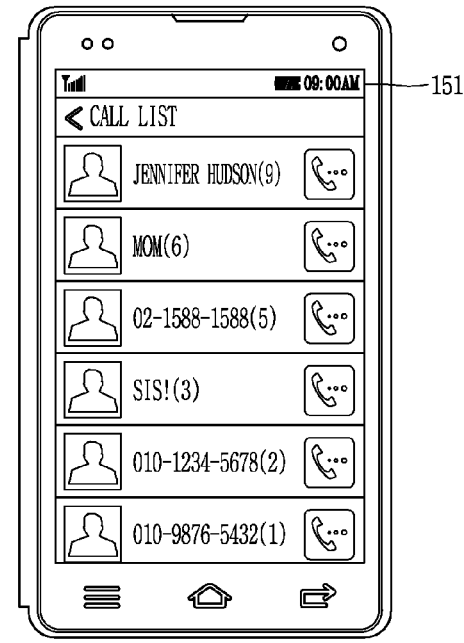

Next, when a tap (or tap input) is applied to the third location of the terminal as illustrated in FIG. 20C(b) in a state that the outgoing call list is filtered and displayed as illustrated in FIG. 20C(a), the arrangement scheme is set based on a third condition to arrange (or filter) the outgoing call list in another format. For such an example, when a tap (or tap input) is applied to an upper end portion of the terminal in a state that the outgoing call list is displayed, a list displayed in a recently frequent contact sequence may be filtered and displayed as illustrated in FIG. 20C(c). In other words, the third condition may be a number of contacts, and may include at least one of a number of incoming and outgoing messages and a number of incoming and outgoing calls.

However, the present disclosure may not be necessarily limited to a location sequence in which the foregoing tap (or tap input) is applied. The sequence in which the foregoing tap (or tap input) is applied may be changed with each other. Furthermore, a list to be displayed by a tap (or tap input) applied to the first through the third location may be arranged (or filtered) based on the first through the third condition regardless of the list displayed prior to applying the tap.

Figure 20D:
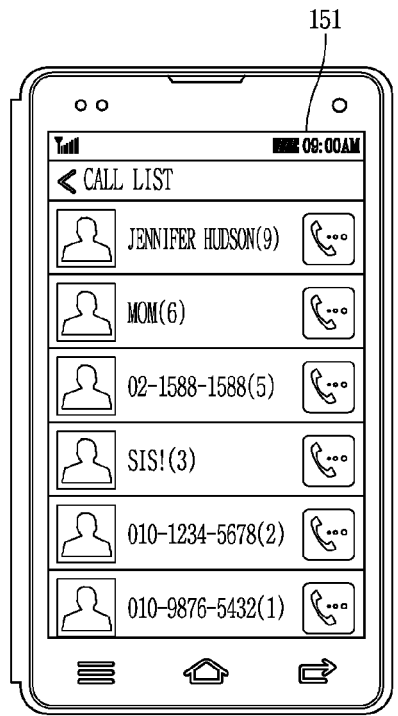
Figure 20D:
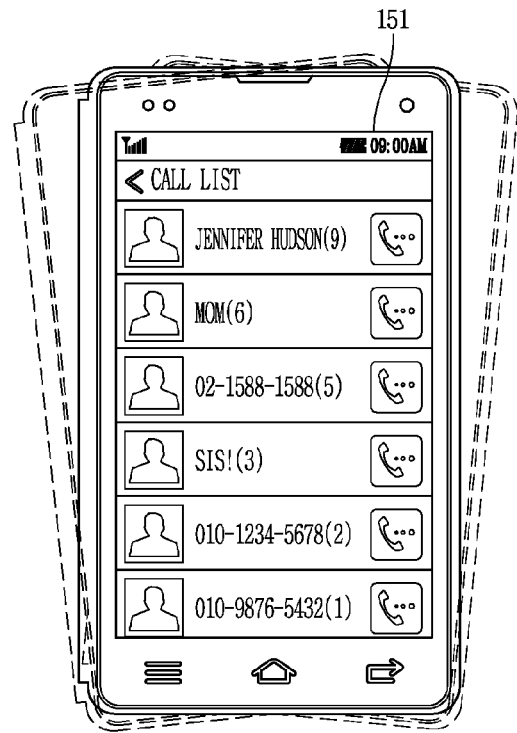
Figure 20D:
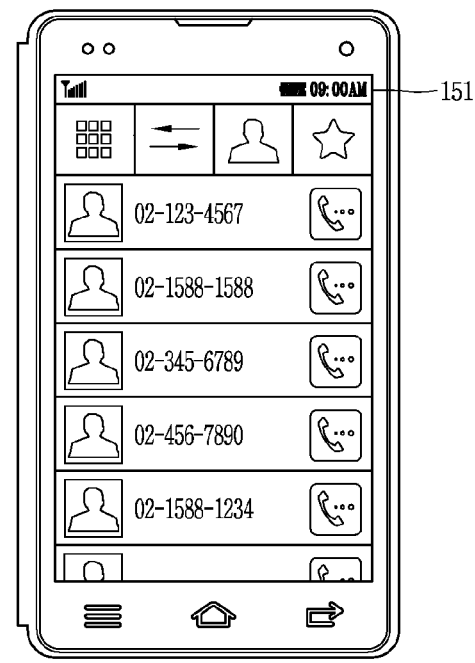

On the other hand, referring to FIG. 20D, when another type of input is applied to the mobile terminal in a state that a tap (or tap input) is applied to the first, the second and the third location, a screen shown with the call log may be displayed in a time sequence. The another type of input may be an input for horizontally shaking the mobile terminal, and the sensor unit senses a user's motion for applying the another type of input.

Next, a method of processing a tap input applied to the lateral surface of the terminal in a gallery application will be described with reference to FIGS. 21A and 21B.

Figure 21A:
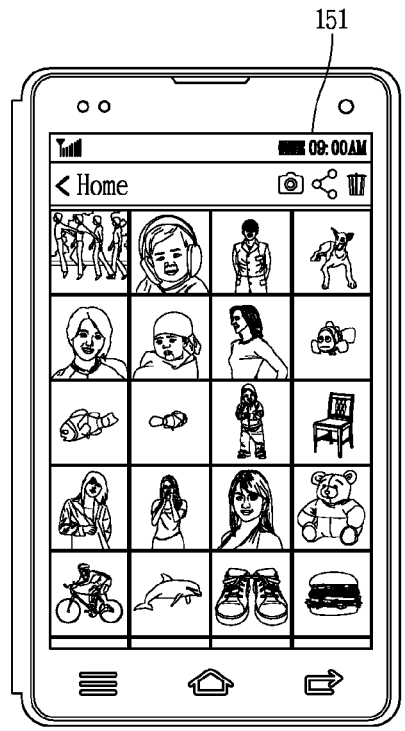
Figure 21A:
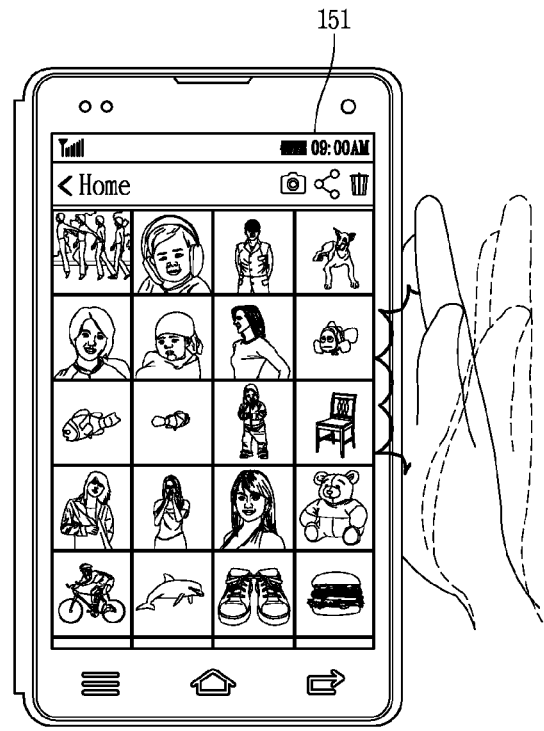
Figure 21A:
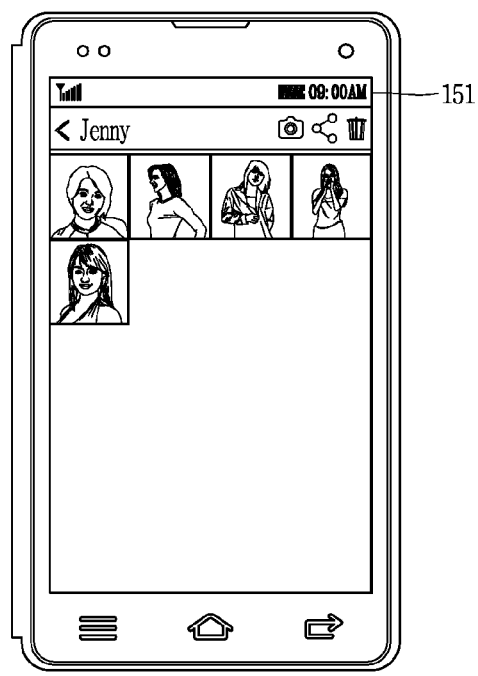
Figure 21A:
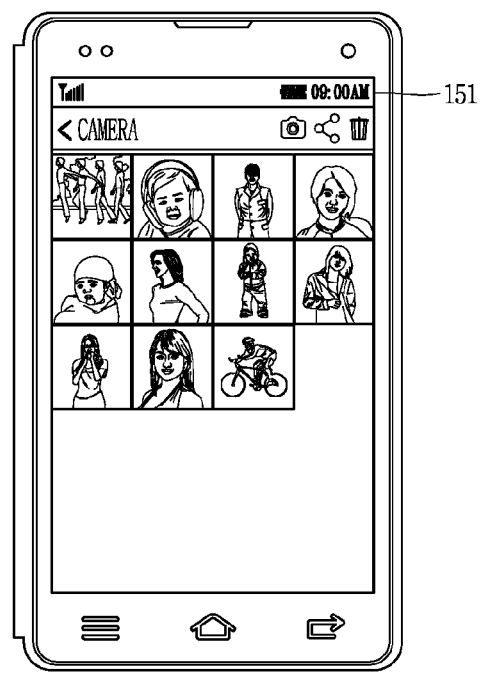
Figure 21B:
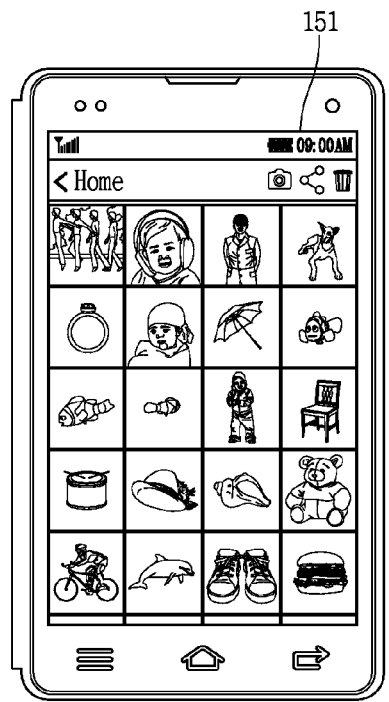
Figure 21B:
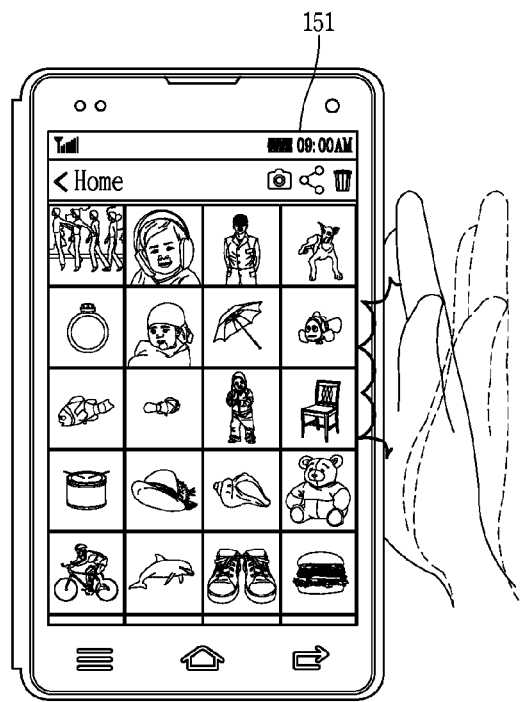
Figure 21B:
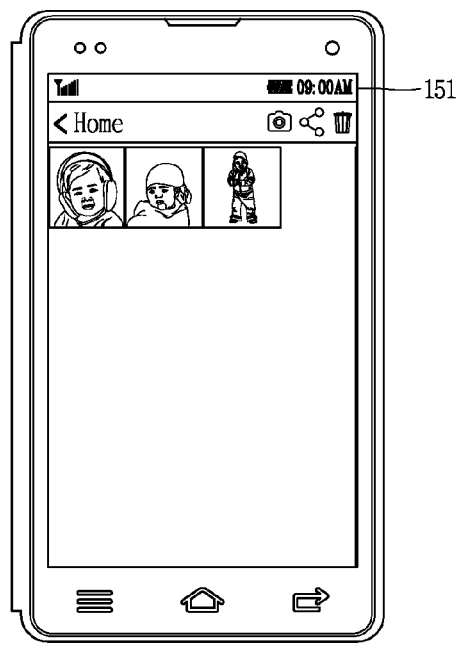

When a tap input is applied to the lateral surface of the terminal as illustrated in FIG. 21A(b) in a state that a gallery application is executed to display a gallery list screen on the display unit as illustrated in FIG. 21A(a), the sensor unit senses the tap (or tap input). In this case, the processing of the tap (or tap input) may vary according to a specific condition associated with the gallery application. For example, when there is no folder generated by the user, the controller enters a camera folder to filter portrait photos in response to the tap (or tap input) as illustrated in FIG. 21A(c). Furthermore, when there is a folder generated by the user, the controller enters a recently updated folder (for example, Jenny portrait folder) to filter the portrait photos in response to the tap (or tap input) as illustrated in FIG. 21A(d).

On the contrary, as illustrated in FIG. 21A(c), it may be also possible to list photos in the relevant folder in the state of entering a camera folder, and recognize and list only portrait photos in a current folder when a tap (or tap input) is applied to the rear surface of the terminal again. For a more specific example, as illustrated in FIG. 21B(a), when entering a specific folder of the gallery application to apply a tap (or tap input) to the rear surface of the terminal in a state that photos in the relevant folder are displayed, the sensor senses the tap (or tap input). In this case, portrait photos in the relevant folder may be filtered in response to the tap (or tap input). For such an example, only photos with recently captured persons may be filtered and shown or only photos with many hits may be filtered and shown according to a preset condition. For another example, photos may be scrolled by a user's drag touch to a screen displayed with photos in the relevant folder, and some of the whole photos in the folder may be displayed on the display unit by the scrolling. At this time, when a tap (or tap input) is applied to the lateral surface of the terminal, the controller may perform filtering based on a figure contained in the displayed some photos.

Next, a method of filtering information associated with a keyword in response to a user motion applied to the terminal body in a mobile terminal according to the present disclosure will be described.

When information is retrieved in response to an input keyword in a mobile terminal according to the present disclosure, the controller 180 may perform a filtering (or arrangement) function for the search result.

Figure 22A:
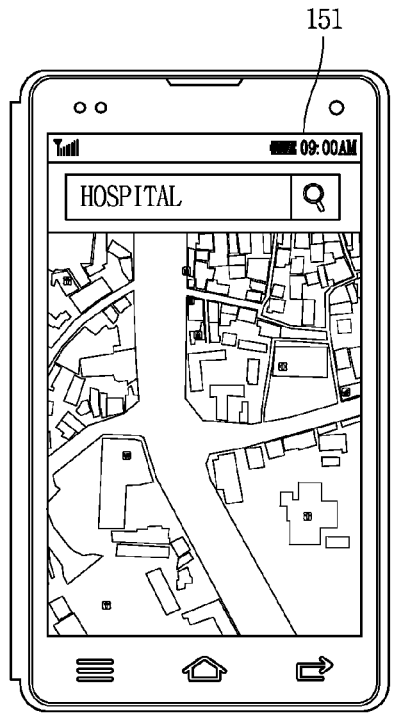
Figure 22B:
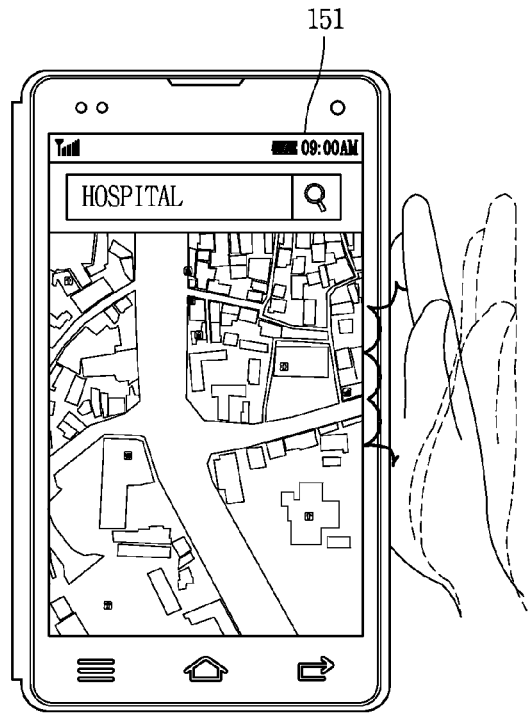
Figure 22C:
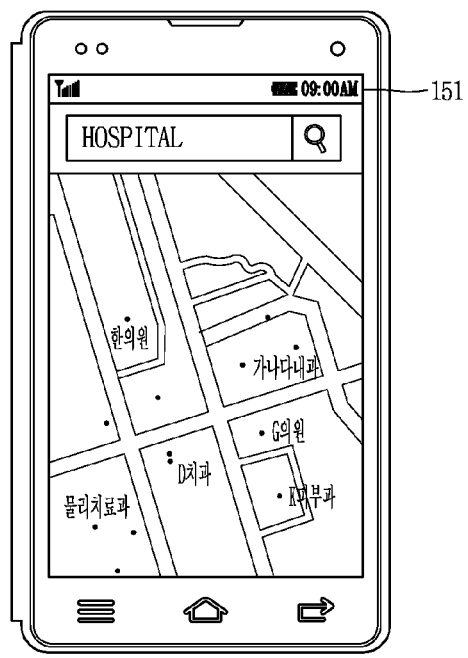

For example, when a tap (or tap input) is applied to a specific portion (for example, right portion) of the terminal as illustrated in FIG. 22B in a state that information corresponding to an input keyword (for example, "hospital") is retrieved in a map-related application (or navigation application) as illustrated in FIG. 22A, the controller 180 may filter the search result as illustrated in FIG. 22C. For example, when the user motion is applied in a state that a map corresponding to the keyword is displayed, the controller 180 may display only a graphic object of a building corresponding to the keyword, and may not display a graphic object corresponding to another building. Moreover, the controller 180 may adjust the scale of the map to more specifically display map information at a place including the graphic object corresponding to a building corresponding to the keyword.

Figure 23A:
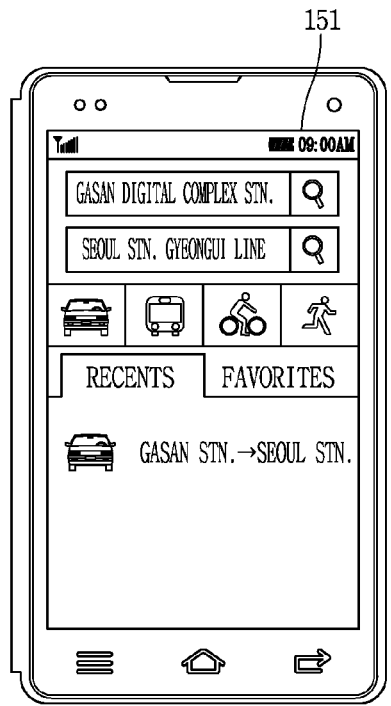
Figure 23B:
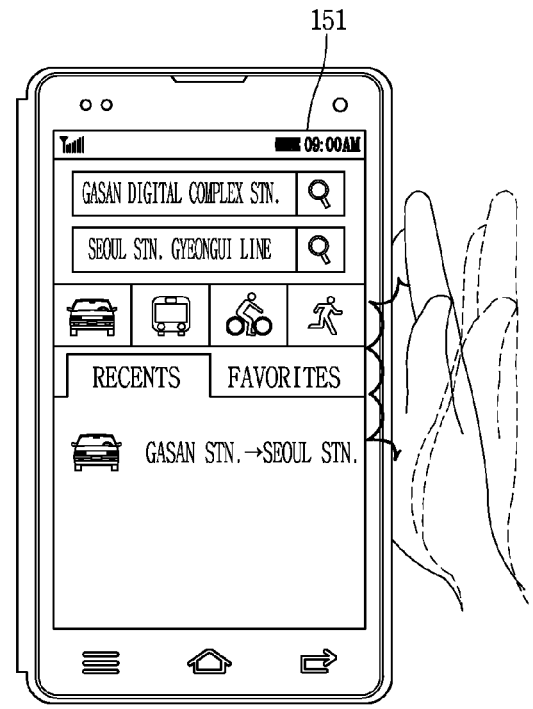
Figure 23C:
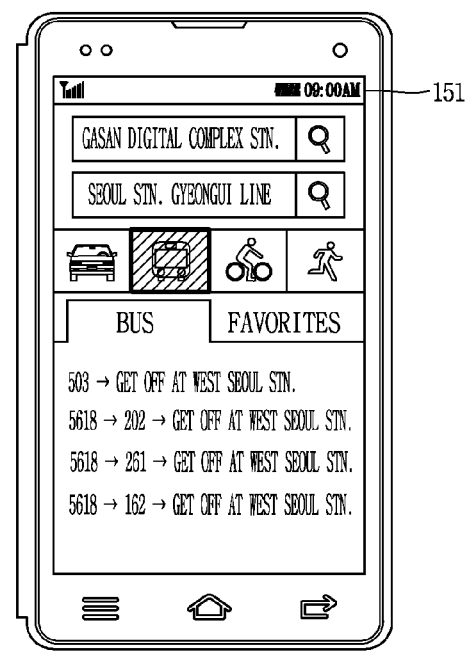

For another example, when a tap (or tap input) is applied to a specific portion (for example, right portion) of the terminal as illustrated in FIG. 23B in a state that destination information corresponding to a route is received and transportation information is displayed in response to this as illustrated in FIG. 23A, the controller 180 may arrange and display a search result based on the transportation as illustrated in FIG. 23C. The controller 180 displays route information corresponding to first transportation (for example, subway) when a user motion is applied to the terminal, display route information corresponding to second transportation (for example, bus) when the user motion is applied again. In this manner, upon applying a user motion, the controller 180 may display route information while being switched to route information corresponding to different criteria, respectively. Accordingly, the user can selectively receive only information corresponding to his or her desired transportation.

Figure 24A:
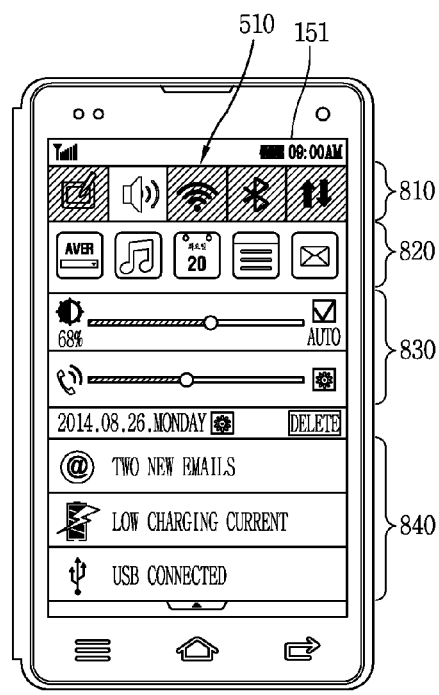
FIGS. 24A(a), 24A(b), 24A(c), 24B(a), 24B(b), 24B(c), 24C(a), 24C(b), 24C(c), 24D(a), 24D(b) and 24D(c) are conceptual views for explaining a method of arranging GUI screens for controlling a terminal operation.
Figure 24A:
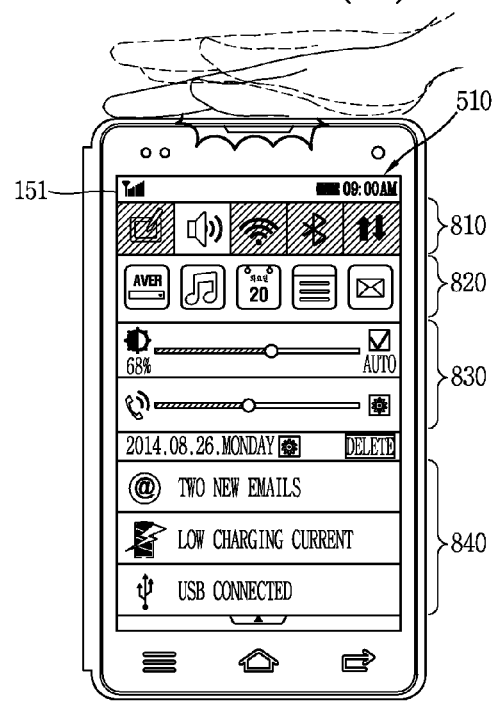
Figure 24A:
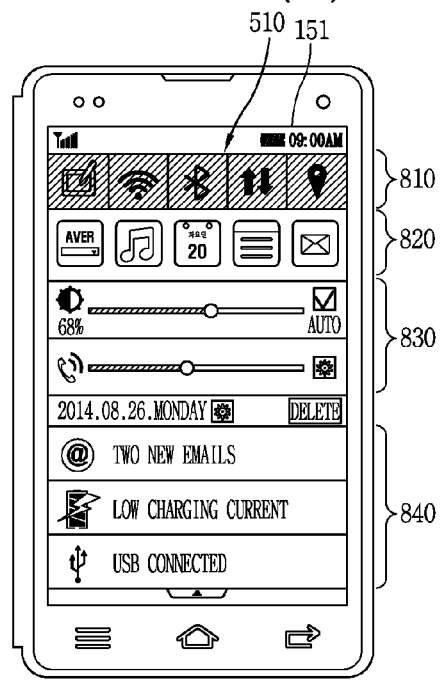

Hereinafter, a method of controlling an information display window using a user motion with respect to the rear surface of the terminal body will be described in more detail with reference to the accompanying drawings. FIGS. 24A (a), 24A(b), 24A(c), 24B(a), 24B(b), 24B(c), 24C(a), 24C (b), 24C(c), 24D(a), 24D(b) and 24D(c) are conceptual views for explaining a method of arranging GUI screens for controlling a terminal operation.

On the other hand, as described above, information associated with the operation status of the mobile terminal (for example, wireless communication status, application update status, etc.), environmental status (for example, current time), event reception of an application, and the like may be displayed in one region in a mobile terminal according to the present disclosure. Said one region may be located adjacent to any one of the edge regions of the display unit, and a region displayed with the information may be referred to as a "status display line" or "status bar". Meanwhile, when a preset type of touch (for example, drag touch) is applied to a region displayed with the status display line, the controller 180 displays detailed information on information displayed on the status display line, an icon, a graphic object or the like associated with the function control of the terminal on the display unit 151.

The controller 180 may terminate the display of screen information displayed in a display area excluding the status display line prior to applying the preset type of touch to display detailed information on information displayed on the status display line, an icon, a graphic object or the like associated with the function control of the terminal in response to the preset type of touch to the status display line.

Here, the controller 180 may control the display unit 151 to include detailed information on information displayed on the status display line, an icon, a graphic object or the like associated with the function control of the terminal on the information display window 510 (refer to FIG. 24A(a)), and gradually display the information display window 510 in response to a preset type of touch to the status display line. At this time, the information display window 510 may be displayed to overlap with screen information previously displayed on the display unit 151. The information display window 510 may disappear on the display unit in response to a preset type of touch to the information display window 510, and at this time, screen information that has been previously displayed on the display unit 151 prior to displaying the information display window 510 may be displayed again.

When the preset type of touch is a drag touch, the controller 180 may display the information display window 510 in response to a drag touch in a first direction to the status display line, and allow the information display window 510 to disappear in response to a drag touch in a second direction opposite to the first direction to the information display window 510.

In this manner, the information display window 510 may be displayed or disappear based on a touch to the display unit 151.

On the other hand, various types of information may be displayed on the information display window 510. The controller 180 may display different types of information in a plurality of regions, respectively, included in the information display window 510.

For example, control icons for controlling the operation or function of the mobile terminal may be displayed in the first region 810 of the information display window 510, and frequently used application icons may be displayed in the second region 820. Furthermore, a graphic object for controlling the output (for example, brightness of illumination, size of volume, etc.) of the terminal may be displayed in the third region 830, and event information corresponding to an event that has occurred may be displayed in the fourth region 840. Meanwhile, the type of information displayed on the information display window 510 may be modified in various ways.

On the other hand, the controller 180 may arrange information displayed on the information display window 510 or change or selectively display the display order (or placement order) in response to a user motion applied to the terminal body in a state that the information display window 510 is displayed.

For example, when a preset type of user motion (for example, a tap motion hitting twice on an upper lateral surface of the terminal) is applied to a lateral surface of the terminal as illustrated in FIG. 24A(c), the controller 180 may change the placement order of control icons included in the first region 810 based on a control icon corresponding to a function currently activated or being executed in the mobile terminal among the control icons included in the first region 810 as illustrated in FIG. 24A(b). For example, the controller 180 may control the display unit 151 such that a control icon corresponding to a function currently activated or being executed in the mobile terminal is preferentially displayed than a control icon corresponding to a function currently deactivated or not being executed.

Figure 24B:
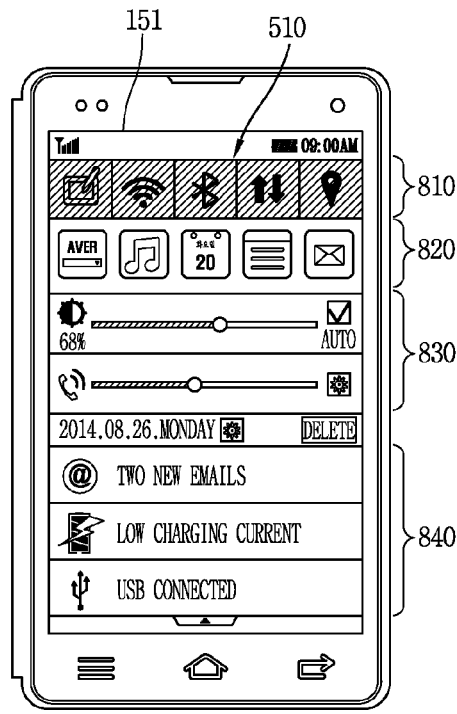
Figure 24B:
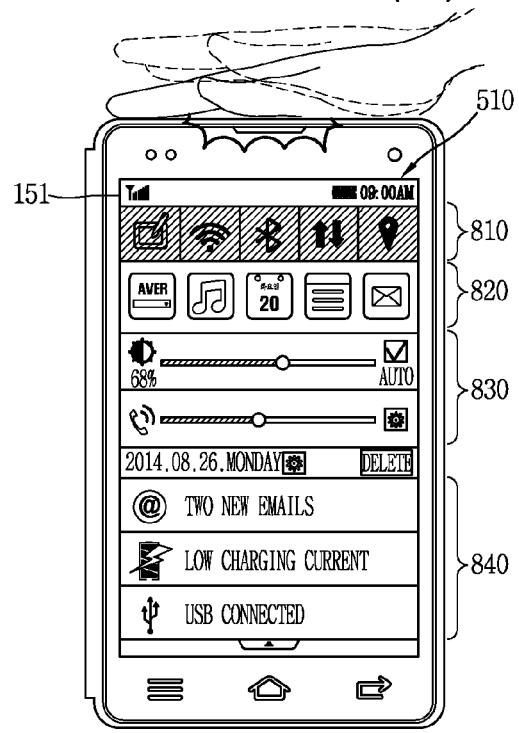
Figure 24B:
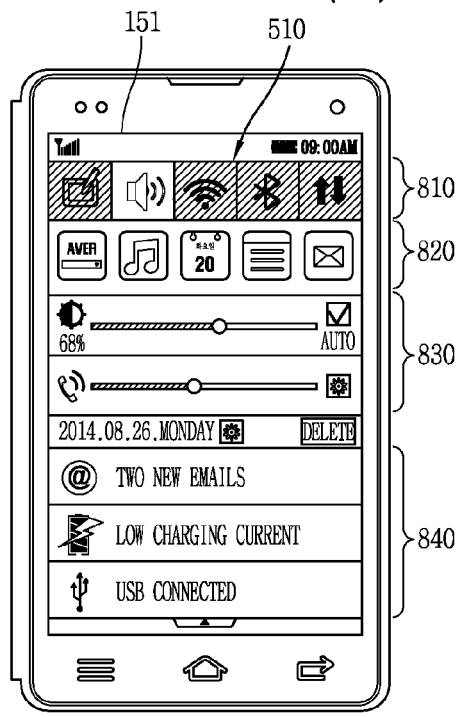

On the other hand, when a preset user motion (for example, a tap motion hitting twice on an upper lateral surface of the terminal) is applied to the terminal body as illustrated in FIG. 24B(b) in a state that control icons included in the first region 810 are rearranged based on a control icon corresponding to a function currently activated or being executed in the mobile terminal among the control icons included in the first region 810 as illustrated in FIG. 24B(a), the arrangement order (or display order) of control icons included in the first region 810 may be restored back again as illustrated in FIG. 24B(c).

Figure 24C:
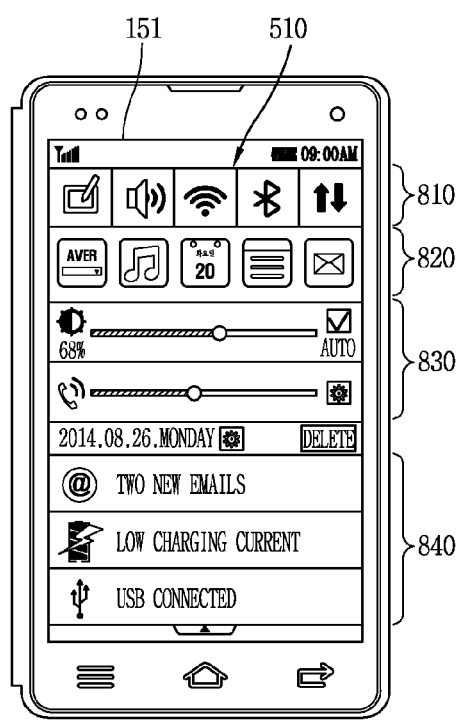
Figure 24C:
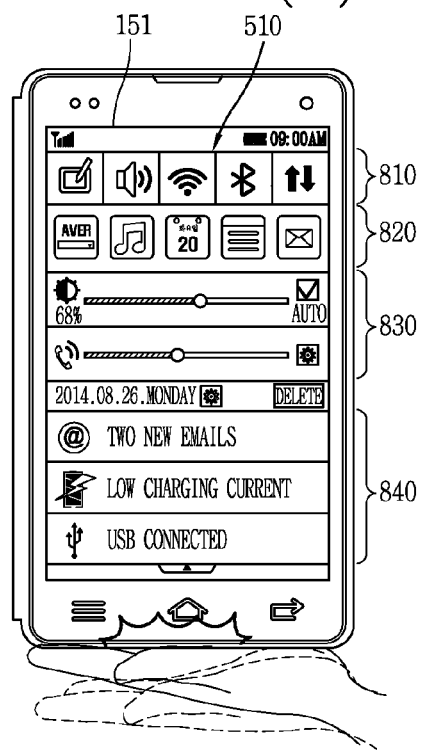
Figure 24C:
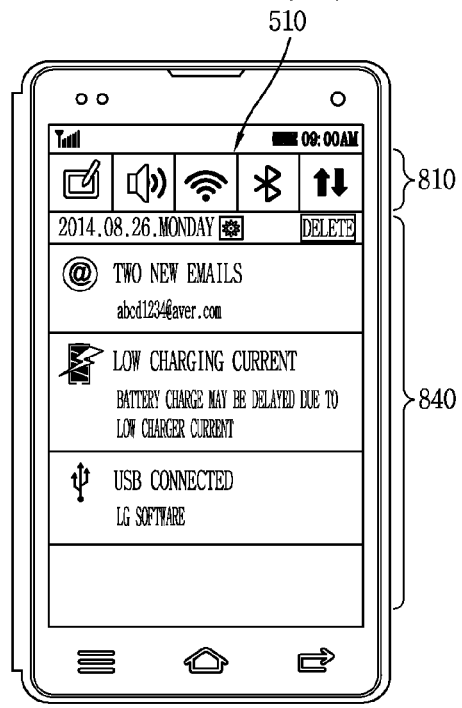

For another example, the controller 180 may selectively display only information contained in any one of a plurality of regions 810, 820, 830, 840 included in the information display window in response to a preset user motion (for example, a tap motion hitting twice on a lower lateral surface of the terminal) to the terminal body. For example, when a preset user motion (for example, a tap motion hitting twice on a lower lateral surface of the terminal) to the terminal body as illustrated in FIG. 24C(b) in a state that a plurality of regions 810, 820, 830, 840 are included in the information display window as illustrated in FIG. 24C(a), the controller may display only information contained in any one of the plurality of regions 810, 820, 830, 840 but not display information contained in the other regions.

Here, the any one region may be a region displayed with event information, and at this time, the detailed information on an event may be displayed on the information display window 510.

On the other hand, whether or not to display only information contained in any one of the plurality of regions may be determined based on a location of the terminal body to which a user motion is applied or a scheme of the user motion, and the like.

Figure 24D:
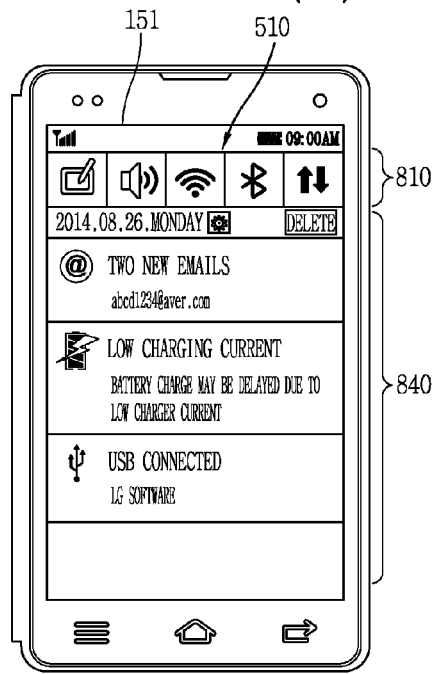
Figure 24D:
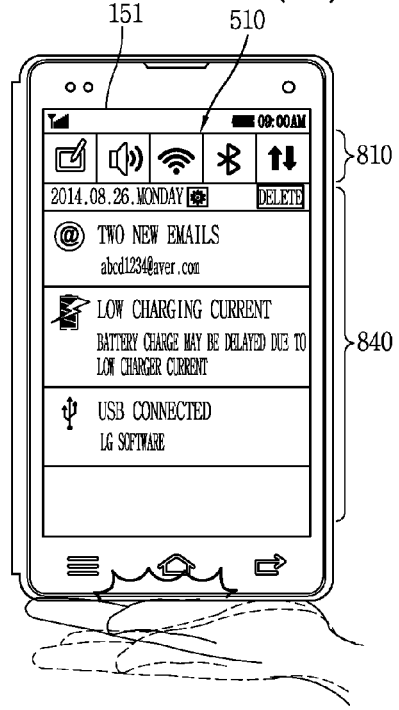
Figure 24D:
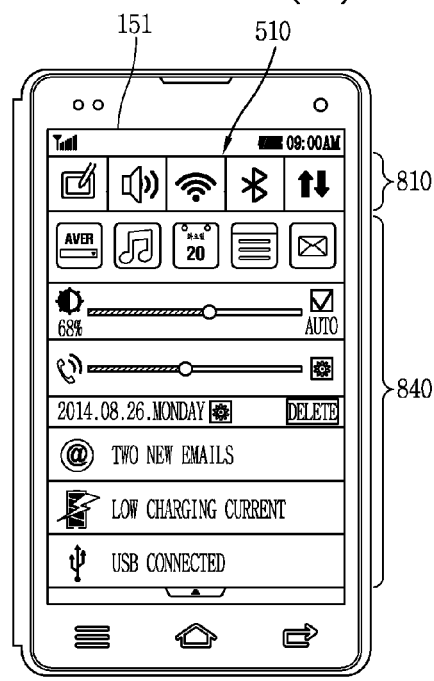

On the other hand, when a preset user motion (for example, a tap motion hitting twice on a lower lateral surface of the terminal) is applied to the terminal body as illustrated in FIG. 24D(b) in a state that only information contained in any one region is displayed as illustrated in FIG. 24D(a), the display status of the information display window 510 may be restored back again as illustrated in FIG. 24D(c). In other words, the controller 180 may control the display unit 151 to include the plurality of regions 810, 820, 830, 840 again on the information display window 510.

On the other hand, the controller 180 may perform a different control operation for the information display window according to a user motion applied to which location of the terminal body. For example, the controller 180 may perform control on the first region 810 when a tap motion is applied to an upper lateral surface of the terminal body as illustrated in FIGS. 24A(a), 24A(b), 24A(c), 24B(a), 24B(b) and 24B(c) perform control on the fourth region 840 when a tap motion is applied to a lower lateral surface of the terminal body as illustrated in 24C(a), 24C(b), 24C(c), 24D(a), 24D(b) and 24D(c).

On the other hand, the mobile terminal may be extended to a wearable device that is wearable on a body beyond the dimension that is mostly used by a user while holding it in his or her hand. The wearable device may include a smart watch, a smart glass, a head mounted display (HMD), and the like.

The wearable device may be configured to exchange (or link) data with another wearable device, a bar type, a folder type or a slide type terminal. Hereinafter, the wearable device will be described as a watch type mobile terminal, for example, and another terminal communicating with the wearable device will be described as a bar type mobile terminal, for example, as illustrated in FIGS. 1B and 1C.

Figure 25:
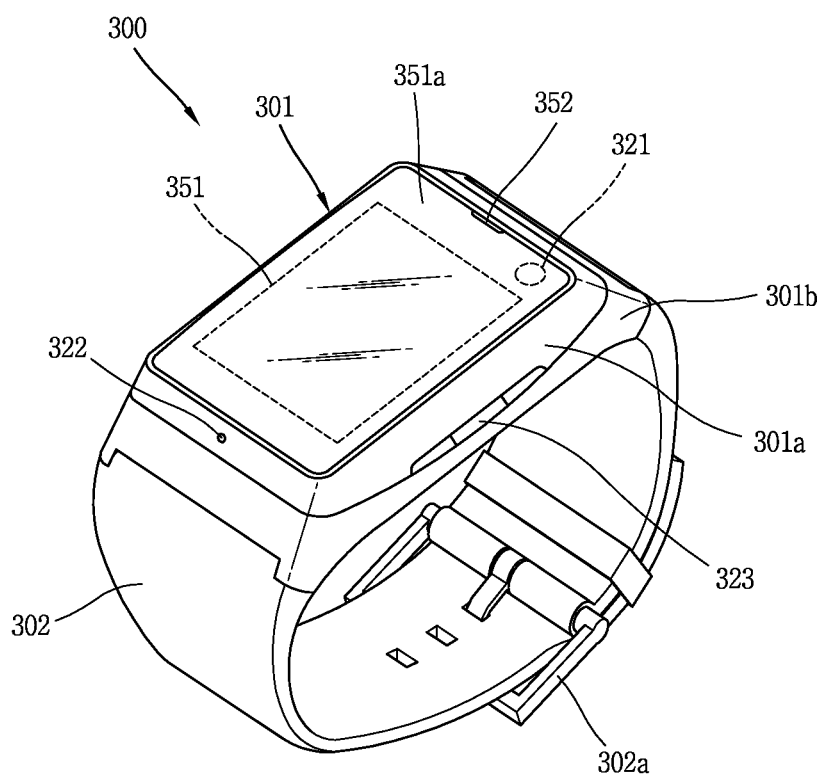
FIG. 25 is a perspective view illustrating an example of a watch type mobile terminal associated with another embodiment of the present disclosure.

FIG. 25 is a perspective view illustrating an example of a watch type mobile terminal associated with another embodiment of the present disclosure.

Referring to FIG. 25, a watch type mobile terminal 300 may include a body 301 having a display unit 351 and a band 302 connected to the body 301 to be wearable on a wrist. In general, the mobile terminal 300 may include the characteristics of the mobile terminal in FIG. 1A through 1C or characteristics similar thereto.

The body 301 may include a case forming an external appearance. As illustrated in the drawing, the case may include a first case 301*a* and a second case 301*b* to provide an inner space for accommodating various electronic elements. However, the present disclosure may not be necessarily limited to this, and one case may be configured to provide the inner space, thereby implementing the watch type terminal 300 with a unibody.

The watch type terminal 300 may be configured to perform wireless communication, and an antenna for the wireless communication may be installed on the body 301. Meanwhile, the antenna may extend its performance using the case. For example, a case containing a conductive material may be configured to be electrically connected to the antenna to extend the ground area or radiation area.

The display unit 351 may be disposed on a front surface of the body 301 to display information, and a touch sensor may be provided on the display unit 351 to implement a touch screen. As illustrated in the drawing, a window 351*a* of the display unit 351 may be mounted on a first case 301*a* to form a front surface of the terminal body along with the first case 301*a*.

An audio output unit 352, a camera 321, a microphone 322, a user input unit 323 and the like may be provided in the body 301. When the display unit 351 is implemented with a touch screen, it may function as the user input unit 323, and accordingly, an additional key may not be provided in the body 301.

The band 302 may be configured to be worn on a wrist to surround, and formed of a flexible material to facilitate its wearability. For such an example, the band 302 may be formed of a leather, rubber, silicon, synthetic resin material, and the like. Furthermore, the band 302 may be configured to be detachable from the 301, and replaceable with various types of bands according to the user's preference.

On the other hand, the band 302 may be used to extend the performance of the antenna. For example, a ground extension portion (not shown) electrically connected to the antenna to extend the ground area may be embedded in the band.

A fastener 302a may be provided in the band 302. The fastener 302a may be implemented with a buckle, a snap-fit hook structure, Velcro (brand name) and the like, and may include an elastic section or material. According to the drawing, it illustrates an example in which the fastener 302a is implemented in a buckle shape.

On the other hand, a mobile terminal according to the present disclosure may operate in link with the foregoing type of mobile terminal in FIGS. 1B and 1C using a user motion with respect to the watch type terminal 300. More specifically, the watch type terminal 300 according to the present disclosure may sense a tap hitting the watch type terminal 300 or case 301, 302 of the watch type terminal 300, and transmit the corresponding control signal to another terminal to perform a specific function in link with each other between the watch type terminal 300 and the another terminal.

A link between the watch type terminal and the another terminal may be carried out through data communication between the watch type terminal and the another terminal. There may exist a variety of different data communication schemes between the watch type terminal and the another terminal. For example, data communication may be carried out using at least one of Bluetooth™, Radio Frequency IDentification (RFID), Infrared Data Association (IrDA), Ultra WideBand (UWB), ZigBee, Near Field Communication (NFC), Wireless Fidelity (Wi-Fi), Wi-Fi Direct, and Wireless Universal Serial Bus (Wireless USB) technologies.

Figure 26A:
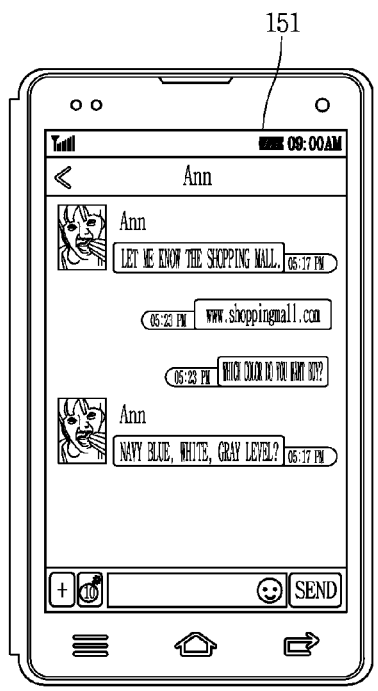
FIGS. 26A(a), 26A(b), 26A(c), 26A(d), 26B, 27A(a), 27A(b), 27A(c), 27B(a), 27B(b) and 27B(c) are conceptual views for explaining a method of controlling another terminal using a user motion with respect to a watch type mobile terminal.
Figure 26A:
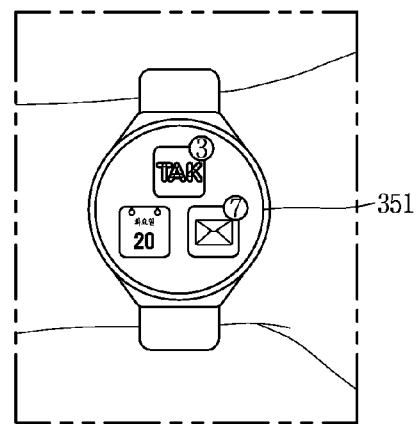
Figure 26A:
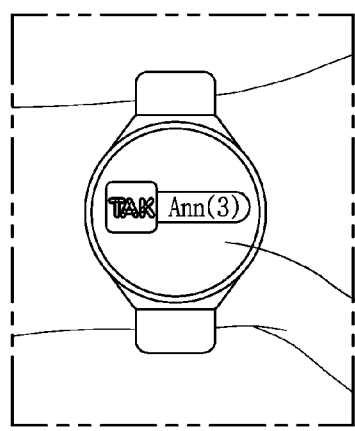
Figure 26A:
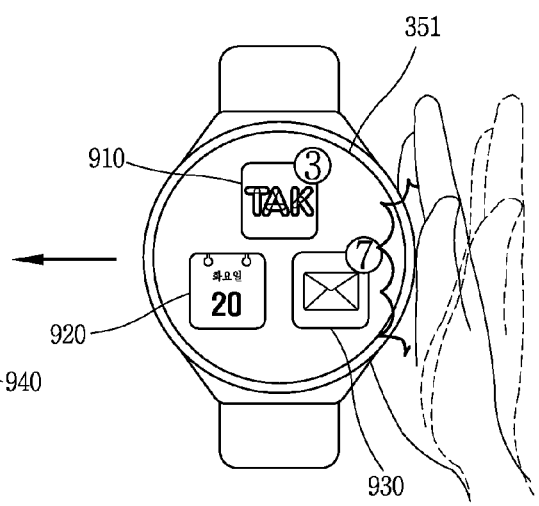

Hereinafter, a method of controlling a specific function between a watch type terminal and another terminal in link with the watch type terminal will be described in more detail with reference to the accompanying drawings. FIGS. 26A (a), 26A(b), 26A(c), 26A(d), 26B, 27A(a), 27A(b), 27A(c), 27B(a), 27B(b) and 27B(c) are conceptual views for explaining a method of controlling another terminal using a user motion with respect to a watch type mobile terminal.

When an event occurs on an application installed in a watch type mobile terminal or application installed in another terminal in link with the watch type mobile terminal, the watch type mobile terminal according to the present disclosure may display the corresponding event information as illustrated in FIG. 26A(b). Furthermore, the controller 180 of the watch type mobile terminal may display detailed information on the occurred event as illustrated in FIG. 26A(d) in response to a user motion applied to the watch type mobile terminal as illustrated in FIG. 26A(c).

On the other hand, here, a user motion with respect to the specific type of multimedia content may be sensed through an acceleration sensor provided in the terminal, or a pressure sensor, a touch sensor or the like provided on a lateral surface of the terminal. Furthermore, the type of sensors for sensing a user motion applied to the lateral surface of the terminal body may not be necessarily limited to the foregoing sensors.

On the other hand, when events occur on a plurality of plurality of applications to display a plurality of event information 910, 920, 930 corresponding to the plurality of applications, respectively, as illustrated in FIG. 26A(c), the controller 180 displays the detailed information 940 corresponding to any one of the plurality of event information 910, 920, 930. Furthermore, when the user motion is applied again in a state that the detailed information 940 corresponding to the any one is displayed, the controller 180 may display the detailed information corresponding to the another event information. The controller 180 may display the detailed information while sequentially switching the detailed information in response to the user motion being applied thereto.

In this manner, when the user motion is applied again with respect to the watch type mobile terminal in a state that the detailed information is displayed, the controller 180 may display the detailed information of event information for which the detailed information has not been displayed among a plurality of event information corresponding to the plurality of applications. The controller 180 may determine the display order of the detailed information based on a time point at which the events have occurred. For example, the controller 180 may preferentially display the detailed information corresponding to a most recently occurred event or preferentially display the detailed information corresponding to an initially occurred event. Furthermore, the controller 180 may determine the display order of the detailed information based on an application having a high use frequency.

On the other hand, when events occur on a plurality of applications to display event information corresponding to the plurality of applications, respectively, as illustrated in FIG. 26A(c), the controller 180 may first display detailed information corresponding to an application that has finally used on another terminal with respect to a user motion.

For example, when a messenger application has been finally used on another terminal as illustrated in FIG. 26A (a), the controller 180 of the watch type mobile terminal may display detailed information on an event that has occurred on the messenger application as illustrated in FIG. 26A(d) in response to a user motion applied to the watch type mobile terminal as illustrated in FIG. 26A(c).

Figure 26B:
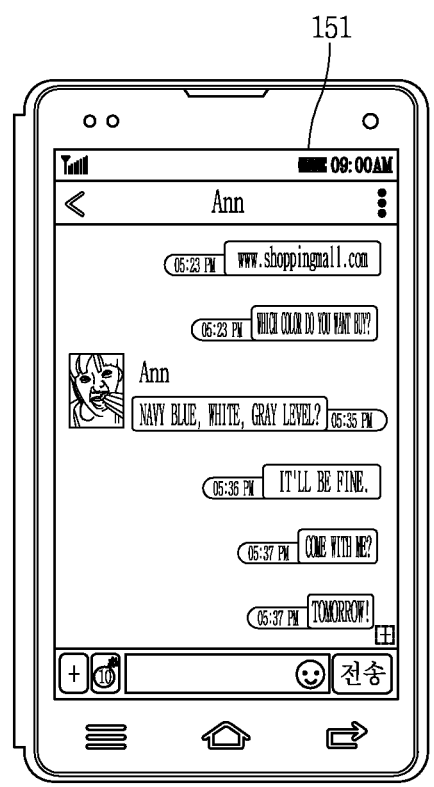

On the other hand, when an event has occurred in association with an application installed in another terminal, the controller 180 of the watch type mobile terminal may display event information that has occurred on the another terminal to the watch type mobile terminal only when the another terminal is in a lock state. Meanwhile, at this time, when the lock state of the another terminal is switched to a release state, the controller of the another terminal may preferentially display the screen information (or execution screen) of an application for which the event has occurred as illustrated in FIG. 26B. Here, the screen information may include information on the occurred event. Meanwhile, when there are a plurality of events that have occurred on the another terminal, the controller 180 may display the screen information of an application corresponding to the detailed information that has been finally displayed on the watch type mobile terminal or display the screen information of an application corresponding to the detailed information currently being displayed on the watch type mobile terminal. In this manner, the method of first displaying screen information corresponding to which application may be modified in various ways.

For another example, when events have occurred on a plurality of applications, and event information corresponding to the plurality of applications, respectively, are displayed as illustrated in FIG. 26A(c), the controller 180 of the watch type mobile terminal may display detailed information on event information selected by the user as illustrated in FIG. 26A(d). Meanwhile, at this time, when the lock state of another terminal is switched to a release state, the controller of the another terminal may display the screen information of an application corresponding to the event information selected by the user as illustrated in FIG. 26B. The screen information may include information on the occurred event.

Furthermore, a watch type mobile terminal according to the present disclosure may control the operation of an application in response to a user motion applied to the watch type mobile terminal.

Figure 27A:
Figure 27A:
Figure 27A:
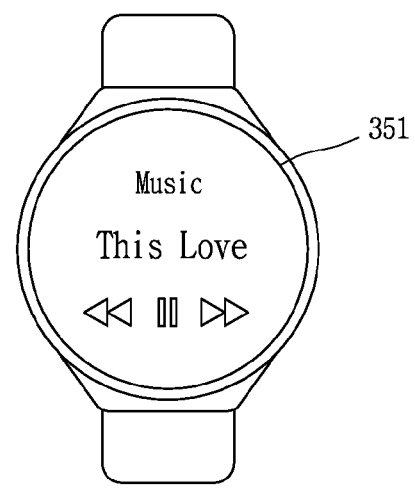

For example, when a preset user motion (for example, a tap motion hitting the body of the watch type mobile terminal a preset number of times) associated with playing music is applied to the watch type mobile terminal as illustrated in FIG. 27A(b) in a state that music is not currently being played as illustrated in FIG. 27A(a), the controller 180 may play music as illustrated in FIG. 27A(c). The controller 180 may perform a music play function in response to the user motion only when an application associated with playing music is currently being driven on the background. On the contrary, the controller may execute an application to play music when the user motion is applied even in a state that the application associated with playing music is not currently being driven.

Figure 27B:
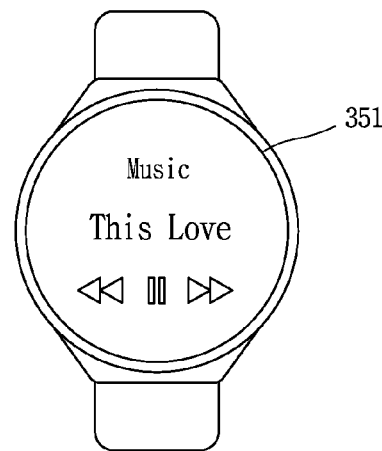
Figure 27B:
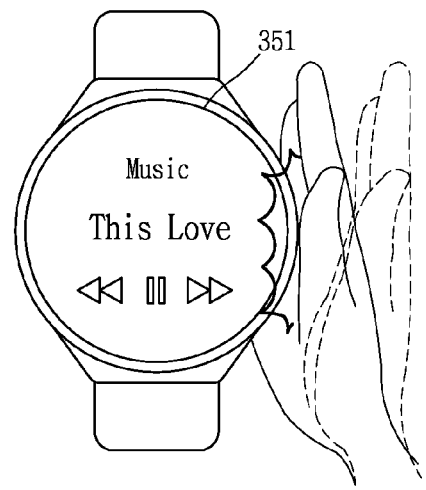
Figure 27B:

For another example, when a preset user motion (for example, a tap motion hitting the body of the watch type mobile terminal a preset number of times) associated with playing music is applied to the watch type mobile terminal as illustrated in FIG. 27B(b) in a state that music is currently being played as illustrated in FIG. 27B(a), the controller 180 may control the application associated with playing music to immediately play a next song to be output when a currently playing song is completed as illustrated in FIG. 27B(c).

In the above embodiment, an application associated with playing music has been described as an example, but the present disclosure may not be necessarily limited to this, and it may be possible to control an application having various functions based on a user motion.

As described above, according to the present disclosure, it may be possible to perform control on a function that is executable on a watch type mobile terminal using a user motion with respect to the watch type mobile terminal. Accordingly, the user can control a function that is executable on a watch type mobile terminal with a simple operation hitting the terminal even when a control command is not applied to the watch type mobile terminal through touches or voices.

A mobile terminal according to the present disclosure may use sensing information sensed through a sensor disposed on the cover portion coupled to the mobile terminal for the control of the mobile terminal. In this manner, a sensor disposed on the cover portion and an operation of the mobile terminal may be linked with each other, thereby allowing the user to more effectively sense a motion with respect to the mobile terminal.

Moreover, a mobile terminal according to the present disclosure may control the operation of the terminal based on a user motion with respect to the rear surface of the terminal body using a sensor disposed on the cover portion. Accordingly, the user may apply a user motion to the terminal rear surface with his or her hand holding the mobile terminal.

Furthermore, a mobile terminal according to the present disclosure may provide a more intuitive and easy approach method to an application based on a user's selection using a user motion with respect to the terminal. Accordingly, the user may omit an inconvenient process for entering an application to be used again.

Figure 28A:
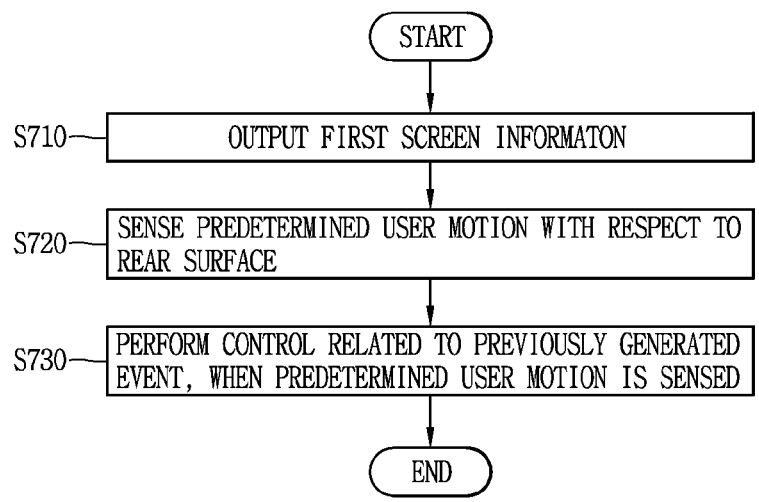
FIGS. 28A and 28B are flowcharts illustrating a control method according to an exemplary embodiment.
Figure 28B:
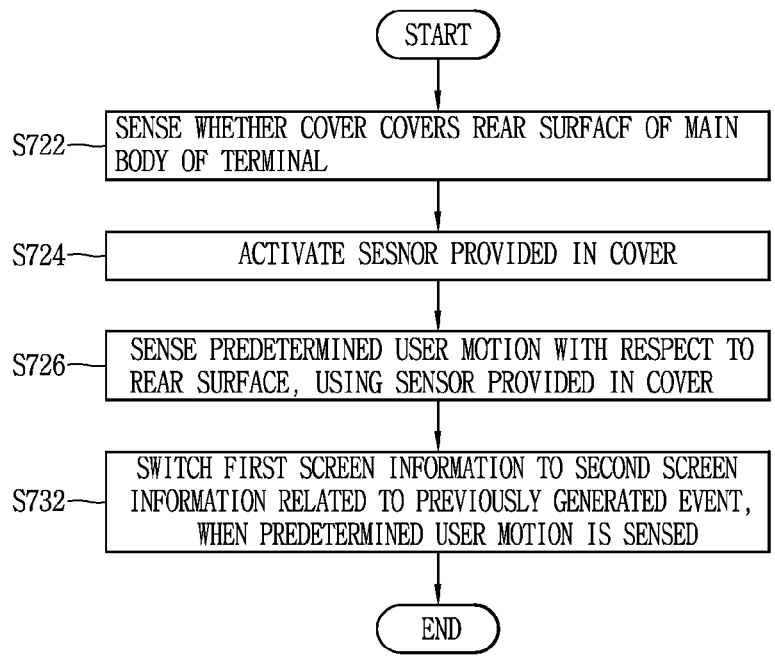

FIGS. 28A and 28B are flowcharts illustrating a control method according to an exemplary embodiment.

Referring to FIG. 28A, first, first screen information is output on the display unit 151 (S710).

Specifically, the first screen information means arbitrary visual information that can be output on the display unit 151. For example, a home screen, an execution screen displayed on the display unit 151 through execution of an application, or the like may correspond to the first screen information.

Next, a predetermined user motion is sensed with respect to the rear surface (or rear case) 103 (hereinafter, commonly referred to as the 'rear surface') of the main body of the mobile terminal 100 (S720).

Here, the predetermined user motion, as described above, may be set as a gesture tapping the main body (particularly, the rear surface) of the mobile terminal 100, corresponding to the tap or tap gesture. The predetermined user motion, as described above, may be sensed using at least one of a touch sensor, an acceleration sensor, a camera sensor and an infrared ray sensor.

More specifically, the tap may be understood as an operation slightly tapping the main body of the mobile terminal 100 using an object such as a finger or an operation contacted with the main body of the mobile terminal 100.

Meanwhile, a tap object applying the tap may be a matter capable of applying an external force to the main body of the mobile terminal 100. For example, the tap object may be a finger, a stylus pen, a pen, a pointer, a fist, or the like. The tap object is not necessarily limited to matters capable of applying a touch input to the mobile terminal according to the present disclosure. The tap object is unrelated to its kind as long as it is a matter capable of applying an external force to the main body of the mobile terminal 100 or a body.

Meanwhile, in the sensing of the predetermined user motion corresponding to this tap, it may be decided that a "tap" for controlling the mobile terminal has been sensed only when the tap is applied at least two times within a reference time.

The controller 180 may decide that a "tap" for controlling one or more functions has been sensed only when the tap is applied at least two times (or plural times) within the reference time.

That is, tap gestures may means that a tap gesture is continuously sensed at least two times within the reference time. Thus, that a "tap" is sensed may means that a plurality of tappings substantially applied plural times to the main body of the mobile terminal is sensed.

Further, the controller 180 may decide that "taps" have been sensed only when the tap is not only sensed within the reference time but also applied within a "predetermined area". For example, the tap may means a plurality tappings continuously sensed within the predetermined area.

Here, the reference time may be a very short time. The predetermined area may means a narrow area in which points having the tap gestures applied thereto are the same or considered as the same point.

To this end, if it is sensed by the sensing unit 140 that the main body of the mobile terminal is first tapped, the sensing unit 140 may calculate a predetermined area from the point at which the first tapping is sensed. If a next tapping subsequent to the first tapping is sensed in the predetermined area within the reference time from the time when the first tapping is sensed, the sensing unit 140 or the controller 180 may decide that the tap has been sensed.

Meanwhile, the reference time and the predetermined area, described above, may be variously modified according to exemplary embodiments.

As such, that a tap applied plural times is recognized as a control command or that a tap applied plural times within the predetermined area is recognized as a control command may be to decide a user's intention with respect to whether a user tap with respect to the rear surface of the terminal is applied to control the terminal. That is, when a tap applied plural times or a tap applied plural times within the predetermined area is sensed, the controller 180 may decide that a user applies a user motion to control the terminal. Thus, a user motion applied when the user taps the terminal by mistake or when the user taps the terminal without intending to control the terminal is not processed as a control command, so that it is possible to control an operation of the terminal by more faithfully reflecting the user's intention.

Meanwhile, as described above, in the mobile terminal according to the present disclosure, a tap with respect to the rear surface of the terminal may be sensed through the acceleration sensor or the touch sensor provided at the rear surface of the terminal.

When the acceleration sensor is used, the controller 180 may sense a tap tapping the rear surface of the terminal. When the touch sensor is used, the controller 180 may sense not only a tap tapping the rear surface of the terminal but also a touch with respect to the rear surface of the terminal. The controller 180 may sense user motions corresponding to touches in various manners, including a single touch, a double touch, a long touch, a flicking touch, a swipe touch, and the like with respect to the rear surface of the terminal. In this state, the touch sensor may be provided at the entire rear surface of the terminal, or may be provided at a part of the rear surface of the terminal.

Meanwhile, in the mobile terminal according to the present disclosure, the controller 180 may operate in a specific mode in which minimum current or power is consumed even in a locking state in order to sense a tap through the acceleration sensor or touch sensor. The specific mode may be referred to as a 'doze mode'. Thus, in the mobile terminal according to the present disclosure, a tap applied to the main body or a touch corresponding to the tap can be sensed in a state in which the illumination of the display unit 151 is off or a doze mode.

In the mobile terminal according to the present disclosure, in order to sense a tap with respect to the main body of the mobile terminal, only any one of the acceleration sensor and the touch sensor may be used, the acceleration sensor and the touch sensor may be sequentially used, or the acceleration sensor and the touch sensor may be simultaneously used. Meanwhile, when a tap is sensed through the touch sensor, it is possible to more exactly detect a position at which the tap is applied.

As such, if a predetermined user motion with respect to the main body, particularly the rear surface of the main body is sensed, control related to a previously generated event is performed (S730).

Specifically, the previously generated event may be defined by the generation of an event that can be output on a status bar of the terminal. Examples of the event are reception of a message, a call during absence, an alarm, notification of a schedule, reception of an email, reception of information through an application, and the like.

Information related to the previously generated event may be output as the control related to the previously generated event. For example, if a double tap input with respect to the rear surface of the main body is sensed, the first screen information output on the display unit 151 may be switched to screen information related to the reception of the previously generated message.

As described above, in the mobile terminal according to the present disclosure, control related to a previously generated event can be performed, corresponding to a predetermined user motion with respect to the rear surface of the main body. Further, in the mobile terminal according to the present disclosure, a predetermined user motion with respect to the rear surface of the terminal can be sensed using a sensor provided in the cover 200 as well as a sensor provided in the main body of the terminal.

More specifically, the controller 180 may sense a predetermined user motion through an acceleration ray sensor disposed at an edge of the window part 240 in the state in which the cover front part 220 covers the rear surface of the terminal. The infrared ray sensor disposed at the edge of the window part 240 may sense an object approaching the inside of the window part 240 or an object existing near the window part 240, using an electromagnetic force, infrared ray, or the like. Meanwhile, the infrared ray sensor provided in the window part 240 may sense a predetermined user motion applied to the rear surface of the terminal in the state in which the cover covers the rear surface of the terminal.

As such, if the predetermined user motion with respect to the rear surface of the main body is sensed by the sensor disposed in the cover 200, the controller 180 may perform control related to the previously generated event.

Meanwhile, the controller 180 may sense a predetermined user motion with respect to the inside of the window part 240 in the state in which the cover front part 220 covers the rear surface 103 of the terminal or in the state in which the cover front part 220 is rotated to be overlapped with the cover rear part 210. In this state, the controller 180 may sense the predetermined user motion by activating the sensor provided in the cover 200 in the state in which the cover front part 220 covers the rear surface of the terminal or in the state in which the cover front part 220 covers the cover rear part 210. The sensor provided in the cover 200, as described above, is operated using power supplied from the terminal. Therefore, when operating power is always supplied to the sensor provided in the cover 200, unnecessary power may be consumed even in a situation where it is unnecessary to sense a user motion. Accordingly, in the present disclosure, there is proposed a control method for sensing a predetermined user motion with respect to the rear surface of the terminal and performing control related to a previously generated event in the state in which the cover 200 covers the rear surface of the terminal.

To this end, referring to FIG. 28B, first, it is sensed whether the cover 200 (particularly, the cover front part 220) covers the rear surface of the main body of the mobile terminal 100 (S722).

Here, the 'state in which the cover covers the rear surface' may means a state in which the cover front part 220 covers the rear surface 103 of the terminal or a state in which the cover front part 220 is rotated to be overlapped with the cover rear part 210.

Meanwhile, the state in which the cover front part 220 covers the rear surface 103 of the main body of the mobile terminal 100 may be sensed in various manners. As an example, at least one magnet may be mounted to sense a state in which the cover covers the front or rear surface of the main body, and at least one Hall-effect device corresponding to the magnet may be provided in the main body.

The controller 180 may decide whether the cover covers the rear surface or the front surface, using that magnetic fields formed by the magnet are sensed through the Hall-effect device.

In this state, the controller 180 senses whether the cover front part 220 covers or does not cover the front surface of the main body. If the cover front part 220 does not cover the front surface of the main body, the controller 180 may consider that the cover covers the rear surface of the main body.

Alternatively, a plurality of Hall-effect devices may be provided in the main body of the terminal, and the controller 180 may decide whether the cover front part 220 covers the front or rear surface of the main body.

As still another example, the cover may have the cover rear part 210 mounted at the rear surface of the main body, and the cover front part 220 rotatably connected to the cover rear part 210, the cover front part 220 having the window part 240 disposed therein. In order to sense a state in which the cover covers the rear surface, a magnet may be mounted in any one of the cover rear part 210 and the cover front part 220, and a Hall-effect device for sensing magnetic fields of the magnet may be mounted in the other of the cover rear part 210 and the cover front part 220. Thus, the controller 180 can sense whether the cover front part 220 covers the rear surface of the terminal, based on a signal corresponding to magnetic fields formed by the magnet and the Hall-effect device, disposed in the cover.

However, the present disclosure is not limited to the methods described above. In the mobile terminal according to the present disclosure, the state in which the cover front part covers the rear surface of the main body of the terminal may be sensed using various methods.

Meanwhile, if the sate in which the cover covers the rear surface of the main body of the terminal is sensed as described above, a sensor provided in the cover is activated (S724).

Here, that 'the sensor provided in the cover is activated' may be construed as meaning that 'operating power is supplied to the sensor provided in the cover', that 'the sensor provided in the cover is activated to sense a user motion', or that 'the mode of the sensor provided in the cover is switched from a sleep mode to an operation mode'. For example, the sensor provided in the cover may be operated using power supplied from the terminal, and therefore, the controller 180 may supply operating power to the sensor provided in the cover so that the sensor provided in the cover can sense a user motion in only the state in which the cover front part 220 covers the rear surface of the main body of the terminal. Accordingly, when the operating power is continuously supplied to the sensor provided in the cover, it is possible to prevent unnecessary power from being consumed in a situation where it is unnecessary to sense a user motion.

Meanwhile, a predetermined user motion with respect to the rear surface of the main body of the terminal is sensed using the sensor provided in the cover 200 in the state in which the sensor provided in the cover 200 is activated as described above.

Here, the user motion may be applied to the rear surface of the main body of the terminal by passing through the window part 240 disposed in the cover front part 220. As described above, the sensors provided in the cover are disposed to be spaced apart from each other along the outer circumference of the window part 240 and to face the inside of the window part 240, so that a predetermined user motion applied to the inside of the window part 240 can be sensed.

The sensor provided in the cover 200 may sense a tap tapping the rear surface of the main body of the terminal, a number of taps, a position at which the tap is applied, a number of objects (e.g., fingers) applying the tap, a maintaining time of the tap, and the like. More specifically, a plurality of infrared ray sensors are disposed in the cover 200 as described above, so that it is possible to sense which part of the rear surface of the main body a tap is applied to. Further, the controller 180 may sense various user motions, using a plurality of sensor disposed in the cover 200. For example, in addition to a tap motion such as a single or double tap including a drag motion, a flicking motion, a swipe motion, etc., various types of motions are sensed through the plurality of sensors disposed in the cover 200, so that the controller 180 can perform various controls using various user motions. That is, a user motion allowing control related to a previously generated event to be performed may be set in various manners.

Meanwhile, as described above, if a predetermined user motion with respect to the rear surface of the main body of the terminal is sensed using the sensor provided in the cover 200, the first screen information output on the display unit 151 is switched to second screen information related to a previously generated event (S732).

As described above, the previously generated event may be defined by the generation of an event that can be output on a status bar of the terminal. Examples of the event are reception of a message, a call during absence, an alarm, notification of a schedule, reception of an email, reception of information through an application, and the like.

As an exemplary embodiment, if a tap is applied to the rear surface of the main body of the terminal through the inside of the window part 240, a execution screen (first screen information) of a web application may be switched to a screen (second screen information) displaying a received message.

As described above, in the mobile terminal according to the present disclosure, a predetermined user motion with respect to the rear surface of the main body of the terminal can be sensed, and control related to a previously generated event can be performed, using at least one of the sensor provided in the main body of the terminal and the sensor provided in the cover.

Hereinafter, a specific example of performing control related to a previously generated event, corresponding to a predetermined user motion with respect to the rear surface of the main body, will be described.

FIGS. 29A, 29B, 29C, 30A, 30B, 30C and 30D are conceptual views illustrating a method for outputting information related to a previously generated event using a predetermined user motion with respect to the rear surface of the terminal.

Hereinafter, when the cover 200 is coupled to the main body of the terminal, a method for sensing a predetermined user motion with respect to the rear surface of the main body of the terminal through a sensor provided in the cover 200 will be described through examples. However, It will be apparent to those skilled in the art that the examples described below may be identically applied even when a predetermined user motion with respect to the rear surface of the main body of the terminal is sensed through a sensor provided in the main body of the terminal. Accordingly, in exemplary embodiments described below, the description of the case where the predetermined user motion with respect to the rear surface of the main body of the terminal is sensed through the sensor provided in the main body of the terminal will be described.

Meanwhile, as described above, the controller 180 may output information related to a previously generated event, based on that a predetermined user motion with respect to the rear surface of the main body of the terminal (or the sensor provided in the cover 200) is sensed.

Specifically, the controller 180 may switch first screen information output on the display unit 151 to second screen information related to a previously generated event, based on that a predetermined user motion with respect to the rear surface of the main body of the terminal (or the sensor provided in the cover 200) is sensed.

Figure 29A:
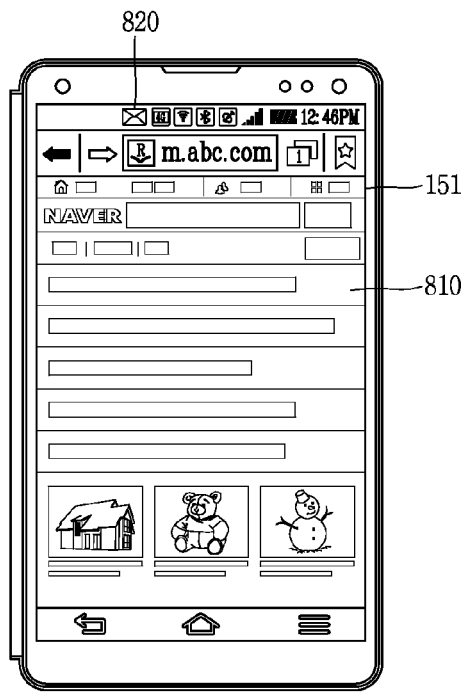
FIGS. 29A, 29B, 29C, 30A, 30B, 30C and 30D are conceptual views illustrating a method for outputting information related to a previously generated event using a predetermined user motion with respect to the rear surface of the terminal.

Referring to FIG. 29A, first screen information 810 may be output on a screen. As described above, the first screen information 810 means arbitrary visual information that can be output on the display unit 151. For example, the first screen information 810 may means a home screen of the terminal.

As another exemplary embodiment, the first screen information 810 corresponding to a first application may be output on the screen. Here, the first application means an arbitrary application among a plurality of applications installed in the mobile terminal. The first application may be an application selected and executed by a user among the plurality of applications.

The first screen information 810 may means an execution screen of the first application. That is, screen information displayed on the display unit 151 as the first application is executed may be commonly referred to as the first screen information 810.

For example, when a web-browser function application is executed, the screen information 810 corresponding to the web-browser function application may be output on the display unit 151.

Meanwhile, an event may be generated before a predetermined user motion is sensed. Specifically, the event may be defined as one that can be output on a status bar of the terminal. Examples of the event may be reception of a message, a call during absence, an alarm, notification of a schedule, reception of an email, reception of information through an application, and the like.

The event may be one generated before or after the first screen information 810 is output. For example, when a message reception event generated before or after the first application is executed, an icon 820 for notifying that a message has been received may be output on the status bar.

Figure 29B:
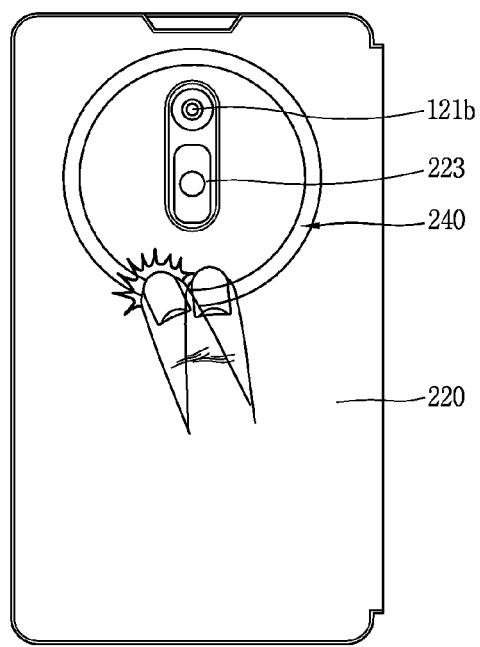

Referring to FIG. 29B, a predetermined user motion may be received in a state in which the event generated after the first screen information 810 corresponding to the first application is output.

Here, the predetermined user motion may be a tap applied to the rear surface of the main body of the terminal. In this state, the user motion may be sensed through the sensor disposed in the cover. That is, as shown in FIG. 29B, the user motion may be set to a tap motion tapping the inside of the window part 240 plural times.

This is merely an exemplary embodiment, and the user motion may be set in various manners. That is, as still another exemplary embodiment, the user motion may be set to a drag motion in a specific direction of the inside of the window part 240, or may be set to a tap motion tapping a specific or arbitrary area of the inside of the window part 240 once or plural times.

Figure 29C:
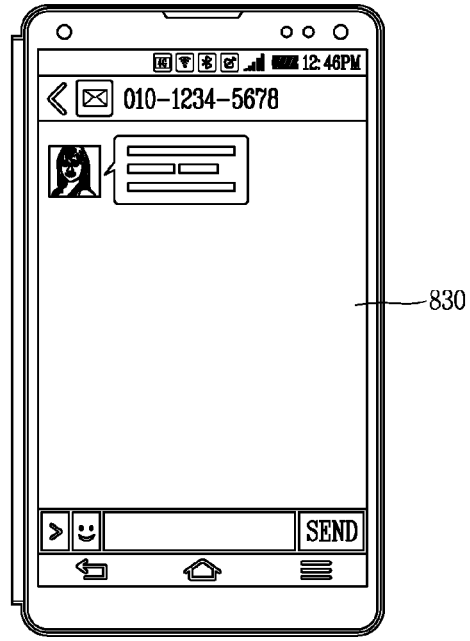

Referring to FIG. 29C, if the predetermined user motion is sensed, the first screen information 810 may be switched to second screen information 830 related to a previously generated event.

As an exemplary embodiment, if a tap motion tapping the inside of the window part 240 plurality times is sensed as shown in FIG. 29B, the execution screen of the web-browser function application in FIG. 29A may be switched to a screen displaying a message received before the tap motion is sensed. That is, the execution screen of the web-browser function application may be switched to a reception message screen corresponding to the icon 820 output on the status bar. To this end, a message application may be executed.

The manner that the first screen information 810 is switched to the second screen information 830 may be variously set. For example, the second screen information may be opened in a pop-up form on the screen on which the first screen information 810 is output. Alternatively, the second screen information 830 may be gradually opened as an upper layer of the first screen information 810.

Meanwhile, the controller 180 may again switch the second screen information 830 to the first screen information 810, based on that a predetermined user motion with respect to the rear surface of the main body of the terminal (or the sensor provided in the cover 200) is sensed in the state in which the second screen information 830 is output on the display unit 151. That is, the switched screen information may return to the original screen information.

The user motion for returning the switched screen information to the original screen information may be set identically to or differently from the user motion for screen switching, described above.

As an exemplary embodiment, if the tap motion tapping the inside of the window part 240 plural times, described in FIG. 29B, is sensed in the state in which the reception message screen 830 is output as shown in FIG. 29C, the reception message screen 830 may be again switched to the execution screen 810 of the web-browser function application in FIG. 29A.

As another exemplary embodiment, a predetermined first user motion may be sensed as a user motion different from the tap motion tapping the inside of the window part 240 plural times, described in FIG. 29B, in the state in which the reception message screen 830 is output.

Specifically, the first user motion may be set to a drag motion in a specific direction of the inside of the window part 240, or may be set to a tap motion tapping a specific or arbitrary area of the inside of the window part 240 once or plural times.

If the first user motion is sensed, the reception message screen in FIG. 29C may be again switched to the execution screen 810 of the web-browser function application in FIG. 29A. In this state, the message output on the status bar is identified in the switching, and thus the icon 820 output on the status bar disappears.

Meanwhile, the controller outputs an icon corresponding to the previously generated event, based on that a predetermined user motion with respect to the rear surface of the main body of the terminal (or the sensor provided in the cover 200) is sensed. If a predetermined time elapses in the state in which the icon is output, the first screen information may be switched to the second screen information related to the previously generated event.

If the first screen information is switched to the second information, the output of the icon corresponding to the previously generated event may be finished.

Figure 30A:
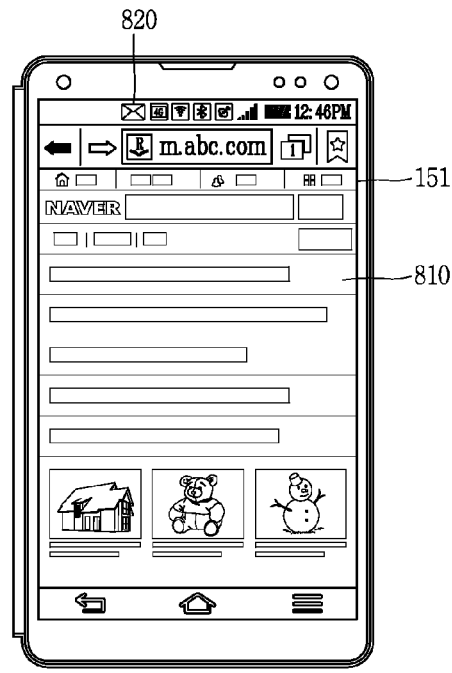

Referring to FIG. 30A, when a web-browser function application is executed as described in FIG. 29A, screen information 810 corresponding to the web-browser function application may be output on the display unit 151.

When a message reception event is generated before or after the execution of the web-browser function application, an icon 820 for notifying that a message has been received on the status bar may be output.

Figure 30B:
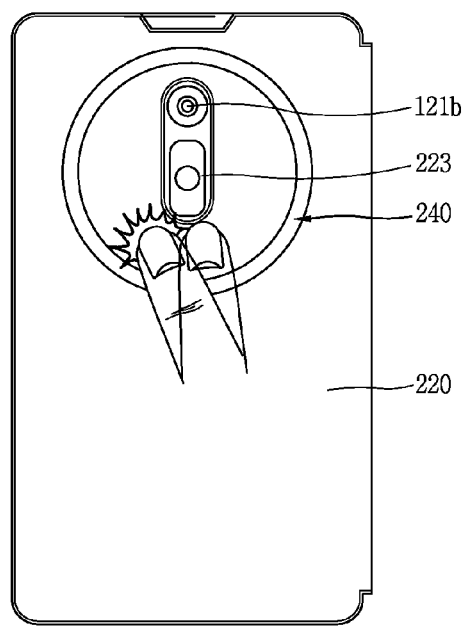

Referring to FIG. 30B, a predetermined tap motion tapping the inside of the window part 240 plural times may be received as described in FIG. 29B.

Figure 30D:
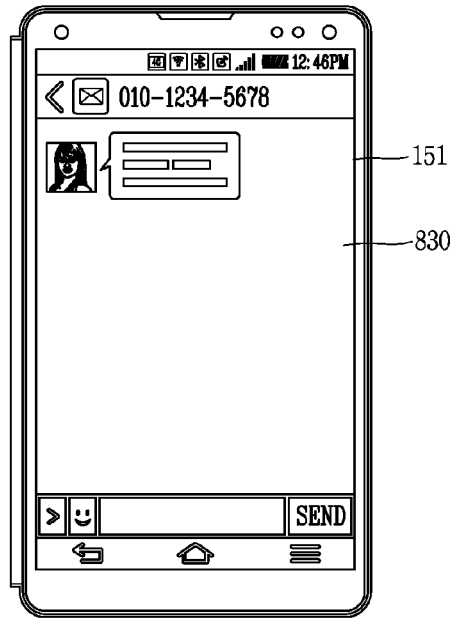
Figure 30C:
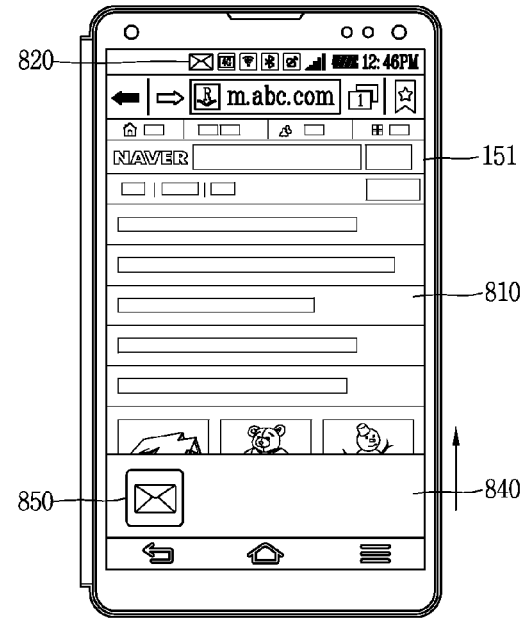

Referring to FIG. 30C, if the predetermined tap motion is sensed, an icon corresponding to the previously generated message reception event may be output.

As an exemplary embodiment, an upper layer 840 with respect to the screen information 810 corresponding to the web-browser function application may be output in a pop-up form or a form opened from a specific direction in one area. In addition, the icon 850 corresponding to the previously generated message reception event may be output on the upper layer 840.

The icon 850 corresponding to the previously generated message reception event may be set to express an attribute of the event as an object notifying that the message has been received.

For example, in the case of a message reception event, the icon 850 may be set as an icon corresponding to the message application. That is, the icon 850 may be set identically to the icon displayed on the screen 151 in order to execute the message application.

As another exemplary embodiment, the icon 850 corresponding to the previously generated message reception event may be set to an envelope shape as an object capable of expressing an attribute of the message reception.

Referring to FIG. 30D, if a predetermined time elapses in the state in which the icon 850 is output as described in FIG. 30D, the screen information 810 corresponding to the web-browser function application may be switched to the screen information 830 displaying the received message.

Here, the predetermined time may be set as a very short time such as one or two seconds. If the predetermined time elapses, the screen information 830 displaying the received message may be gradually opened as an upper layer of the screen information 810 corresponding to the web-browser function application.

As an exemplary embodiment, if the screen information 810 corresponding to web-browser function application is switched to the screen information 830 displaying the received message, the layer 840 and the icon 850 disappear.

As another exemplary embodiment, the layer 840 and the icon 850 may disappear while the screen information 810 corresponding to web-browser function application is being switched to the screen information 830 displaying the received message.

Meanwhile, in the case of a plurality of previously generated events, the controller 180 may output a plurality of icons respectively corresponding to the plurality of previously generated events, based on that a predetermined user motion with respect to the rear surface is sensed.

The controller 180 outputs a plurality of icons respectively corresponding to the plurality of previously generated event. If a predetermined time elapses in the state in which the plurality of icons are output, the controller 180 may switch the first screen information to the second screen information related to an event corresponding to a predetermined reference among the plurality of previously generated events.

Here, the predetermined reference may be related to the time when an event is generated. Accordingly, the controller 180 may switch the first screen information to screen information related to the most recently generated event among the plurality of recently generated events.

As such, if the first screen information is switched to the second screen information, the output of the plurality of icons respectively corresponding to the plurality of previously generated event may be finished.

FIGS. 31A, 31B, 31C, 31D, 32A, 32B, 32C, 32D, 33A, 33B and 33C are conceptual views illustrating a method for outputting information related to an event corresponding to a predetermined reference among a plurality of previously generated events, using a predetermined user motion with respect to the rear surface of the terminal.

Figure 31A:
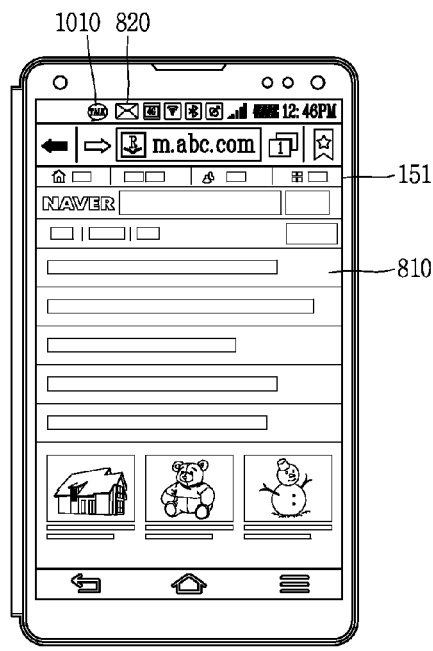
FIGS. 31A, 31B, 31C, 31D, 32A, 32B, 32C, 32D, 33A, 33B and 33C are conceptual views illustrating a method for outputting information related to an event corresponding to a predetermined reference among a plurality of previously generated events, using a predetermined user motion with respect to the rear surface of the terminal.

Referring to FIG. 31A, when a web-browser function application is executed, screen information 810 corresponding to the web-browser function application may be output on the display unit 151.

When a character message reception event is generated before or after the execution of the web-browser function application, an icon 820 notifying that a character message has been received may be output on the status bar. Subsequently, when an SNS message reception event is generated, an icon 1010 notifying that an SNS message has been received may be output at the left side of the icon 820.

Figure 31B:
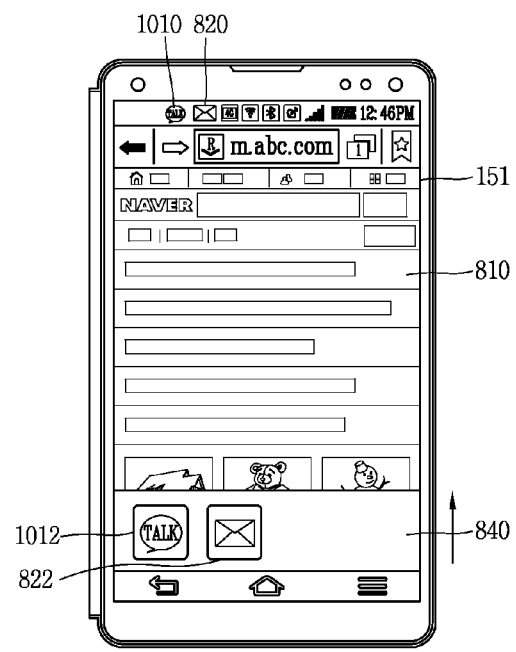

Referring to FIG. 31B, a predetermined tap motion tapping the inside of the window part 240 plural times may be received in the state shown in FIG. 31A. Accordingly, icons 1012 and 822 respectively corresponding to the plurality of previously generated events can be output.

As an exemplary embodiment, an upper layer 840 with respect to the screen information 810 corresponding to the web-browser function application may be output in a pop-up form or a form opened from a specific direction in one area. In addition, an icon 822 corresponding to the previously generated character message reception event and an icon 1012 corresponding to the previously generated SNS character message reception event may be output on the upper layer 840.

As another exemplary embodiment, the upper layer 840 may be set in an opaque form. In this case, the execution screen 810 of the web-browser function application may be displayed through the upper layer 840.

Figure 31D:
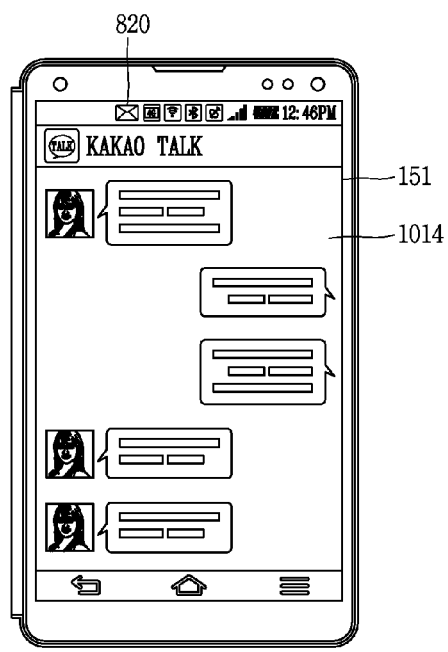
Figure 31C:
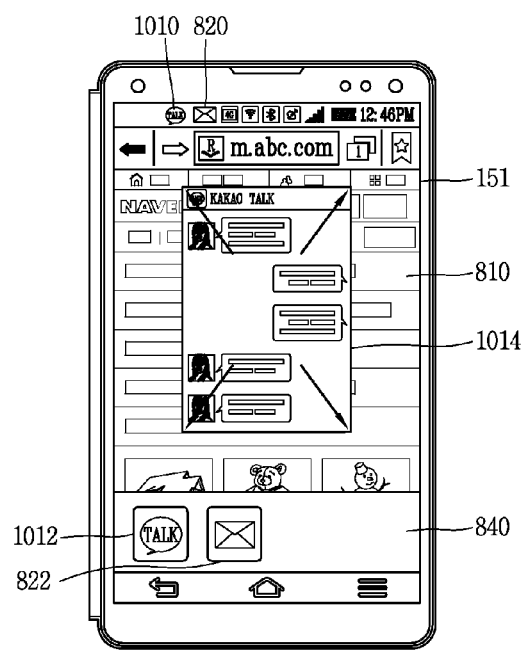

Referring to FIGS. 31C and 31D, if a predetermined time elapses in the state in which the icons 1012 and 822 respectively corresponding to the plurality of previously generated events are output as shown in FIG. 31B, the execution screen 810 of the web-browser function application may be switched to screen information 1014 related to an event corresponding to a predetermined reference.

As an exemplary embodiment, the predetermined reference may be related to the time when an event is generated. Accordingly, the execution screen 810 of the web-browser function application may be switched to the screen information related to the SNS message reception event that is an event most recently generated between the character message reception event and the SNS message reception event. Alternatively, the execution screen 810 of the web-browser function application may be switched to the screen information related to the character message reception event that generated the last.

Meanwhile, as shown in FIG. 31C, the screen information 1014 related to the SNS message reception event that is the most recently generated event may be gradually opened on the execution screen 810 of the web-browser function application.

Accordingly, as shown in FIG. 31D, the execution screen 810 of the web-browser function application may be switched to the screen information 1014 related to the SNS message reception event that is the most recently generated event. In this state, the received SNS message has been identified, and thus the icon 1010 output on the status bar disappears.

As another exemplary embodiment, the output of the upper layer 840 on which the icons 1012 and 822 respectively corresponding to the plurality of previously generated events are output may be finished while the screen is being switched as shown in FIG. 31C. Alternatively, when the screen switching is finished as shown in FIG. 31D, the output may be finished.

As still another exemplary embodiment, if a first user motion different from the predetermined user motion is sensed in the state in which the screen information 1014 related to the second screen information (SNS message reception event) is output, the controller 180 may again switch the second screen information to the first screen information (execution screen of the web-browser function application) 810.

Specifically, the first user motion may be set to a drag motion in a specific direction of the inside of the window part 240, or may be set to a tap motion tapping a specific or arbitrary area of the inside of the window part 240 once or plural times.

If the first user motion is sensed, the SNS message reception screen 1014 in FIG. 31D may be again switched to the execution screen 810 of the web-browser function application in FIG. 31A. In the switching, the message output on the status bar has been identified, and thus the icon 1010, which notifies that the SNS message output on the status bar has been received, disappears.

Meanwhile, if the predetermined user motion with respect to the rear surface is again sensed in the state in that the second screen information 1014 is output, the controller 180 may output at least one icon corresponding to at least one event except an event related to the second screen information among the plurality of previously generated events. If a predetermined time elapses in the state in which the at least one icon is output, the controller 180 may switch the second screen information 1014 to third screen information related to an event corresponding to the predetermined reference among the at least one event.

Figure 32A:
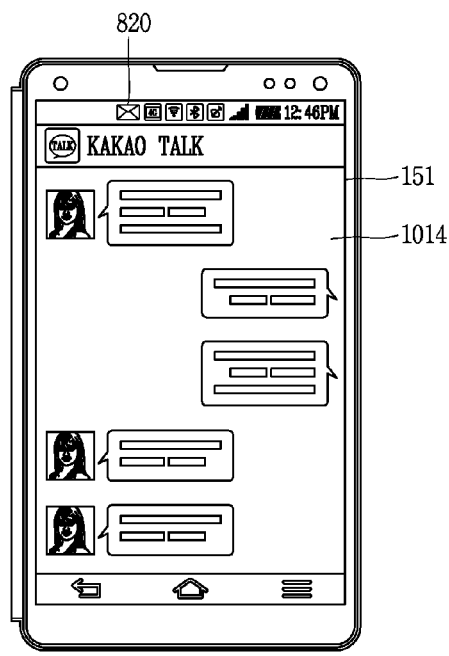

Referring to FIG. 32A, the predetermined tap motion tapping the inside of the window part 240 plural times may be again received in the state of FIG. 31D, i.e., the state in which the execution screen 810 of the web-browser function application is switched to the screen information 1014 related to the SNS message reception event that is the most recently generated event.

Figure 32B:
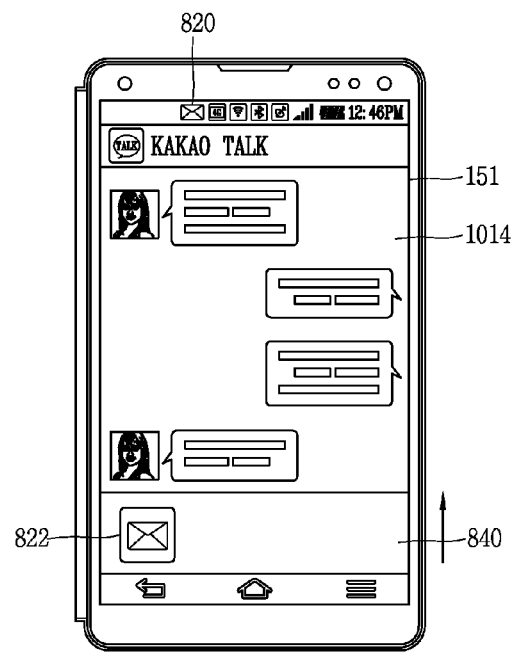

Referring to FIG. 32B, as the predetermined tap motion is again received, the icon 822 corresponding to the previously generated event may be again output.

As an exemplary embodiment, the upper layer 840 with respect to the SNS message reception screen 1014 may be output in a pop-up form or a form opened from a specific direction in one area. Specifically, the upper layer 840 may be slowly opened from the bottom to the top of the screen. In addition, the icon 822 corresponding to the previously generated character message reception event may be output on the upper layer 840.

As another exemplary embodiment, the upper layer 840 may be set in an opaque form. In this case, the SNS message reception screen 1014 may be displayed through the upper layer 840.

Figure 32D:
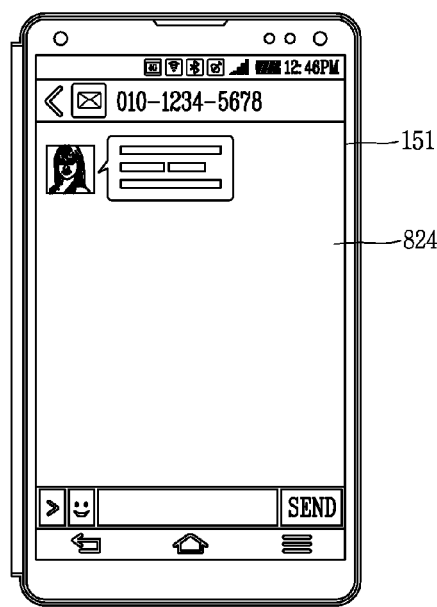
Figure 32C:
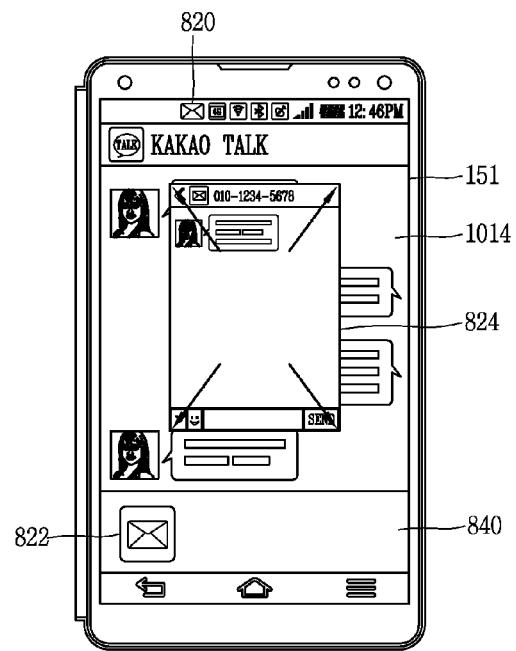

Referring to FIGS. 32C and 32D, if a predetermined time elapses in the state in which the icon 822 corresponding to the previously generated event as shown in FIG. 32B, the SNS message reception screen (second screen information) 1014 may be switched to screen information (third screen information) 824 related to the character message reception event.

Meanwhile, as shown in FIG. 32C, the screen information 824 related to the character message reception event may be gradually opened on the SNS message reception screen 1014.

Accordingly, as shown in FIG. 32D, the SNS message reception screen 1014 may be switched to the character message reception screen 824. In this state, the character message has been identified, and thus the character message reception icon 820 output on the status bar disappears.

As an exemplary embodiment, the output of the upper layer 840 on which the icon 822 corresponding to the previously generated event is output may be finished while the screen is being switched as shown in FIG. 32C. Alternatively, when the screen switching is finished as shown in FIG. 32D, the output may be finished.

As another exemplary embodiment, if a predetermined first user motion is sensed in the state in which the third screen information 824 is output, the controller 180 may switch the third screen information 824 to the second screen information (screen information related to the SNS message reception event) 1014.

As still another exemplary embodiment, if a predetermined second user motion is sensed in the state in which the third screen information 824 is output, the controller 180 may switch the third screen information 824 to the first screen information (execution screen of the web-browser function application) 810.

Specifically, the first and second user motions may be set differently from the predetermined user motion, i.e., the tap motion tapping the inside of the window part 240 plural times. The first and second user motions may be set differently from each other.

For example, the first and second motions may be respectively set to a drag motion in a specific direction of the inside of the window part 240 and a tap motion tapping a specific or arbitrary area of the inside of the window part 240 once or plural times. Alternatively, the first and second motions may be respectively set to the tap motion and the drag motion.

If the first user motion is sensed in the state of FIG. 32D, the character message reception screen 824 in FIG. 32D may be again switched to the screen 1014 related to the SNS message reception event in FIG. 31D. That is, the character message reception screen 824 may return to the previously output screen 1014.

As still another exemplary embodiment, if the second user motion is sensed in the state of FIG. 32D, the character message reception screen 824 in FIG. 32D may be again switched to the execution screen 810 of the web-browser function application in FIG. 31A. That is, the character message reception screen 824 may return to the first output screen 810.

Figure 33A:
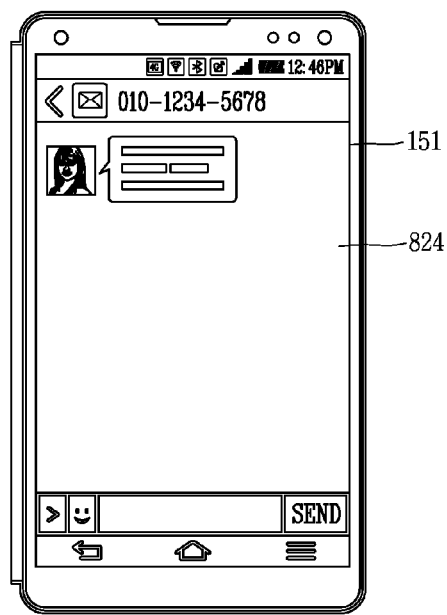
Figure 33B:
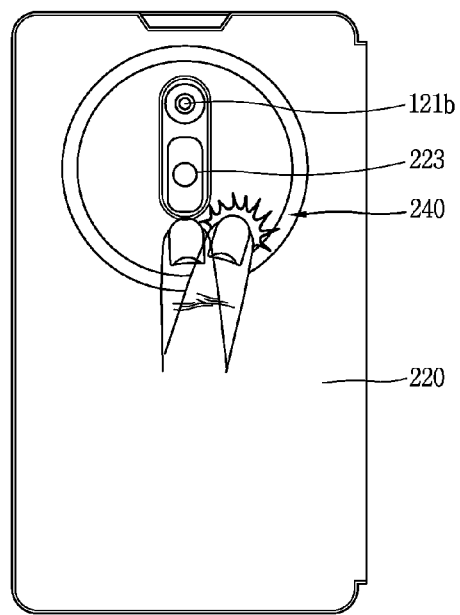

As still another exemplary embodiment, referring to FIGS. 33A and 33B, the tap motion tapping the inside of the window part 240 may be again applied in the state in which the SNS message reception screen 1014 is switched to the character message reception screen 824 as shown in FIG. 32D.

Figure 33C:
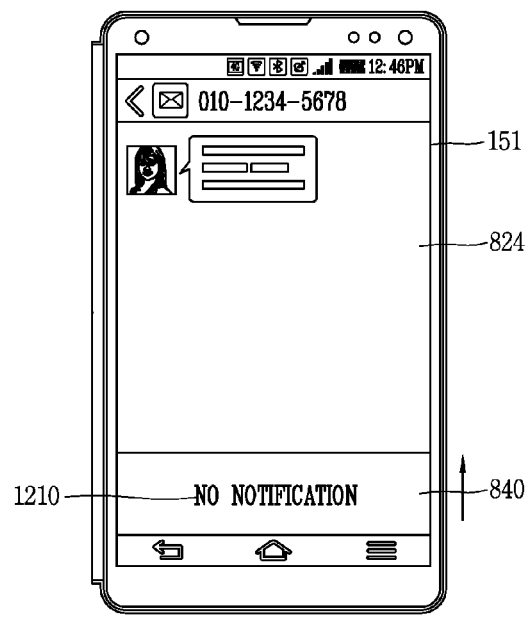

Referring to FIG. 33C, there is no previously generated event before the predetermined tap motion in FIG. 33B is again applied, and therefore, a message 1210 notifying this may be output.

As an exemplary embodiment, the upper layer 840 with respect to the character message reception screen 824 may be output in a pop-up form or a form opened from a specific direction in one area. Specifically, the upper layer 840 may be slowly opened from the bottom to the top of the screen. In addition, the message 1210 notifying that there is no previously generated event may be output on the upper layer 840.

As another exemplary embodiment, if a user motion selecting one of a plurality of icons respectively corresponding to the previously generated events is sensed, the controller 180 may switch the first screen information to screen information related to an event corresponding to the selected icon.

FIGS. 34A, 34B, 34C, 34C and 34D are conceptual views illustrating a method for outputting information related to an event selected by a user among a plurality of previously generated events.

Figure 34A:
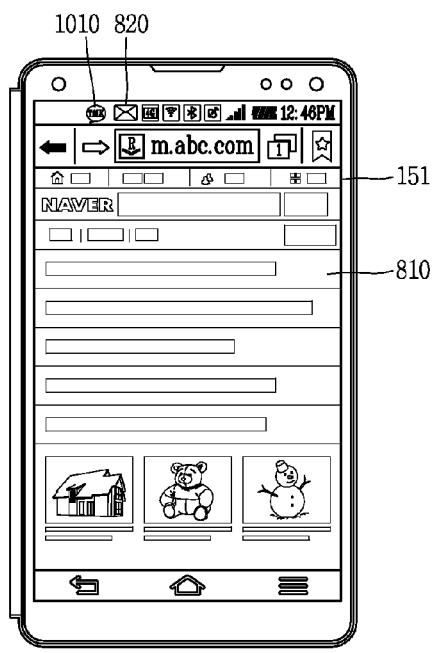
FIGS. 34A, 34B, 34C, and 34D are conceptual views illustrating a method for outputting information related to an event selected by a user among a plurality of previously generated events.

Referring to FIG. 34A, when a web-browser function application is executed as shown in FIG. 31A, screen information 810 corresponding to the web-browser function application may be output on the display unit 151.

When a character message reception event is generated before or after the execution of the web-browser function application, an icon 820 notifying that a character message has been received may be output on the status bar. Subsequently, when an SNS message reception event is generated, an icon 1010 notifying that an SNS message has been received may be output at the left side of the icon 820.

Figure 34B:
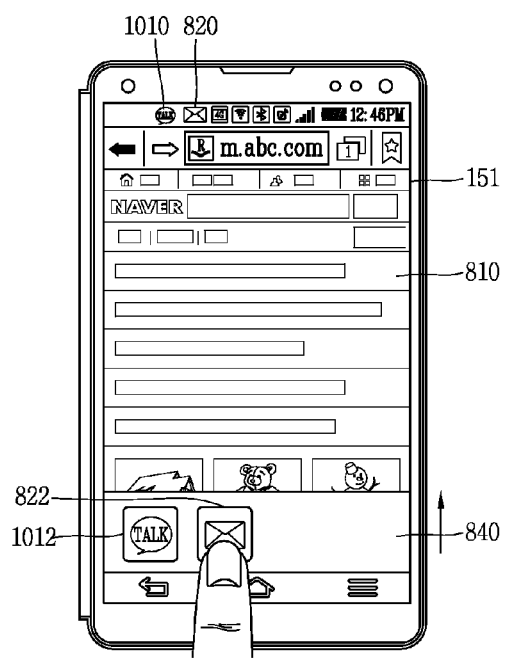

Referring to FIG. 34B, a predetermined tap motion tapping the inside of the window part 240 plural times may be received in the state shown in FIG. 34A. Accordingly, icons 1012 and 822 respectively corresponding to the plurality of previously generated events can be output.

As an exemplary embodiment, an upper layer 840 with respect to the screen information 810 corresponding to the web-browser function application may be output in a pop-up form or a form opened from a specific direction in one area. Specifically, the upper layer 840 may be slowly opened from the bottom to the top of the screen.

In addition, an icon 822 corresponding to the previously generated character message reception event and an icon 1012 corresponding to the previously generated SNS character message reception event may be output on the upper layer 840.

As another exemplary embodiment, the upper layer 840 may be set in an opaque form. In this case, the execution screen 810 of the web-browser function application may be displayed through the upper layer 840.

In this state, a user may select one of the plurality of icons 1012 and 822 respectively corresponding to the plurality of previously generated events. For example, the user may select the icon 822 corresponding to the character message reception event by applying a short (or tap) touch or a long touch to the icon 822.

Figure 34D:
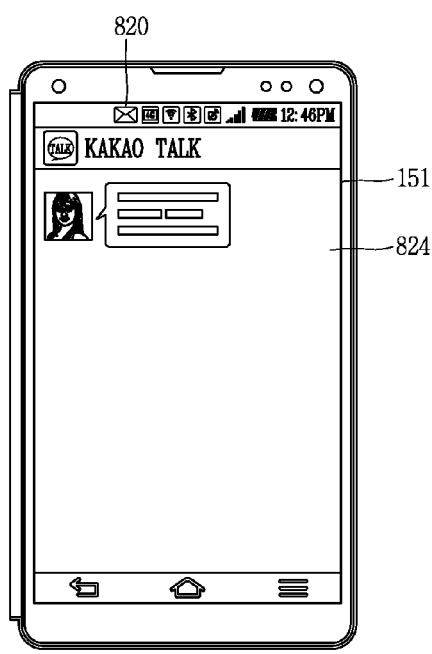
Figure 34C:
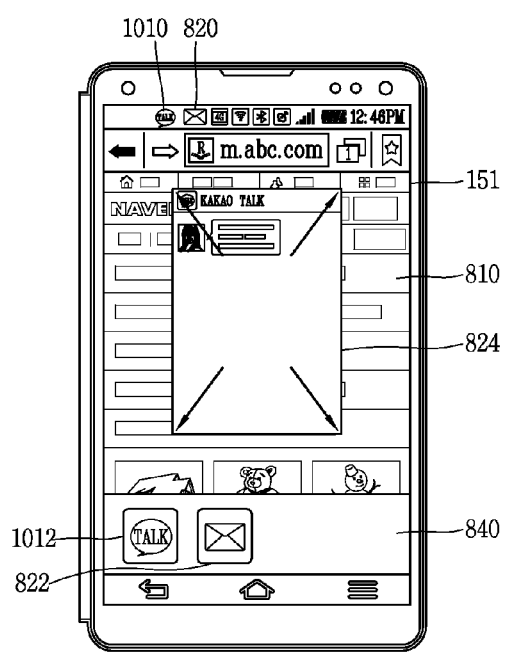

Referring to FIG. 34C, screen information 824 related to the character message reception event may be gradually opened on the execution screen 810 of the web-browser function application.

Accordingly, as shown in FIG. 34D, the execution screen 810 of the web-browser function application can be switched to the character message reception screen 824. In this state, the character message has been identified, the character message reception icon 820 output on the status bar disappears, and only the SNS message reception icon 1010 remains.

As an exemplary embodiment, the output of the upper layer 840 on which the icons 1012 and 822 respectively corresponding to the previously generated events are output may be finished while the screen is being switched as shown in FIG. 34C. Alternatively, when the screen switching is finished as shown in FIG. 34D, the output may be finished.

That is, according to the exemplary embodiment of FIG. 34, the screen may be switched to screen information related to an event selected by the user among the plurality of previously generated event.

As another exemplary embodiment, the controller 180 may output, together with a plurality of icons respectively corresponding to the plurality of previously generated events, at least one icon related to at least one application that satisfies a predetermined condition.

If a user motion different from the predetermined user motion is sensed in the state in which the at least one icon related to the at least one application that satisfies the predetermined condition is output, the controller 180 may switch the first screen information to screen information related to one of the at least one application that satisfies the predetermined condition.

FIGS. 35A, 35B, 35C, 35D, 36A, 36B, 36C, 36D, 37A(a), 37A(b), 37A(c), 37A(d), 37B(a), 37B(b) and 37B(c) are conceptual views illustrating a method for outputting information related to an event corresponding to a predetermined reference among a plurality of previously generated events or a recently executed application, using a predetermined user motion with respect to the rear surface of the terminal.

Figure 35A:
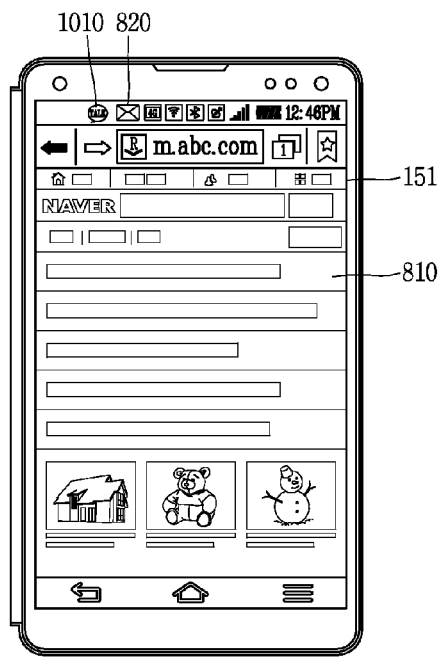
FIGS. 35A, 35B, 35C, 35D, 36A, 36B, 36C, 36D, 37A(a), 37A(b), 37A(c), 37A(d), 37B(a), 37B(b) and 37B(c) are conceptual views illustrating a method for outputting information related to an event corresponding to a predetermined reference among a plurality of previously generated events or a recently executed application, using a predetermined user motion with respect to the rear surface of the terminal.

Referring to FIG. 35A, when a web-browser function application is executed, screen information 810 corresponding to the web-browser function application may be output on the display unit 151.

When a character message reception event is generated before or after the execution of the web-browser function application, an icon 820 notifying that a character message has been received may be output on the status bar. Subsequently, when an SNS message reception event is generated, an icon 1010 notifying that an SNS message has been received may be output at the left side of the icon 820.

Figure 35B:
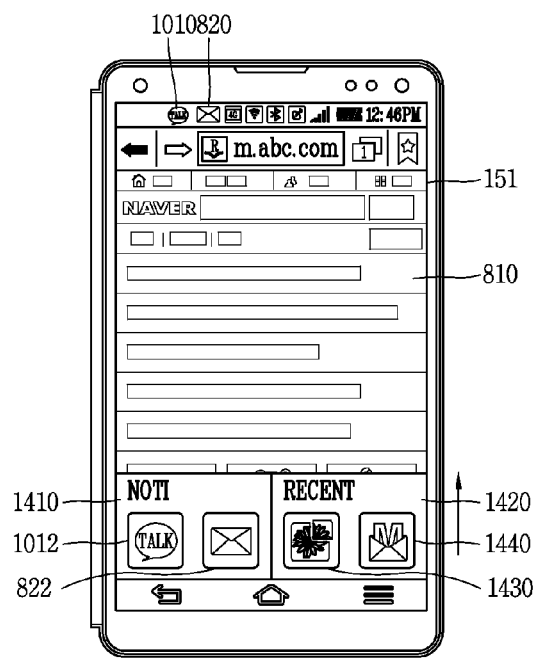

Referring to FIG. 35B, a predetermined tap motion tapping the inside of the window part 240 plural times may be received in the state shown in FIG. 35A. Accordingly, icons 1012 and 822 respectively corresponding to the plurality of previously generated events can be output.

As an exemplary embodiment, icons 1430 and 1440 respectively corresponding to recently executed applications may be output together with the icons 1012 and 822 respectively corresponding to the plurality of previously generated events.

Specifically, an upper layer 840 with respect to the screen information 810 corresponding to the web-browser function application may be output in a pop-up form or a form opened from a specific direction in one area. That is, the upper layer 840 may be opened from the bottom to the top of the screen. In this state, the upper layer 840 may be set in an opaque form. In this case, the execution screen 810 of the web-browser function application may be displayed through the upper layer 840.

The upper layer 840 may be divided into a first area 1410 in which the icons 1012 and 822 respectively corresponding to the previously generated events are output and a second area 1420 in which the icons 1430 and 1440 respectively corresponding to the recently executed applications are output. Accordingly, the icon 822 corresponding to the previously generated character message reception event and the icon 1012 corresponding to the previously generated SNS message reception event may be output in the first area 1410 of the upper layer 840, and the icons 1430 and 1440 respectively corresponding to the recently executed applications may be output in the second area 1420 of the upper layer 840.

Figure 35D:
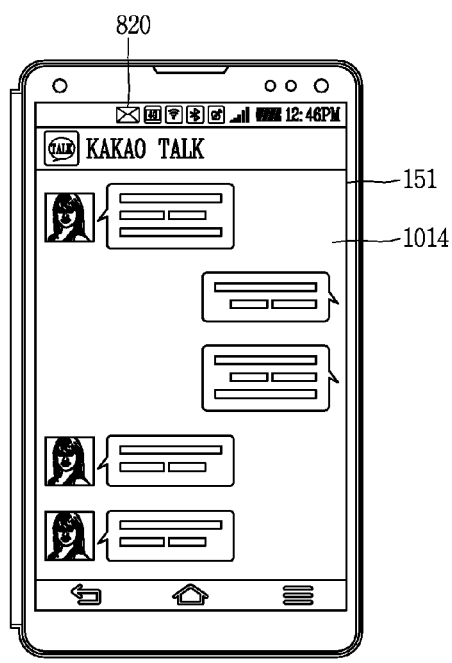
Figure 35C:
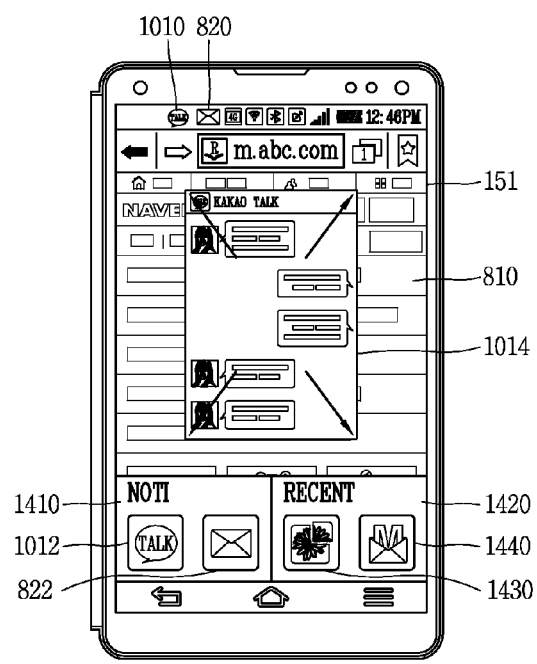

Referring to FIG. 35C, if a predetermined time elapses in the state in which the icons 1012, 822, 1430 and 1440 are output as shown in FIG. 35B, the execution screen 810 of the web-browser function application may be switched to screen information 1014 related to an event corresponding to a predetermined reference.

As an exemplary embodiment, the predetermined reference may be related to the time when an event is generated. Accordingly, the execution screen 810 of the web-browser function application may be switched to the screen information related to the SNS message reception event that is an event most recently generated between the character message reception event and the SNS message reception event. Alternatively, the execution screen 810 of the web-browser function application may be switched to the screen information related to the character message reception event that generated the last.

Meanwhile, as shown in FIG. 35C, the screen information 1014 related to the SNS message reception event that is the most recently generated event may be gradually opened on the execution screen 810 of the web-browser function application.

Accordingly, as shown in FIG. 35D, the execution screen 810 of the web-browser function application may be switched to the screen information 1014 related to the SNS message reception event that is the most recently generated event. In this state, the received SNS message has been identified, and thus the icon 1010 output on the status bar disappears.

In this state, the output of the upper layer 840 on which the icons 1012 and 822 respectively corresponding to the plurality of previously generated events and the icons 1430 and 1440 respectively corresponding to the recently executed applications are output may be finished while the screen is being switched as shown in FIG. 35C. Alternatively, when the screen switching is finished as shown in FIG. 35D, the output may be finished.

As another exemplary embodiment, a user may select an application to be executed by applying a user motion for selecting one of the icons 1012, 822, 1430 and 1440 output on the upper layer 840.

Specifically, if the user selects the character message reception icon 822 by applying a short or long touch input to the character message reception icon 822, the screen information related to the character message reception event may be gradually opened on the execution screen 810 of the web-browser function application.

Similarly, if the user selects the icon 1430 corresponding to the most recently executed first application by applying a short or long touch input to the icon 1430, the execution screen of the first application may be gradually opened on the execution screen 810 of the web-browser function application.

Figure 36A:
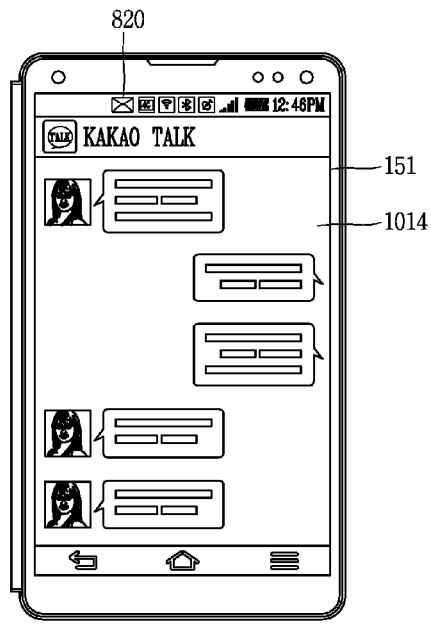

As still another exemplary embodiment, referring to FIG. 36A, a predetermined tap motion tapping the inside of the window part 240 plural numbers may be again received in the state of FIG. 35D, i.e., the state in which the execution screen 810 of the web-browser function application is switched to the screen 1014 of the SNS message reception event that is the most recently generated event.

Figure 36B:
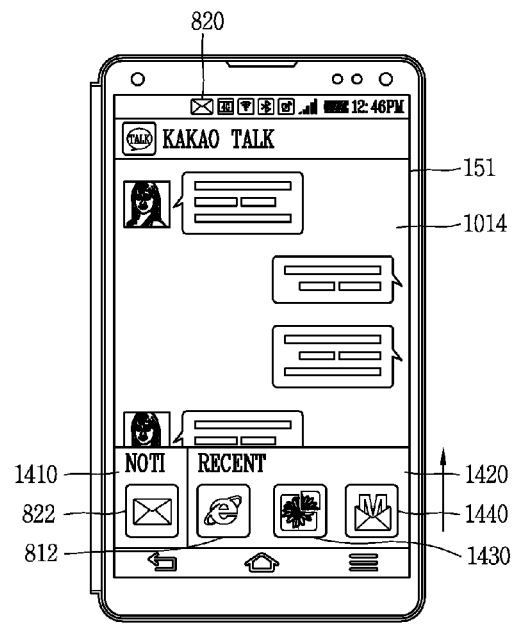

Referring to FIG. 36B, as the predetermined tap motion is again received, the icon 822 corresponding to the previously generated event may be again output.

As still another exemplary example, the icons 812, 1430 and 1440 respectively corresponding to the recently executed applications may be output together with the icon 822 corresponding to the previously generated event.

Specifically, the upper layer 840 with respect to the screen 1014 of the SNS message reception event may be output in a pop-up form or a form opened from a specific direction in one area. That is, the upper layer 840 may be opened from the bottom to the top of the screen. In this state, the upper layer 840 may be set in an opaque form, so that the screen 1014 of the SNS message reception event can be displayed through the upper layer 840.

The upper layer 840 may be divided into a first area 1410 in which the icon 822 corresponding to the previously generated event is output and a second area 1420 in which the icons 812, 1430 and 1440 respectively corresponding to the recently executed applications are output.

Accordingly, the icon 822 corresponding to the previously generated character message reception event may be output in the first area 1410 of the upper layer 840, and the icons 812, 1430 and 1440 respectively corresponding to the recently executed applications may be output in the second area 1420 of the upper layer 840. Specifically, the icon 812 corresponding to the web-browser function application that has been executed just before a currently executed SNS application is additionally output in the second area 1420.

Figure 36D:
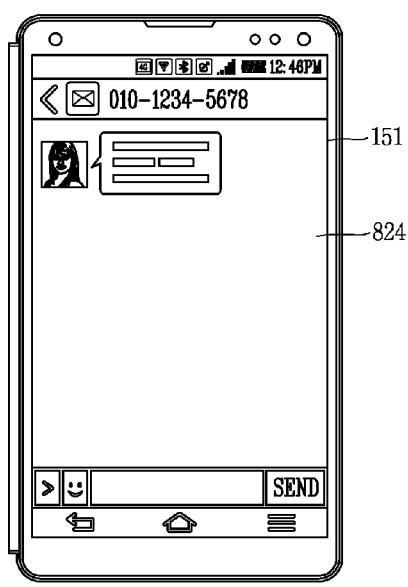
Figure 36C:
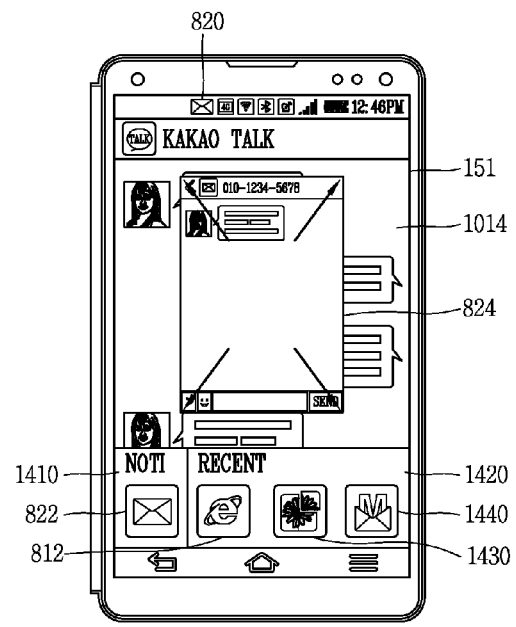

Referring to FIG. 36C, if a predetermined time elapses in the state in which the icons 822, 812, 1430 and 1440 are output as shown in FIG. 36B, the screen 1014 of the SNS message reception event may be switched to the screen information 824 related to the character message reception event.

Specifically, the screen information 824 related to the character message reception event may be gradually opened on the screen 1014 of the SNS message reception event.

Accordingly, as shown in FIG. 36D, the screen 1014 of the SNS message reception event may be switched to the screen 824 of the character message reception event. In this state, the character message has been identified, and thus the character message reception icon 820 output on the status bar disappears.

As an exemplary embodiment, the output of the upper layer 840 on which the icon 822 corresponding to the previously generated event and the icons 812, 1430 and 1440 respectively corresponding to the recently executed applications are output may be finished while the screen is being switched as shown in FIG. 36C. Alternatively, when the screen switching is finished as shown in FIG. 36D, the output may be finished.

As another exemplary embodiment, the user may select an application to be executed by applying a user motion for selecting one of the icons 822, 812, 1430 and 1440 output on the upper layer 840.

Specifically, if the user selects the icon 1440 corresponding to the recently executed second application by applying a short or long touch input to the icon 1440, the execution screen of the second application may be gradually opened on the screen 1014 of the SNS message reception event.

Figure 37A:
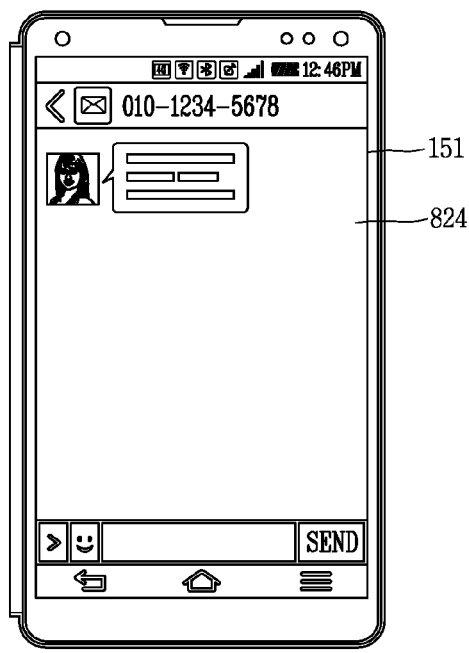
Figure 37A:
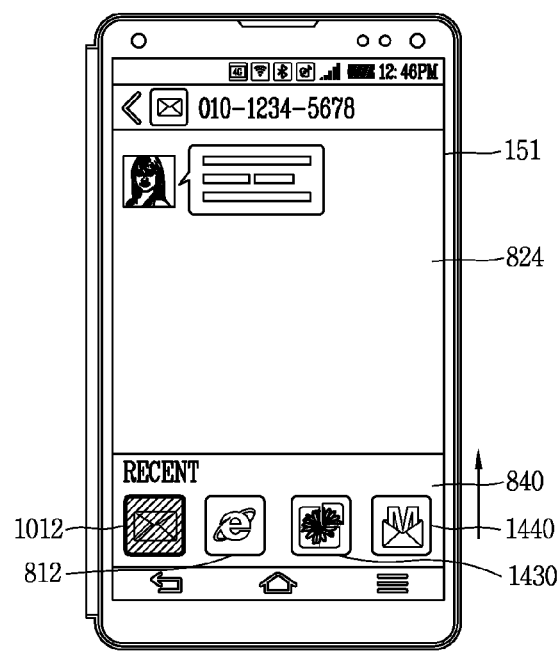
Figure 37A:
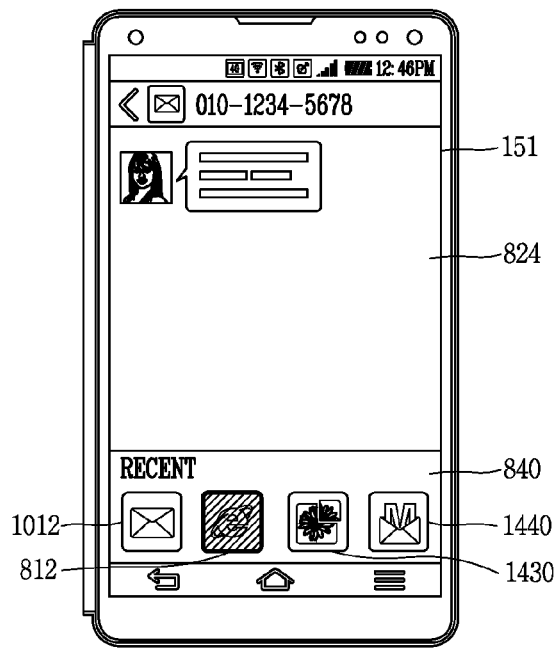
Figure 37A:
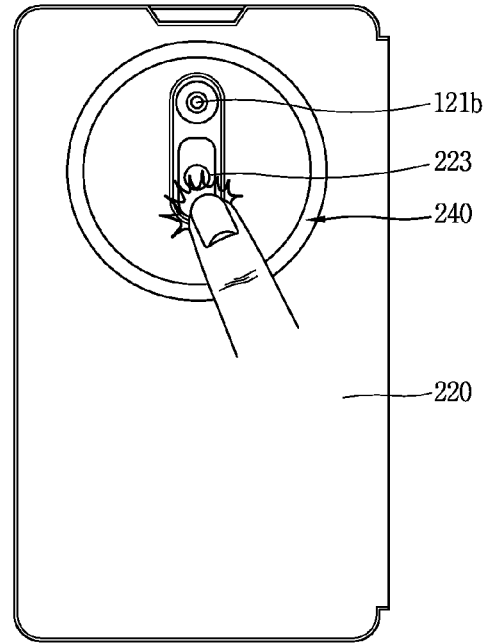

As still another exemplary embodiment, referring to FIG. 37A(a), a plurality of predetermined tap motions may be again applied in the state in which the screen 1014 of the SNS message reception event is switched to the screen 824 of the character message reception event as shown in FIG. 36D.

Referring to FIG. 37A(b), as the predetermined tap motions are again received, the icons 1012, 812, 1430 and 1440 respectively corresponding to the recently executed applications may be again output.

Specifically, the upper layer 840 with respect to the screen 824 of the character message reception event may be output in a pop-up form or a form opened from a specific direction in one area. That is, the upper layer 840 may be opened from the bottom to the top of the screen. In this state, the upper layer 840 may be set in an opaque form, so that the screen 824 of the character message reception event can be displayed through the upper layer 840.

The upper layer 840 may be divided into a first area in which the icon corresponding to the previously generated event is output and a second area in which the icons 1012, 812, 1430 and 1440 respectively corresponding to the recently executed applications are output.

In the case of FIG. 37A(b), there exist no previously generated event, and therefore, only the icons 1012, 812, 1430 and 1440 respectively corresponding to the recently executed applications may be output on the upper layer 840. Specifically, an icon corresponding to the SNS application that has been executed just before a currently executed character message application is be additionally output.

As still another exemplary embodiment, the icon 1012 corresponding to the SNS application that has been executed just before the currently executed character message application may be output in a shape or size different from that of the other icons 812, 1430 and 1440, or a flickering image effect, etc. may be added to the icon 1012 to be output. Accordingly, it can be identified that the icon 1012 corresponding to the SNS application is selected.

Referring to FIG. 37A(c), the user may select an application to be executed by applying a first user motion different from the predetermined tap motion tapping the inside of the window part 240 plural times. As an exemplary embodiment, as shown in FIG. 37A(c), the first user motion may be set as a tap motion tapping the inside of the window part 240 once.

Referring to FIG. 37A(d), as the tap motion tapping the inside of the window part 240 once is applied, the icon 812 corresponding to the web-browser function application output at the right side of the icon 1012 corresponding to the SNS application may be selected. As a result, the icon 812 corresponding to the web-browser function application may be output in a shape or size different from that of the other icons 1012, 1430 and 1440, or a flickering image effect, etc. may be added to the icon 812 to be output.

As an exemplary embodiment, the user may select an icon corresponding to an application to be executed by applying a short or long touch input. Specifically, the user may select the icon 812 corresponding to the web-browser function application by applying a short or long touch input to the icon 812.

As another exemplary embodiment, the user may additionally identify another icon corresponding to the recently executed application by applying a flicking input to the upper layer 840 on the icons 1012, 812, 1430 and 1440 respectively corresponding to the recently executed applications are output. Specifically, if the user applies a flicking input to the left side of the upper layer 840, the icons of the applications that have been executed before the second application is executed may be output.

Figure 37B:
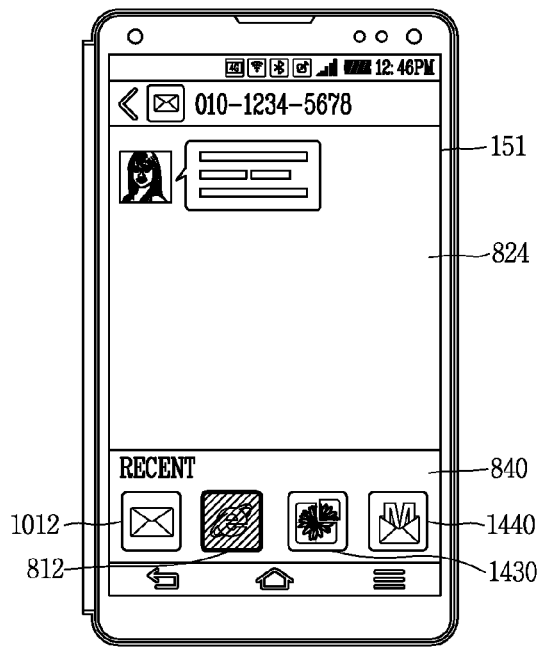
Figure 37B:
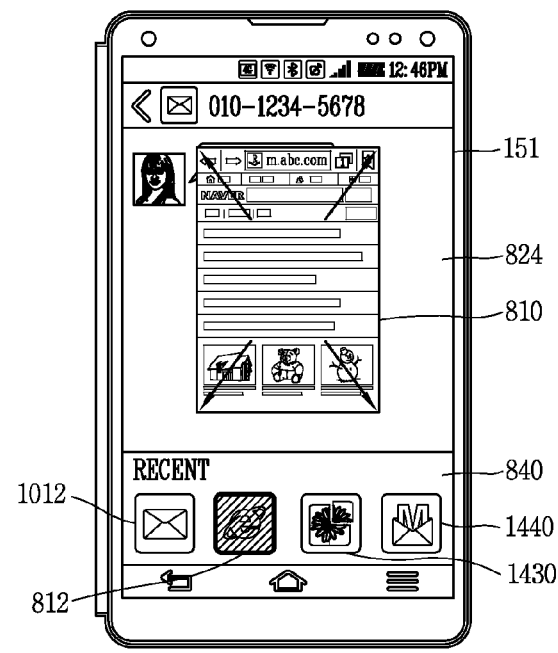
Figure 37B:
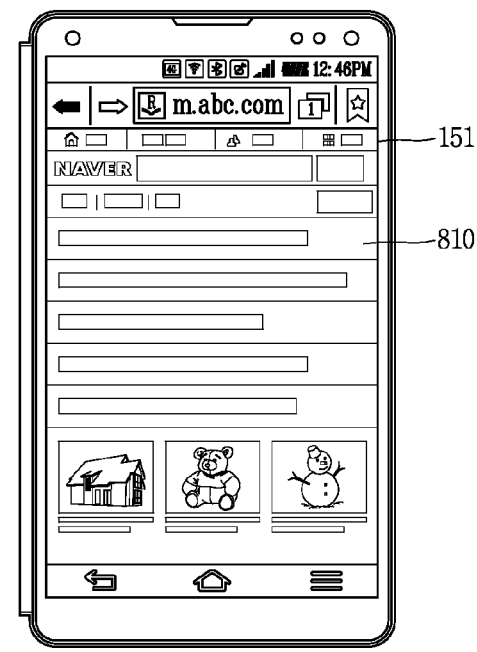

As still another exemplary embodiment, referring to FIGS. 37B(a) and (b), if a predetermined time elapses in the state shown in FIG. 37A(d), the application corresponding to the selected icon 812 is executed. Specifically, the execution screen 810 of the web-browser function application corresponding to the selected icon 812 may be gradually opened on the screen 824 of the character message reception event. Accordingly, as shown in FIG. 37B(c), the screen 824 of the character message reception event may be switched to the execution screen 810 of the web-browser function application.

In this case, the output of the upper layer 840 on which the icons 1012, 812, 1430 and 1440 respectively corresponding to the recently executed applications are output may be finished while the screen is being switched as shown in FIG. 37B(b). Alternatively, when the screen switching is finished as shown in FIG. 37B(c), the output may be finished.

Effects of the mobile terminal and the method for controlling the same according to the present disclosure will be described as follows.

In the mobile terminal according to the present disclosure, sensing information sensed through the sensor disposed in the cover part coupled to the mobile terminal can be used in control of the mobile terminal. As operations of the sensor disposed in the cover part and the mobile terminals are connected to each other, it is possible to effectively sense a user motion with respect to the mobile terminal.

Further, in the mobile terminal according to the present disclosure, the operation of the mobile terminal can be controlled based on a user motion with respect to the rear surface of the mobile terminal, using the sensor disposed in the cover part. Thus, the user can apply a user motion to the rear surface of the mobile terminal with a hand holding the mobile terminal. Accordingly, it is possible to improve user convenience and accessibility with respect to the mobile terminal.

Further, in the mobile terminal according to the present disclosure, a more intuitive and easier approach can be provided in outputting screen information related to an event generated using a user motion with respect to the mobile terminal. Thus, an inconvenient process for entering an application related to the generated event or a recently executed application can be omitted.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
a body having a front surface and a rear surface;
a display unit disposed on the front surface;
a cover including a rear cover portion mounted on the rear surface of the body and a front cover portion rotatably connected to the rear cover portion, wherein the front cover portion is formed to allow at least a part thereof to cover at least a part of the front surface or the rear surface of the body;
a window portion provided in the front cover portion to expose at least part of the display unit in a state that the front cover portion covers at least a part of the front surface, and to expose at least part of the rear surface in a state that the front cover portion covers at least a part of the rear surface; and
a sensor unit provided in the front cover portion and including at least one sensor disposed at an edge portion of the window portion,
wherein the sensor unit is configured to sense motion of an object within a perimeter of the window portion when the front cover portion is in the state that the front cover portion covers the at least a part of the rear surface.

2. The mobile terminal of claim 1, wherein the sensor unit comprises a plurality of sensors separated from one another along the perimeter of the window portion, and disposed toward an edge of the front cover portion that is defined by the window portion.

3. The mobile terminal of claim 2, the cover further including:
a flexible circuit board comprising a loop portion located around the perimeter of the window portion, and an extension portion extended from the loop portion and connected from the front cover portion to the rear cover portion and electrically connected to the body at the rear cover portion.

4. The mobile terminal of claim 3, wherein a connecting terminal, electrically connected to a power terminal of the body, is disposed at the extension portion to allow reception of power from the body.

5. The mobile terminal of claim 1, wherein a sensor in the body is configured to be controlled together with the at least one sensor of the sensor unit to sense the motion of the object and is mounted on the rear surface of the body to overlap with the window portion when the front cover portion is in the state that the front cover portion covers the at least a part of the rear surface, wherein the sensor in the body is configured to be controlled to sense the motion of the object through the window portion.

6. The mobile terminal of claim 1, wherein at least one magnet is disposed at the front cover portion, and a plurality of Hall-effect devices are disposed at the body to permit sensing of the at least one magnet and thereby sense the state of the front cover portion covering the at least a part of the front surface and the state of the front cover portion covering the at least a part of the rear surface.

7. The mobile terminal of claim 6, wherein:
the plurality of Hall-effect devices comprise first and second Hall-effect devices, located proximate to edges of the body and located at different positions along a length direction of the body, and
first and second magnets are located at positions on the front cover portion corresponding to the positions of the first and second Hall-effect devices, such that each magnet is proximate to a corresponding Hall-effect device when the front cover portion is in the state that the front cover portion covers the at least a part of the front surface or the rear surface of the body.

8. The mobile terminal of claim 6, wherein the at least one magnet is mounted on the front cover portion to permit sensing of a state that the front cover portion covers the front surface or rear surface, and the controller is further configured to:
determine whether or not the front cover portion is in a state of covering the rear surface using a magnetic field formed by the magnet being sensed through the plurality of Hall-effect devices, and
supply operation power to the sensor unit to activate the sensor unit disposed at the window portion when the front cover portion is in a state of covering the rear surface as a result of the determination.

9. The mobile terminal of claim 1, further comprising:
at least one movement sensor provided in the body for sensing a movement of the body; and
a controller configured to:
process a function corresponding to motion of the object within the perimeter of the window portion using sensing information sensed through the sensor unit and, when the mobile terminal is in a state that first screen information of a first application is displayed on the display unit, store execution information of the first application in response to a combination of:
the movement sensor sensing movement of the body in a preset first direction and
the sensor unit sensing a motion of the object corresponding to a preset type of touch being applied to the rear surface.

10. The mobile terminal of claim 9, wherein when the mobile terminal is in a state that second screen information of a second application, which is different from the first application, is displayed on the display unit, the controller is further configured to store execution information of the second application in response to a combination of:
the movement sensor sensing that the body moves in the preset first direction; and
the sensor unit sensing the motion of the object corresponding to the preset type of touch being applied to the rear surface,
wherein the controller is further configured to:
control the display unit to display graphic objects corresponding to the first and the second applications, respectively, using the stored execution information in response to a combination of:
the movement sensor sensing that the body moves in a second direction, which is different from the preset first direction; and
the sensor unit sensing the motion of the object corresponding to the preset type of touch being applied to the rear surface.

11. The mobile terminal of claim 10, wherein the controller is further configured to control the display unit to display the screen information of either one of the first or the second application in response to the sensor unit sensing a motion of the object corresponding to a touch being applied to the rear surface when the terminal is in a state that the respective graphic object is displayed.

12. The mobile terminal of claim 11, wherein the controller is further configured to control the display unit to display the first or second screen information corresponding to one of the first and second applications that was the most recently executed in response to the sensor unit sensing the motion of the object corresponding to the touch applied to the rear surface.

13. The mobile terminal of claim 12, wherein, in a state that the graphic objects corresponding to the first and the second applications, respectively, are displayed, the controller is further configured to delete the execution information of the first and the second applications, and terminate the display of graphic objects in response to a combination of:
the movement sensor sensing that the body moves with a preset movement; and
the sensor unit sensing a motion of the object corresponding to a preset type of touch applied to the rear surface.

14. The mobile terminal of claim 13, wherein, subsequent to deleting the execution information of the first and the second applications, the graphic objects corresponding to the first and the second applications, respectively, are not displayed even when the movement sensor senses that the body moves in the second direction, and the sensor unit senses a motion of the object corresponding to a preset type of touch applied to the rear surface.

15. The mobile terminal of claim 13, wherein, when in a state that the body moves in the preset first direction, the controller is further configured to terminate the display of the first screen information of the first application on the display unit when the sensor unit senses a motion of the object corresponding to the preset type of touch applied to the rear surface.

16. A control method of a mobile terminal having a cover including a rear cover portion mounted on a rear surface of a body of the mobile terminal and a front cover portion rotatably connected to the rear cover portion, wherein the front cover portion is formed to cover a front surface or the rear surface of the body, the method comprising:
activating at least one sensor disposed at an edge portion of a window portion provided in the front cover portion when the front cover portion is in a state that the front cover portion covers at least a part of the rear surface, wherein the window portion is included in the front cover portion to expose at least part of a display unit of the mobile terminal in a state that the front cover portion covers at least a part of the front surface, and to expose at least part of the rear surface in a state that the front cover portion covers at least a part of the rear surface;
sensing, by the activated at least one sensor, motion of an object within a perimeter of the window portion when the front cover portion is in the state that the front cover portion covers the at least a part of the rear surface; and
processing one or more functions of the mobile terminal based on the motion of the object within the perimeter of the window portion.

17. The control method of claim 16, wherein the one or more functions are different according to a location at which the motion of the object is applied within the perimeter of the window portion.

18. The control method of claim 17, wherein:
the motion of the object comprises one or more taps,
a first function is processed when the one or more taps are applied to a right portion of the rear surface of the body, and
a second function is processed when the one or more taps are applied to a left portion of the rear surface of the body.

19. The control method of claim 16, wherein when the motion of the object within the perimeter of the window portion is sensed while screen information of an application is displayed on the display unit, execution information of the application is stored in a memory of the mobile terminal.

20. The control method of claim 19, wherein when a user request received after the screen information of the application is disappeared from the display unit, the disappeared screen information of the application is re-displayed on the display unit based on the stored execution information of the application.

* * * * *